(12) United States Patent
Osman

(10) Patent No.: US 10,926,177 B2
(45) Date of Patent: Feb. 23, 2021

(54) SYSTEMS AND METHODS FOR PREDICTING STATES BY USING A DISTRIBUTED GAME ENGINE

(71) Applicant: Sony Interactive Entertainment Inc., Tokyo (JP)

(72) Inventor: Steven Osman, San Francisco, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 16/355,535

(22) Filed: Mar. 15, 2019

(65) Prior Publication Data

US 2020/0289937 A1 Sep. 17, 2020

(51) Int. Cl.
| | | |
|---|---|---|
| *A63F 13/00* | (2014.01) | |
| *A63F 13/577* | (2014.01) | |
| *G06N 20/00* | (2019.01) | |
| *A63F 13/335* | (2014.01) | |
| *A63F 13/58* | (2014.01) | |

(52) U.S. Cl.
CPC .......... *A63F 13/577* (2014.09); *A63F 13/335* (2014.09); *A63F 13/58* (2014.09); *G06N 20/00* (2019.01)

(58) Field of Classification Search
None
See application file for complete search history.

(56) References Cited

U.S. PATENT DOCUMENTS

| | | | |
|---|---|---|---|
| 9,498,715 B2 | 11/2016 | Kruglick | |
| 2014/0187332 A1 | 7/2014 | Mickelsen et al. | |
| 2015/0119139 A1* | 4/2015 | Ladell | G06T 11/40 463/31 |
| 2015/0126282 A1* | 5/2015 | Hitomi | A63F 13/355 463/42 |
| 2016/0082353 A1* | 3/2016 | Christovale | A63F 13/533 463/7 |

(Continued)

FOREIGN PATENT DOCUMENTS

EP 2937789 A1 10/2015

OTHER PUBLICATIONS

Bernier, "Latency Compensating Methods in Client/Server In-game Protocol Design and Optimization", XP-002400694, Lag Compensation, Apr. 1, 2001, http://developer.valvesoftware.com/wiki/Lag_Compensation.

(Continued)

*Primary Examiner* — Paul A D'Agostino
(74) *Attorney, Agent, or Firm* — Penilla IP, APC

(57) ABSTRACT

A method for reducing latency in execution of a game is described. The method includes receiving via a computer network a user input associated with the game and determining from the user input a current state of the game. While the current state of the game is being determined, the method includes predicting a next state of the game based on the user input and one or more predicted user inputs. The method further includes generating one or more predicted image frames from the next state, determining whether the one or more predicted user inputs are received via the computer network, and sending the one or more predicted image frames in response to receiving the one or more predicted user inputs to reduce the latency in execution of the game.

20 Claims, 17 Drawing Sheets

(56) References Cited

U.S. PATENT DOCUMENTS

2016/0250559 A1* 9/2016 Sogabe ................ A63F 13/573
463/3
2018/0115743 A1   4/2018 McLoughlin et al.

OTHER PUBLICATIONS

Lee et al., "Outatime: Using Speculation to Enable Low-Latency Continuous Interaction for Mobile Cloud Gaming", Proc. of the 13th Annual Int'l Conf. on Mobile Systems, Applications, and Services, MOBISYS '15, Florence, Italy, May 18-22, 2015, and May 1, 2015, New York, New York, ISBN: 978-1-4503-3493-5.
PCT/US2020/018740, Invitation to Pay Additional Fees and, Where Applicable, Protest Fee, International Searching Authority, PCT/ISA/206, dated May 20, 2020.

* cited by examiner (Cloud-based Gaming)

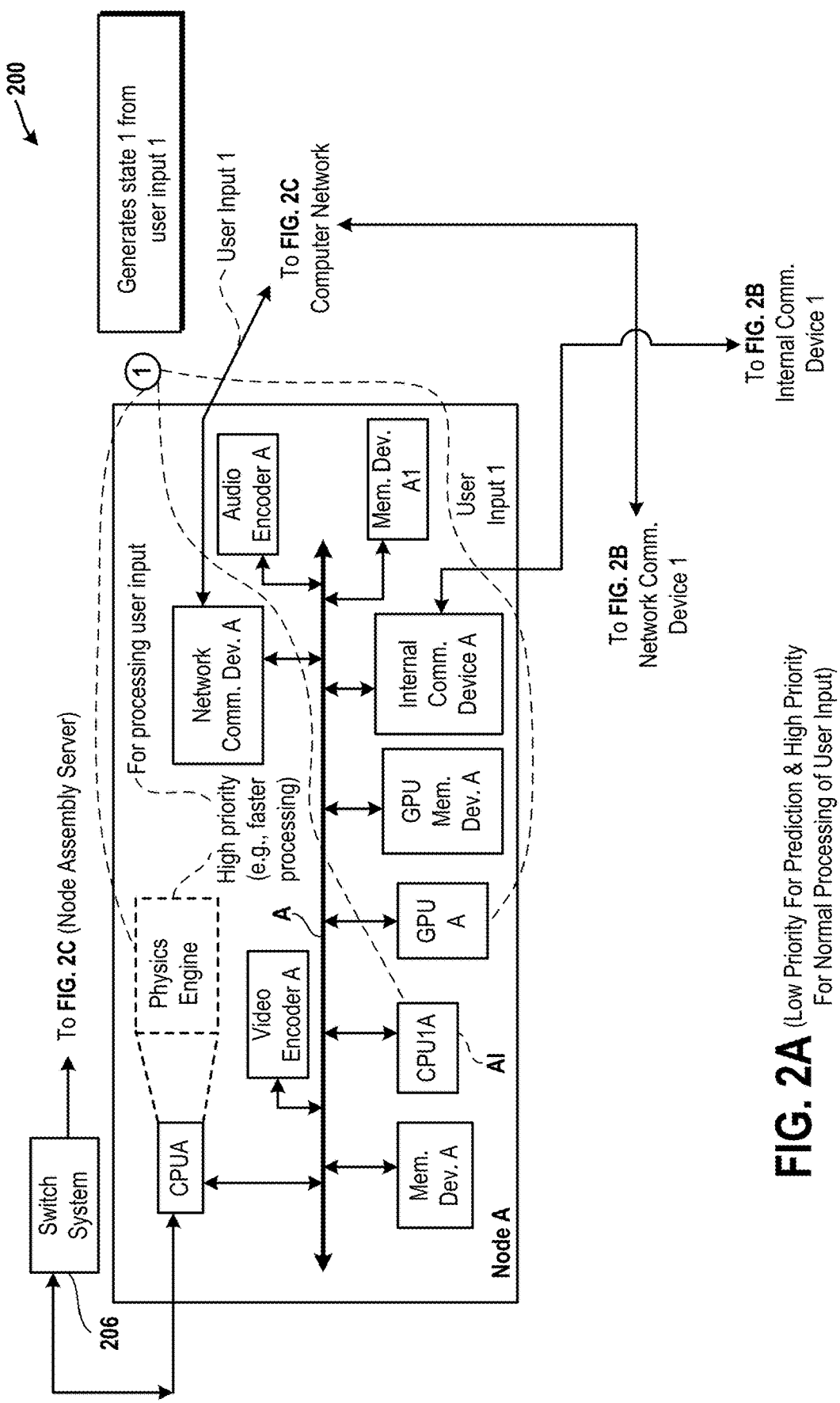
FIG. 2A (Low Priority For Prediction & High Priority For Normal Processing of User Input)

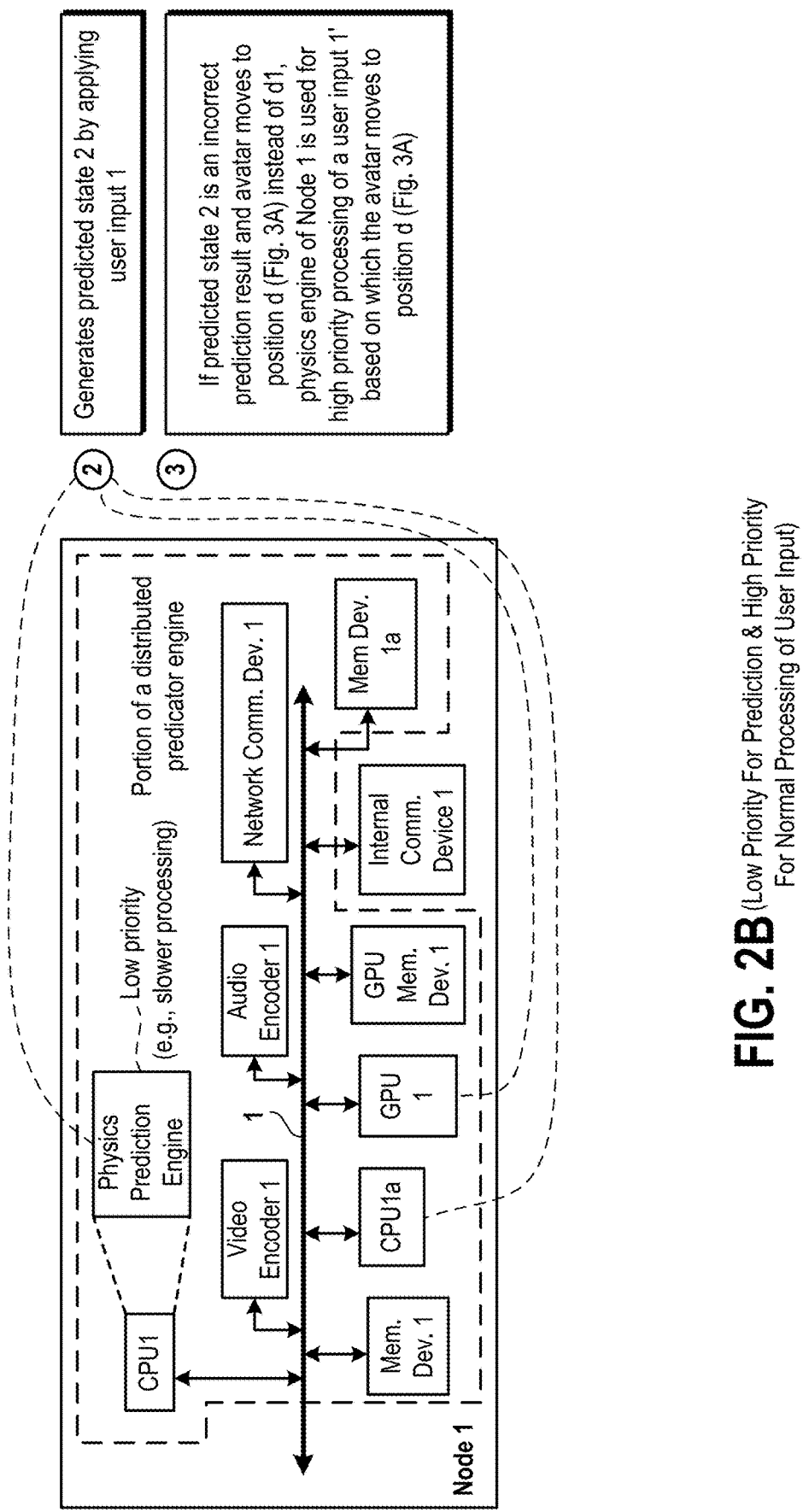
FIG. 2B (Low Priority For Prediction & High Priority For Normal Processing of User Input)

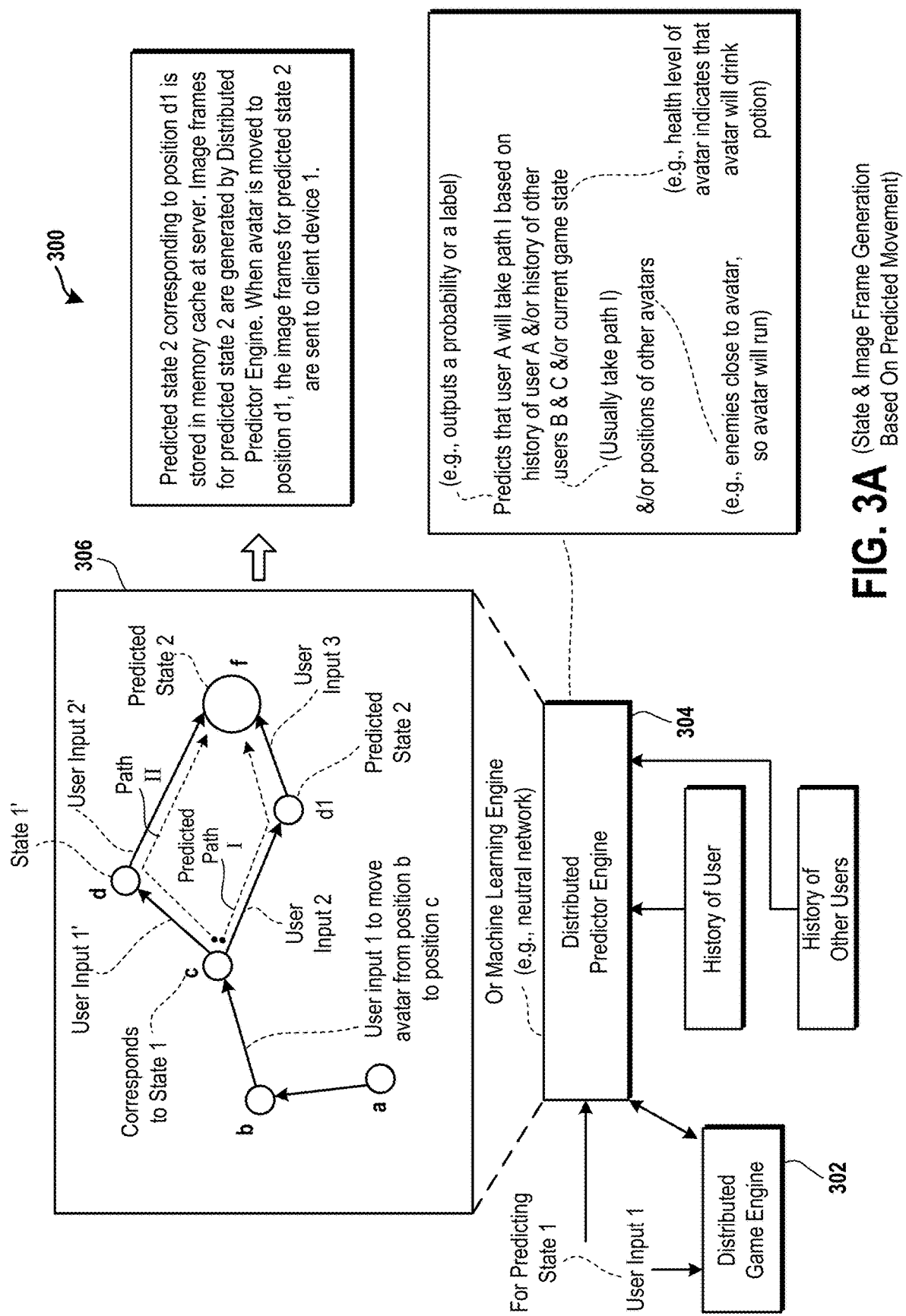
FIG. 3A (State & Image Frame Generation Based On Predicted Movement)

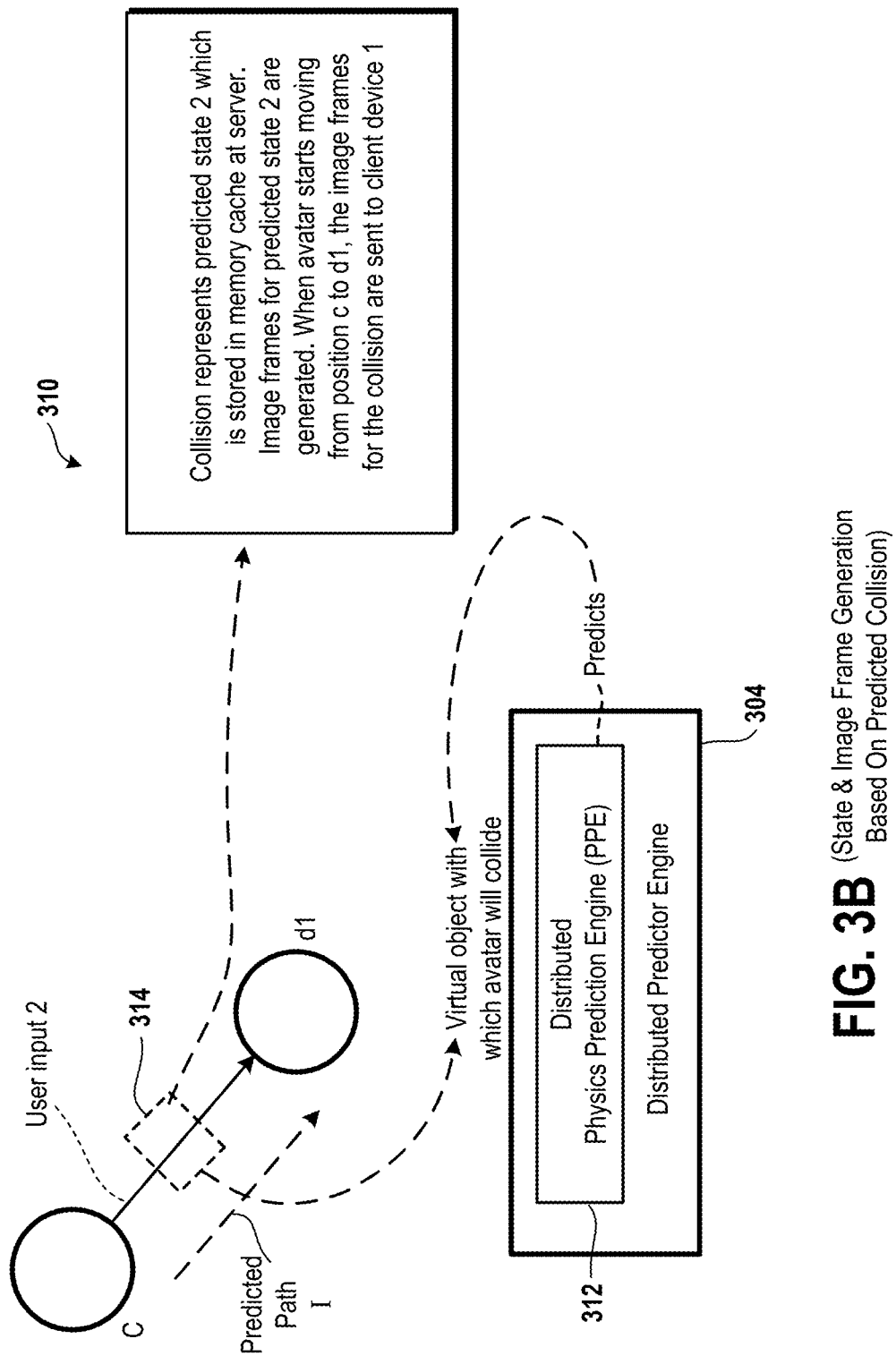
FIG. 3B (State & Image Frame Generation Based On Predicted Collision)

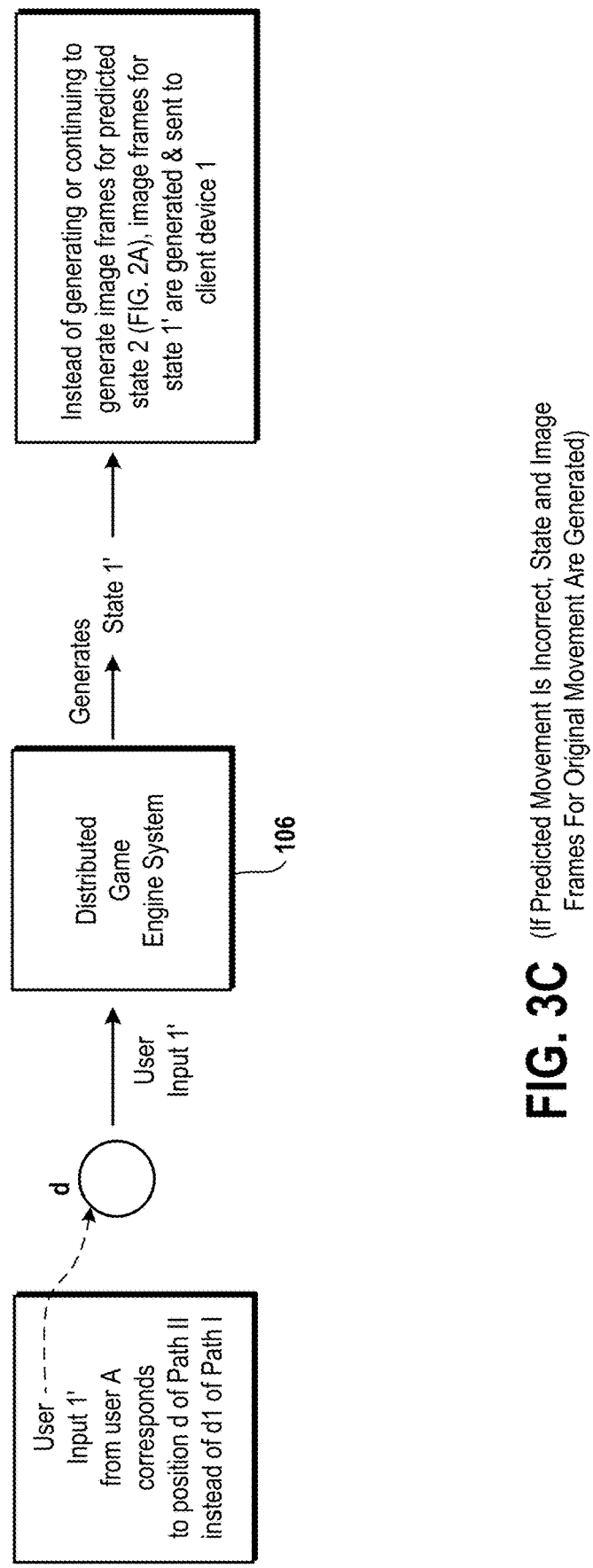
FIG. 3C (If Predicted Movement Is Incorrect, State and Image Frames For Original Movement Are Generated)

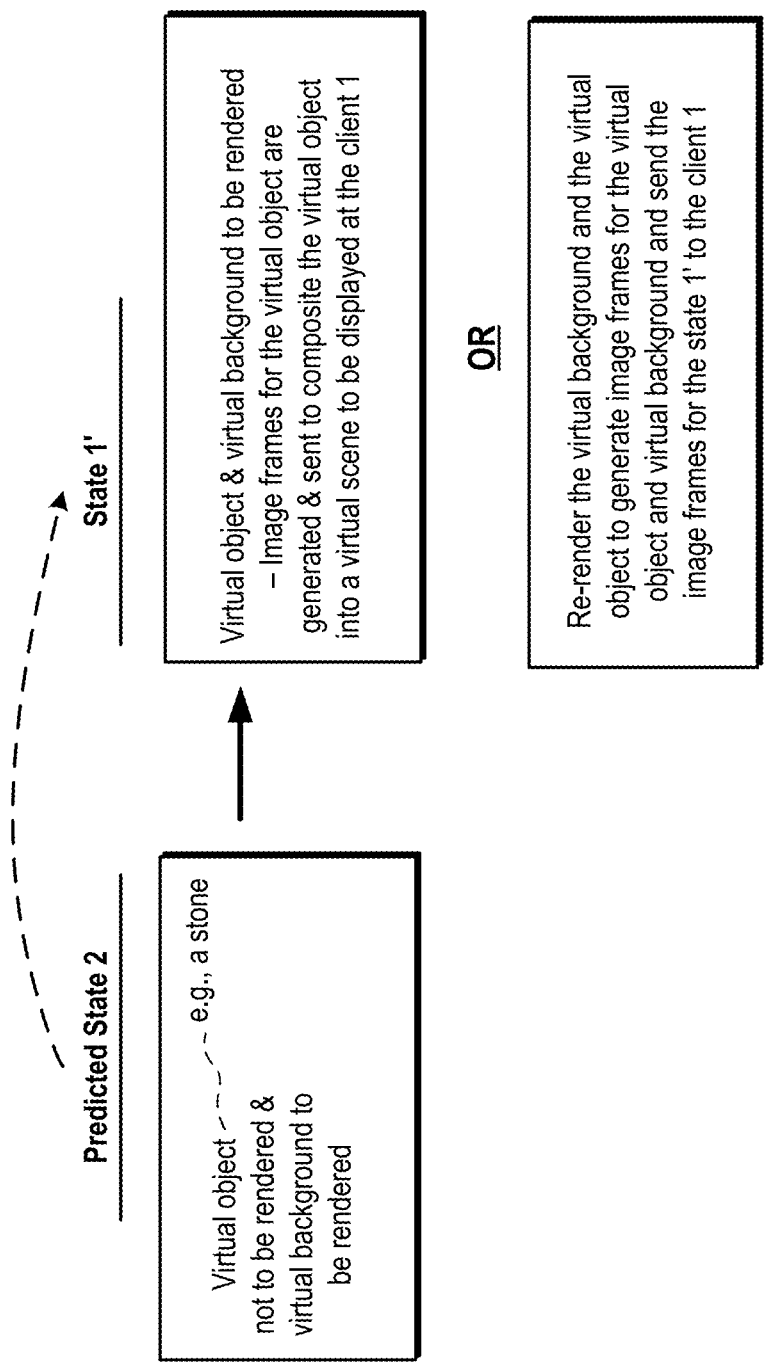
FIG. 3D (If Prediction About Taking Path I is Incorrect, Can Composite Virtual Object Into a Virtual Scene Or Can Re-render a Virtual Scene Having The Virtual Object)

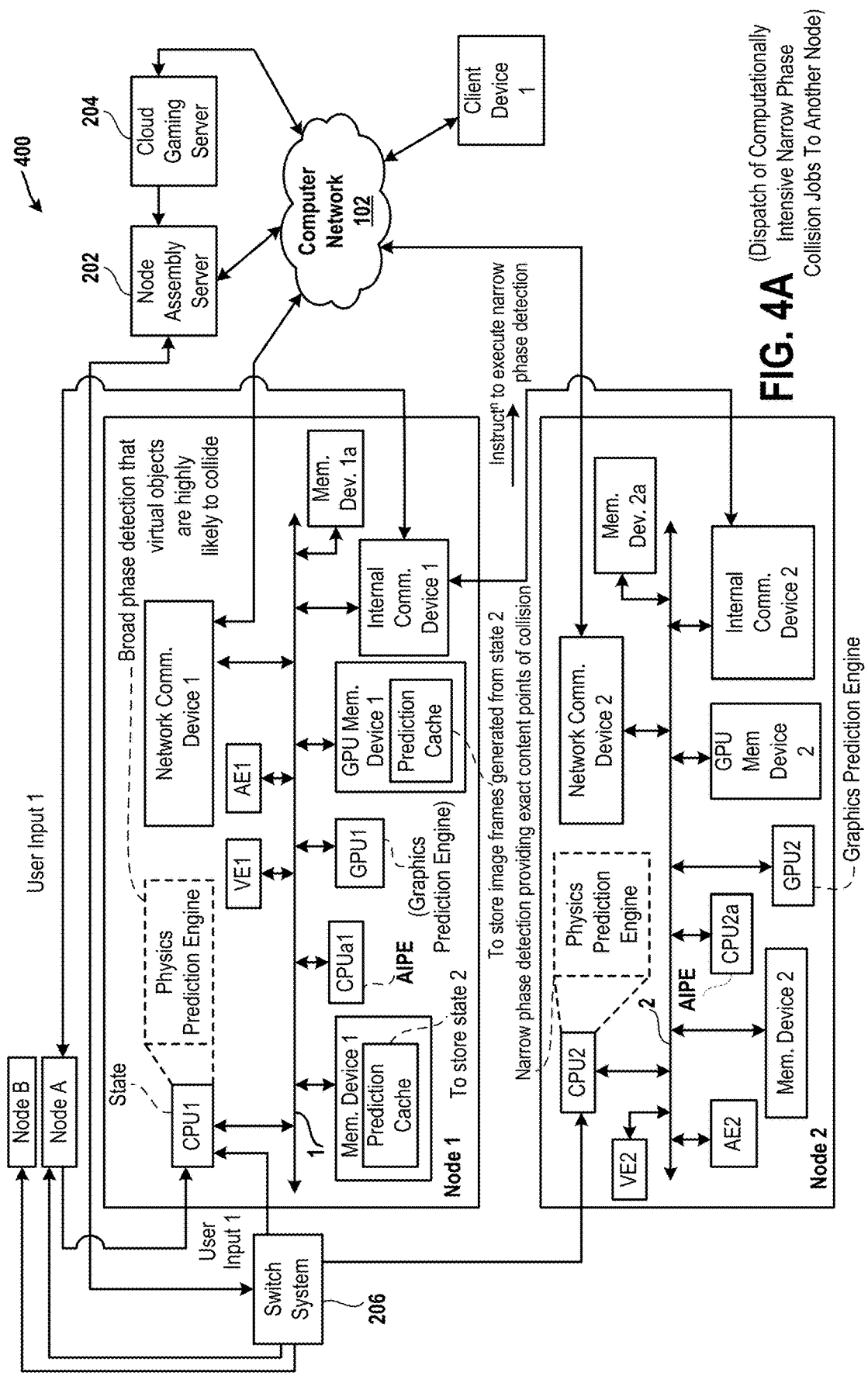

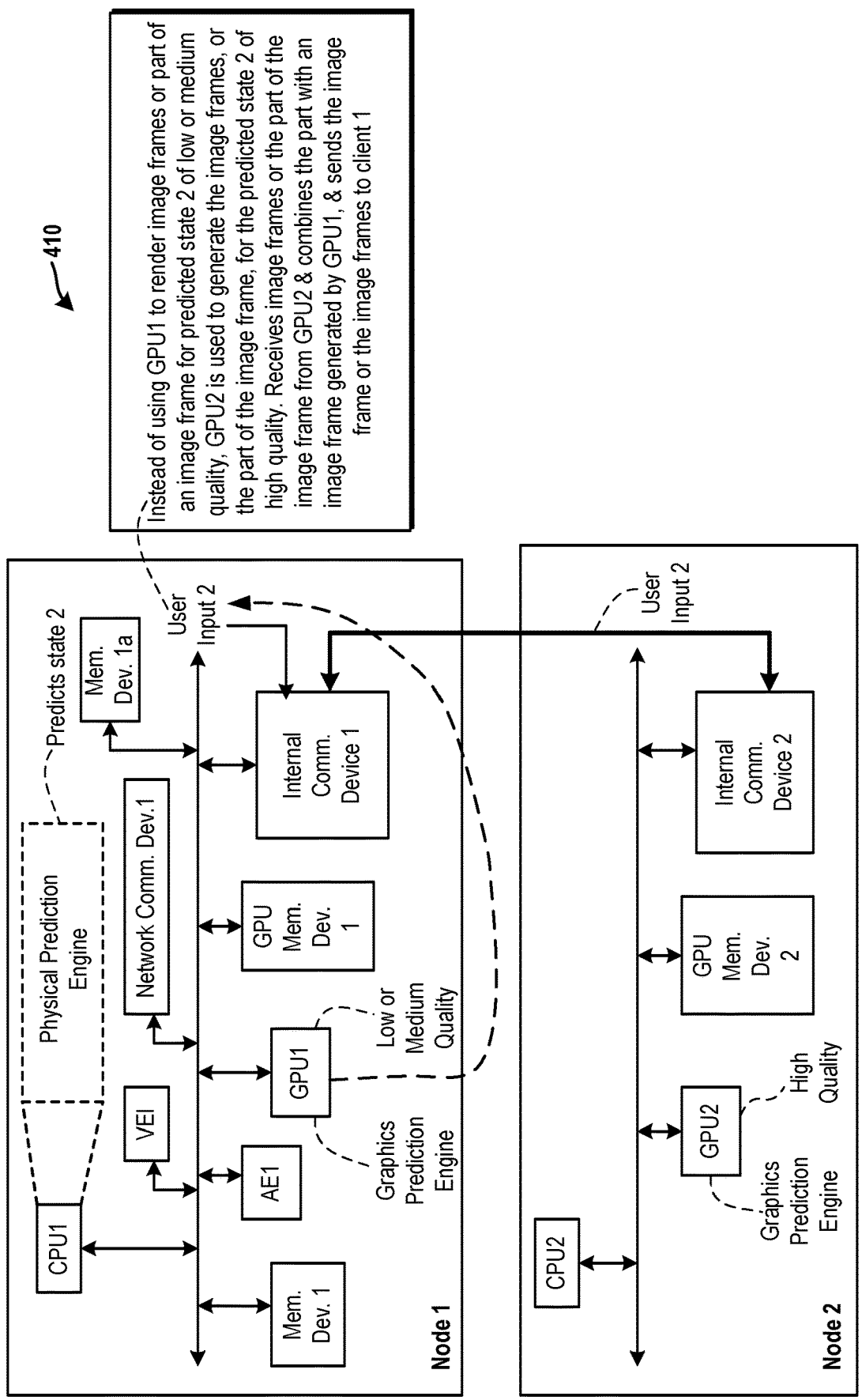
FIG. 4B (Dispatch High Quality Jobs To GPU2)

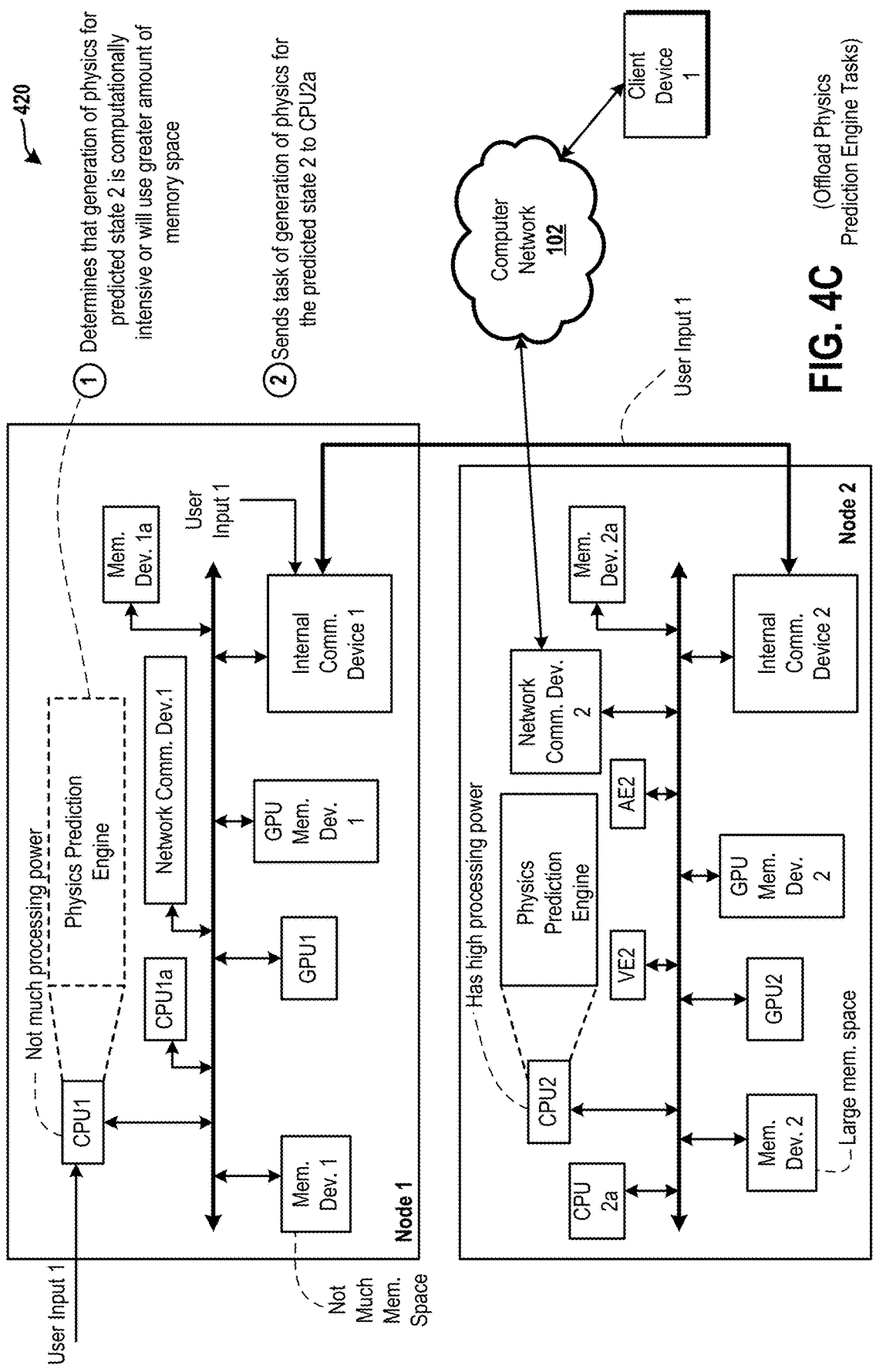
FIG. 4C (Offload Physics Prediction Engine Tasks)

SYSTEMS AND METHODS FOR PREDICTING STATES BY USING A DISTRIBUTED GAME ENGINE

FIELD

The present disclosure relates to systems and methods for predicting states by using a distributed game engine.

BACKGROUND

A video game, these days, is accessed over a computer network. For example, Fortnite™ game is played by many players from different parts of the world. One player controls a first avatar and another player controls a second avatar. Each avatar collects weapons and cuts wood during the game. The avatars are then forced to be confined within a virtual circle. If the avatars are left behind outside the virtual circle, the avatars virtually die in the game. When both the avatars are in the circle, they find each other and then battle against each other with their weapons. Only one of the two avatars survive.

Because the video game is accessed via the computer network, a lot of information, associated with the video game, is generated. The increase in the amount of information increases a latency in execution of the video game.

SUMMARY

Embodiments of the present disclosure provide systems and methods for predicting states by using a distributed game engine to reduce latency in execution of an application on a game cloud.

Other aspects of the present disclosure will become apparent from the following detailed description, taken in conjunction with the accompanying drawings, illustrating by way of example the principles of embodiments described in the present disclosure.

The systems and methods described herein aid in reduction of latency for the processing of a game and/or to aid in a distribution of work for the distributed game engine through the use of deep learning. Deep learning is a technique used to approximate functions that may be otherwise difficult to compute using an algorithm. The functions are difficult to compute because the algorithm is unknown or a computation using the algorithm is complex.

Generally, many games execute successfully and algorithms for these games are generally known and automated. However, in the game, described herein, due to a relationship between many states in processing a frame of a scene of the game, it is sometimes difficult to decouple components, such as virtual objects or virtual characters, in the game from each other. For instance, user input is used to drive a virtual character in the game. That virtual character's actions may drive artificially intelligent non-playable characters (AI NPCs) in the game to a certain behavior or triggers effects according to laws of physics. To illustrate, when the user input is received, an explosive is set off or an AI NPC moves or a virtual object moves. The AI NPC, the laws of physics, and a change in the user's viewpoint contribute to changes in a rendering of the scene of the game. This illustrates some interdependencies of different functions within a game engine.

A neural network can be used to predict an output of the different functions so that subsequent functions can be opportunistically processed earlier. In case that the neural network's prediction is incorrect, early processing based on predictions can be aborted and correct processing based on actual function outputs can be restarted.

In an embodiment, the systems and methods can "course correct" errors in the prediction. As an example, a predictor may incorrectly decide that a virtual object or a virtual character does not need to be rendered and the scene is rendered opportunistically without the virtual object. Later during processing of the frame, due to effects of the laws of physics, it is determined that the virtual object is to be pushed into view. The systems and methods described herein provide two choices at this point. One of the choices is that the systems and methods can discard some or all of its preprocessing and re-render the scene with the virtual object present. Another one of the choices is that the systems and methods can render the virtual object independently and composite it onto the scene.

In an embodiment, the systems and methods, described herein, aid in the distribution of work across computing resources. For instance, a physics engine is typically broken up into a number of components. Examples of these components include a collision detection system, a collision resolution system or solver, and an update system. Collision detection is an expensive process and can be further split into subcomponents, such as for instance, a broad phase detection operation, which does a coarse estimate of whether virtual objects are colliding, and a narrow phase detection operation that is much more computationally expensive and computes an exact contact point between the virtual objects. While the broad phase detection operation is running, a neural network trained on previous results of the broad phase detection operation, can predict which virtual objects are highly likely, somewhat likely, and not likely at all to collide. For those virtual objects that are predicted to be highly likely, the narrow phase detection operation can be dispatched to other computational resources. Once the broad phase detection operation is complete, those virtual objects that are somewhat likely to collide will be resolved and either dispatched or not.

In one embodiment, the systems and methods update a complex backdrop, such as a complex background, of the scene. For instance, a neural network can be trained to decide when a high resolution backdrop, which is reasonably static but computationally intensive to compute, will likely need to be re-rendered based on a number of factors, such as user input, AI state, physics state, and other game state. State values, such as intensity values, color values, shading values, texture values, etc., for rendering the high resolution backdrop can be predicted through the neural network so that a remote rendering job can be dispatched in anticipation of the high resolution backdrop.

While it is important for the game to be able to update all these things in a timely fashion, the neural network provides a system with some freedom to move tasks around. Consider the game running on the distributed game engine, which is a cloud-based distributed game engine. An individual node of the distributed game engine is able to process a reasonable quality output for a single user, but not a high quality output. This could be, for example, because of insufficient resources on the node. Some nodes of the distributed game engine have very fast graphical processing units (GPUs) capable of high quality graphics rendering of computationally intense components, and other nodes of the distributed game engine have GPUs with large amounts of memory capable of rendering items with very high resolution textures but lower computation capability by comparison, while other nodes of the distributed game engine have specialized physics or AI components. The game can run with reasonable quality on one generic node of the distributed game engine, or, if anticipated early enough, high quality jobs can be farmed off to a less busy or more specialized nodes of the distributed game engine to return a high quality output. A deep learning predictor can decide when to dispatch these high quality jobs. If it predicts late, the reasonable quality is computed locally at the generic node. If it predicts early, the high quality output is stale by the time it is to be applied and is discarded. However, if it predicts correctly, e.g., neither late nor early, or on time, the high quality output will be returned in time to be combined with other intermediate results to provide a higher quality experience. Even if all nodes of the distributed game engine are configured in a similar fashion, in one embodiment, load balancing is applied among the nodes in cases. In load balancing, not all resources are used in the same amount across all the nodes.

In one embodiment, a method for reducing latency in execution of a game is described. The method includes receiving via a computer network a user input associated with the game and determining from the user input a current state of the game. While the current state of the game is being determined, the method includes predicting a next state of the game based on the user input and one or more predicted user inputs. The method further includes generating one or more predicted image frames from the next state, determining whether the one or more predicted user inputs are received via the computer network, and sending the one or more predicted image frames in response to receiving the one or more predicted user inputs to reduce the latency in execution of the game.

In an embodiment, a system for reducing latency in execution of a game is described. The system includes a first node and a second node. The first node receives via a computer network a user input associated with the game and determines from the user input a current state of the game. The second node is coupled to the first node. The second node receives the user input associated with the game from the first node and predicts a next state of the game based on the user input and one or more predicted user inputs while the current state of the game is being determined. The second node further generates one or more predicted image frames from the next state, determines whether the one or more predicted user inputs are received via the computer network, and sends the one or more predicted image frames in response to receiving the one or more predicted user inputs to reduce the latency during execution of the game.

In an embodiment, a computer-readable medium containing program instructions for reducing latency in execution of a game is described. Execution of the program instructions by one or more processors of a computer system causes the one or more processors to carry out a plurality of operations of the method for reducing latency in execution of a game, described above.

Some advantages of herein described systems and methods for predicting states by using a distributed game engine are described. A state is predicted and one or more frames for the predicted state are generated before a user input for the predicted state is received by a distributed game engine. When the user input is received, the frames are sent via a computer network to a client device for display of images and for generation of sound according to the frames. Latency in generating the frames after the user input is received is reduced or eliminated. A speed with which images are provided to the client device and a speed of execution of an application, such as a game application, are increased.

BRIEF DESCRIPTION OF THE DRAWINGS

Various embodiments of the present disclosure are best understood by reference to the following description taken in conjunction with the accompanying drawings in which:

FIG. 2A is a diagram of an embodiment of a portion of a system to illustrate that when a state 1 is being generated by a node A, a predicted state 2 is being generated by another node 1.

FIG. 2B is a diagram of an embodiment of another portion of the system of FIG. 2A to illustrate that when the state 1 is being generated by the node A, the predicted state 2 is being generated by the other node 1.

FIG. 3A is a diagram of an embodiment of a system to illustrate a distributed gaming engine and a distributed predictor engine.

FIG. 3B is a diagram of an embodiment of a system to illustrate that image frames and audio frames for the predicted state 2 are generated during a time period in which a virtual object that is controlled by a user A via a client device is at a position c.

FIG. 3C is an embodiment of a distributed game engine system to illustrate that while the predicted state 2 is being generated, a user input 1' received by the distributed game engine system from the client device via a computer network, acts as a trigger of generation of a state 1'.

FIG. 3D is a diagram to illustrate that a virtual object or an artificial intelligence (AI) entity or an AI virtual object is rendered and added to a virtual background when the user input 1' is received instead of receiving a user input 2 for the predicted state 2.

FIG. 4A is a diagram of an embodiment of a system to illustrate that the node 1 is used to execute a broad phase detection that virtual objects are likely to collide in a virtual scene and another node 2 to is used to execute a narrow phase detection to determine contact points of collision of the virtual objects.

FIG. 4B is a diagram of an embodiment of a system to illustrate that a high-quality graphics job is dispatched from the node 1 to the node 2.

FIG. 4C is a diagram of an embodiment of a system to illustrate an assignment of one or more tasks associated with a physics prediction engine from the node 1 to the node 2.

DETAILED DESCRIPTION

Systems and methods for predicting states by using a distributed game engine are described. It should be noted that various embodiments of the present disclosure are practiced without some or all of these specific details. In other instances, well known process operations have not been described in detail in order not to unnecessarily obscure various embodiments of the present disclosure.

Figure 1:
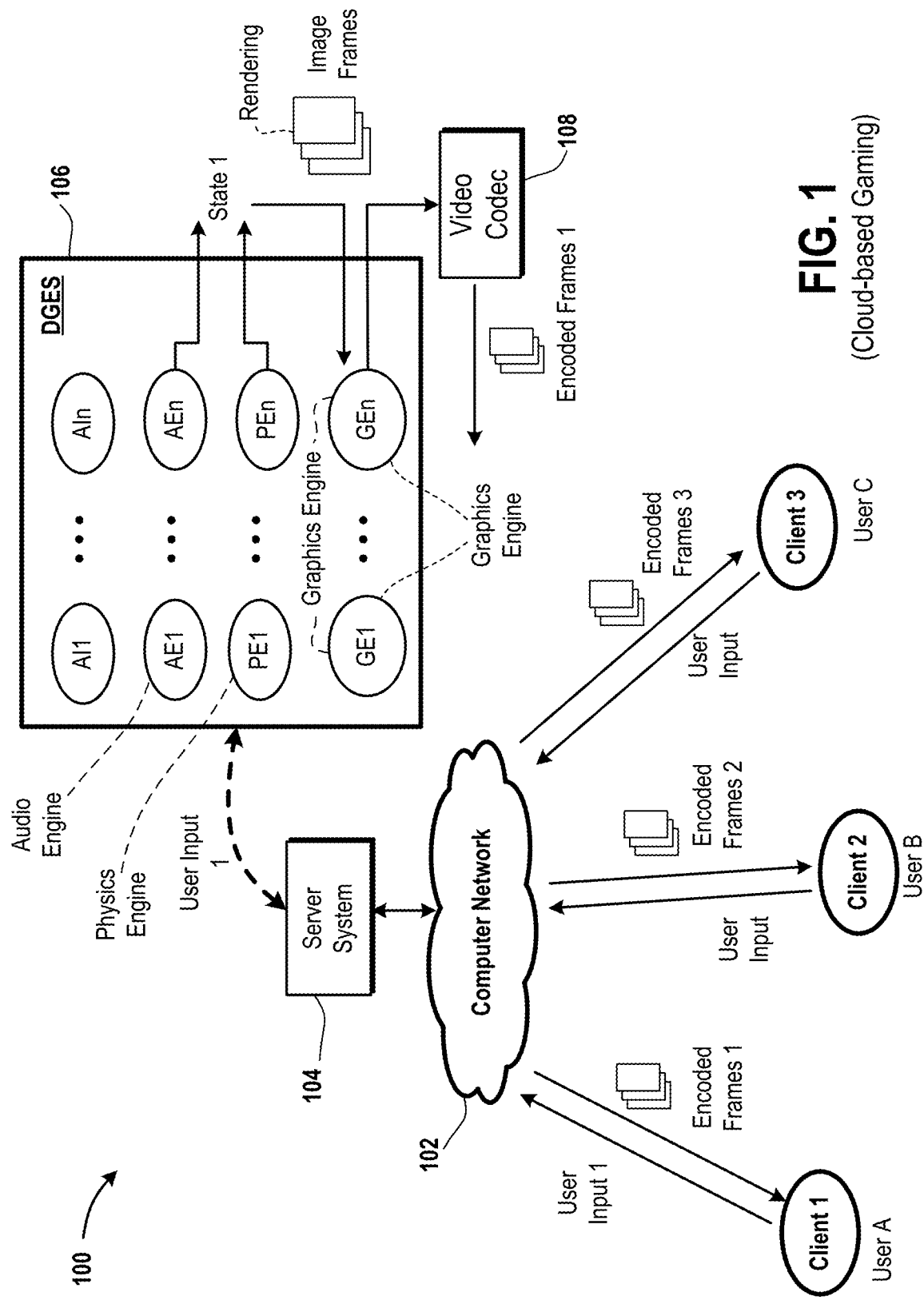
FIG. 1 is a diagram of an embodiment of a system to describe an application, such as a video game or a video conferencing application.

FIG. 1 is a diagram of an embodiment of a system 100 to describe an application, such as a video game or a video conferencing application. Examples of the application include a multiplayer game and a single player game. In the multiplayer game, multiple players access the video game from a server system 104. For example, a first avatar is controlled by a user A to play the multiplayer game and a second of the car is controlled by another user B to play the multiplayer game. Moreover, in the multiplayer game there can be non-playable characters (NPCs), which are controlled by artificial intelligence (AI). The AI is executed and controlled by the server system 104 instead of a user. The AI NPC is a type of a virtual object that is not controlled by a user via a client device. In the single player game, one or more players access the video game from the server system 104. As an example, an avatar is controlled by the user A to play the single player game and the same avatar is controlled by the user B to play the single player game.

The system 100 includes the server system 104, a computer network 102, and multiple client devices 1, 2, and 3. The server system 104 includes one or more servers, which can be server blades or game consoles. Each server includes one or more processors and one or more memory devices. The one or more processors of the server are coupled to the one or more memory devices. Examples of a processor, as used herein, include a central processing unit (CPU), a microprocessor, a microcontroller, an application specific integrated circuit (ASIC), and a programmable logic device (PLD). A memory device, in one embodiment, is a device from which data is read or to which the data is written. Examples of a memory device include a read-only memory (ROM) device, or a random access memory (RAM) device, or a combination thereof. To illustrate, a memory device includes a flash memory, a cache, or a redundant array of independent disks (RAID).

The computer network 102 is used to transfer data, such as video data and audio data, between a client device and a server, or between a client device and a node, or between multiple nodes, or between multiple servers, or between multiple client devices, etc., to facilitate an operation of a distributed game engine system (DGES) 106, which includes a distributed gaming engine and a distributed predictor engine. Examples of the computer network 102 include a wide area network (WAN) such as Internet, or a local area network (LAM) such as the Internet, or a combination thereof.

A client device, as used herein, is a device that is operated by a user to gain access to the application that is executed by the distributed game engine system 106. Examples of a client device include a computer, a tablet, a game console, a smart phone, a hand-held controller, a head-mounted display (HMD), a combination of a television, the game console, and the hand-held controller, and a combination of the HMD, the hand-held controller, and the game console. Examples of the hand-held controller include a DualShock™ controller and a Move™ motion controller, both of which are available from Sony™ corporation. In the combinations that include the game console and the hand-held controller, the game console is coupled via a wired or a wireless connection to the hand-held controller. Moreover, in the combination of the HMD, the hand-held controller, and the game console, the HMD is coupled to the game console via a wired connection or a wireless connection. An example of a wired connection includes a serial transfer cable or a parallel transfer cable or a Universal Serial Bus (USB) cable. Examples of the wireless connection include a Bluetooth™ connection and a Wi-Fi™ connection.

The game console, or the HMD, or the hand-held controller, or a combination thereof includes one or more cameras to capture gestures, such as a change to a position or a change to an orientation or a combination thereof, of an input device, e.g., the hand-held controller, the HMD, a mouse, a keypad, a joystick, a touchpad, a touch screen, etc., of the client device or movement of a body part of the user A. Examples of the body part include an arm, a hand, a leg, a wrist, one or more fingers, a leg, a knee, an eye, a head, etc. An HMD, as used herein, is a display device that is worn by a user to view a virtual scene, such as a virtual reality (VR) scene or an augmented reality (AR) scene. Also, the television is an example of a display device and includes a display screen. Examples of a display device, as used herein, include a liquid crystal display (LCD) device, a light emitting diode display (LED) device, and a plasma display device. The VR scene or the AR scene is generated upon execution of the application by the distributed game engine system 106.

The server system 104 includes multiple nodes that operate collectively as the distributed game engine system 106. For example, the distributed game engine system 106 includes multiple AI engines AI1 through AIn, where n is an integer greater than one. Moreover, the distributed game engine system 106 includes multiple audio engines (AEs) AE1 through AEn, multiple physics engines PE1 through PEn, and multiple graphics engines (GEs) GE1 through GEn, where n is an integer greater than one. In one embodiment, the distributed game engine system 106 further includes multiple animation engines, multiple networking engines, multiple memory management engines, multiple screaming engines, and/or multiple scripting engines. Each AI engine AI1 through AIn, audio engine AE1 through AEn, physics engine PE1 through PEn, and graphics engine GE1 through GEn is a portion of the distributed game engine system 106. In an embodiment, an engine, as used herein, is a software engine. The software engine is a library, software development kit (SDK), or an object to denote a block of functionality. The software engine is executed by one or more processors, such as a graphics processing unit (GPU) and a central processing unit (CPU). In one embodiment, each engine, as used herein, is a virtual machine (VM). In an embodiment, each engine is a processor or a hardware device. In one embodiment, each engine is a neural network or a part of a neural network.

The distributed game engine system 106 stores the application, e.g., a game computer program, a computer program for generating a VR scene, a computer program for generating an augmented reality AR scene, a physics software program for applying the laws of physics for generating the VR scene or the AR scene, a rendering computer program for applying a rendering operation for generating the VR scene or the AR scene. As an example, a portion of the application is stored and executed by a node A of the distributed game engine system 106, another portion of the application is stored and executed by another node 1 of the distributed game engine system 106, and the remaining portion of the application is stored and executed by yet another node 2 of the distributed game engine system 106. A node, as used herein, is a hardware server or a game console or a hardware server of the distributed game engine system 106 for execution of at least a portion of the application. As an example, a node has a separate housing than a housing of another node. As another example, a node is placed on a different rack of a data center than a rack on which another node is placed within the data center. As yet another example, a node of the distributed game engine system 106 is located within a different data center than another node of the distributed game engine system 106.

In an embodiment, multiple nodes are located within a single housing. For example, in case of PlayStation Now™ servers, a single housing is shared by multiple nodes. When multiple nodes are housed in the single housing, each node has its own network connectivity to the computer network 102 via a network communication device. However, as an alternative, the single housing includes a network communication device, and the nodes are coupled via the same network communication device to the computer network 102. The single housing having multiple nodes allows for better connectivity in terms of throughput and latency.

In one embodiment, a node is a virtual machine, which is an emulation of a computer system. In the virtual machine, a hypervisor is a computer software or hardware or a combination thereof that shares and manages hardware resources, such as processors and memory devices, to run the application on top on one or more operating systems. As an example, a virtual machine includes an operating system, one or more application computer programs that run on top of the operating system, and one or more hardware resources, e.g., central processing units, graphical processing units, video encoders, audio encoders, video codecs, audio codecs, video decoders, audio decoders, network communication devices, memory devices, internal communication devices, etc., that are accessed by the one or more application computer programs via the operating system and the hypervisor for performing the functions described herein as being performed by a node. The application, described above, is an example of the application computer programs.

Moreover, in an embodiment, a physics engine applies the laws of physics to determine a position and an orientation of a virtual object or a virtual background of a virtual scene, which can be a VR scene or an AR scene. Examples of a virtual object, as used herein, include a virtual gun, a virtual spear, a virtual boulder, a virtual weapon, an avatar, a virtual character, etc. Examples of the virtual background, as used herein, include a virtual room, a virtual natural environment, virtual trees, a virtual ocean, and a virtual environment in which a virtual object is located. In one embodiment, the terms virtual backdrop and virtual background are used herein interchangeably. The virtual object or the virtual background is controlled by the user A via the client device 1. In one embodiment, the virtual object or the virtual background are controlled by AI instead of the user A. Multiple positions and multiple orientations define movement of a virtual object or a virtual background. The physics engine is a computer program that is executed to determine physical relationships between different portions in a virtual scene and between different virtual scenes. The physical relationships are determined based on laws of physics, such as, gravitational laws, motion laws, friction laws, etc.

In one embodiment, an AI engine determines movement and functionality of a virtual object or a virtual character in the video game and the virtual object or the virtual character cannot be controlled by a user via a client device.

In an embodiment, an audio engine determines and provides audio data for a corresponding virtual scene of a game. For example, when a portion of a virtual scene makes a sound, the audio engine determines audio data for outputting the sound and other variables of the sound, e.g., pitch, tone, amplitude, etc., and links the audio data with the portion of the virtual scene.

In an embodiment, a graphics engine is a rendering engine or a renderer or a rendering operation that applies graphics, such as color, texture, shade, intensity, lighting, or a combination thereof, to a two-dimensional (2D) model or a three-dimensional (3D) model of a virtual object to create a 2D or 3D representation of the virtual object and applies the graphics to a 2D or 3D model of a virtual background to create a representation of the virtual background to output one or more image frames. A model, as used herein, of the virtual object has the positions and orientations of the virtual object and a model of the virtual background has the positions and orientation of the virtual background. For instance, a model is a grid having vertices, which defines a shape of a virtual object or a virtual background. The shape is defined according to positions and orientations calculated for the virtual object or the virtual background. The rendering engine generates an image from the 2D or 3D model of one or more portions, such as a virtual object or a virtual background, of a virtual scene. For example, the rendering engine defines colors, texturing, shading, and light intensities that are applied to one or more portions of a virtual scene.

The server system 104 includes a video codec 108 to encode one or more image frames to output one or more encoded image frames and decode one or more encoded image frames to output one or more decoded image frames. For example, the video codec 108 is implemented as one or more processors or as computer software to compress or decompress one or more image frames using a video encoding protocol, such as H.264. The video encoding protocol is also a video decoding protocol. As another example, the video codec 108 is a hardware device, e.g., an integrated circuit, a processor, etc., or a software module, e.g., a computer program, etc., or a combination thereof, that compresses or decompresses image frames according to a video file format or a streaming video format or the video encoding protocol, e.g., H.264, H.265/MPEG-H, H.263/MPEG-4, H.262/MPEG-2a, customized protocol, etc. In an embodiment, the terms compress and encode are used herein interchangeably and the terms decompress and decode are used herein interchangeably.

In one embodiment, in addition to the video codec 108, an audio codec is used in the system 100 to apply an audio encoding protocol to encode audio data to output one or more encoded audio frames and to apply an audio decoding protocol to decode audio frames to output one or more decoded audio data. The audio encoding protocol is also an audio decoding protocol. The audio codec is a hardware device, e.g., an integrated circuit, a processor, etc., or a software module, e.g., a computer program, etc., or a combination thereof, that compresses or decompresses audio data according to an audio file format or a streaming audio format.

The user A operates the client device 1 to access the application stored on the server system 104. For example, the user A logs into his/her user account stored on the server system 104 via a website or a user application to access the application stored on the server system 104. Once the application is accessed, the user A uses the client device 1 to provide a user input 1. An example of the user input 1 is a selection of a button on the client device 1 or a touch on the client device 1 or a gesture made by the user A with his/her body part or with the client device 1. In an embodiment, a user input includes one or more movements of one or more joysticks of the client device 1, or one or more gestures made by the user A, or one or more selections of one or more buttons on the client device 1.

The user input 1 is sent from the client device 1 via the computer network 102 to the server system 104 to change a state of the application. For example, one or more of the physics engines PE1 through PEn output one or more positions of a virtual object, one or more orientations of the virtual object in a virtual scene, one or more positions of a virtual background, and one or more orientations of the virtual background in a virtual scene. Also, one or more of the audio engines AE1 through AEn output audio data to be uttered by the virtual object, output audio data to be output by an AI in the virtual scene and output audio data to be output with the virtual background. In addition, one or more of the AI engines AI1 through AIn output one or more positions and one or more orientations of an AI in the virtual scene. One or more of the graphics engines GE1 through GEn provides graphics, such as color, texture, intensity, shading, lighting, etc., to a model of the virtual object, a model of the AI, and a model of the virtual background within the virtual scene to output one or more image frames. The virtual object in the virtual scene is controlled by the user input 1 and can be an avatar or a representation of the user A.

The video codec 108 receives the one or more image frames, generated based on the user input 1, from one or more of the graphics engines GE1 through GEn and encodes the one or more image frames to output a video stream of encoded video frames 1. In addition, the audio codec receives the audio data, generated based on the user input 1, output from the one or more of the audio engines AE1 through AEn and encodes the audio data to output one or more encoded audio frames. The encoded video frames 1 and the encoded audio frames are packetized by the server system 104 by applying an external communication protocol, such as a Transmission Control Protocol (TCP) over Internet Protocol (IP), to generate packets. The packets are sent from the server system 104 via the computer network 102 to the client device 1.

The client device 1 receives the packets from the server system 104, applies the external communication protocol to depacketize the packets to extract the encoded video frames 1 and the encoded audio frames from the packets. In addition, the client device 1 applies the video decoding protocol to decompress or decode the encoded video frames 1 to obtain the image frames and applies the audio decoding protocol to decompress or decode the encoded audio frames to obtain the audio frames. The audio data of the audio frames is output as sound by the client device 1. Moreover, the image frames are displayed as images on a display device of the client device 1. Examples of a display device, as used herein include a liquid crystal display (LCD) device, a light emitting diode (LED) display device, and a plasma display device.

Similarly, a user input is received from the client device 2 by the server system 104 via the computer network 102 to output encoded frames 2, which include encoded video frames and encoded audio frames. The encoded frames 2 are sent from the server system 104 via the computer network 102 to the client device 2 to display one or more images on a display device of the client device 2 and to output sound on the client device 2. The client device 2 is operated by the user 2 and can be used to control an avatar, which is different than an avatar that is controlled by the user A via the client device 1. Also, similarly, a user input is received from a client device 3 by the server system 104 via the computer network 102 to output encoded frames 3, which include encoded video frames and encoded audio frames. The encoded frames 3 are sent from the server system 104 via the computer network 102 to the client device 3 to display one or more images on a display device of the client device 3 and to output sound on the client device 3. The client device 3 is operated by the user 3 and can be used to control an avatar, which is different than the avatar controlled by the user A via the client device 1. Also, the client device 3 can be used to control an avatar, which is different than the avatar controlled by the user B via the client device 2.

Figure 2C:
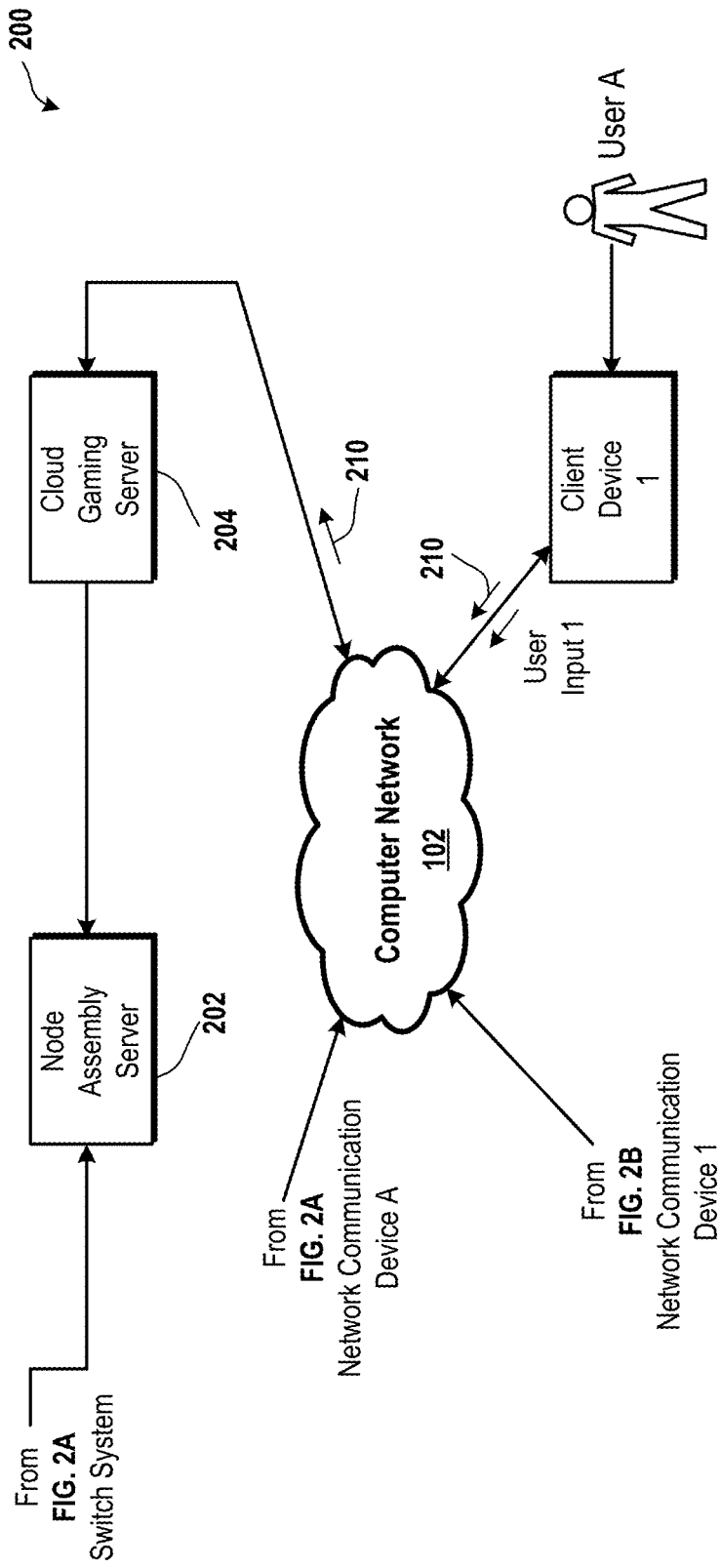
FIG. 2C is a diagram of a remaining portion of the system of FIGS. 2A and 2B.

FIG. 2A is a diagram of an embodiment of a portion of a system 200 to illustrate that when a state 1 is being generated by the node A, a predicted state 2 is being generated by the node 1. FIG. 2B is a diagram of an embodiment of another portion of the system 200 to illustrate that when the state 1 is being generated by the node A, the predicted state 2 is being generated by the node 1. The state 1 is sometimes referred to herein as a current state and the predicted state 2 is sometimes referred to herein as a next state. FIG. 2C is a diagram of a remaining portion of the system 200. The system 200 includes the node A and the node 1. Moreover, the system 200 includes the computer network 102, a node assembly server 202, a cloud gaming server 204, and the client device 1. In addition, the system 200 includes a switch system 206.

The switch system 206 includes one or more switches that facilitate a transfer of data between the node assembly server 202 and two or more of nodes A, B (not shown), and C (not shown), described herein. For example, the switch system 206 is a switch fabric. The switch fabric provides a large amount of bandwidth among the two or more nodes A, B, and C, and is dynamically reconfigured often and allows for Quality of Service (QoS). To illustrate, the QoS facilitates reducing congestion on links when there is not enough capacity among the two or more nodes and the QoS retries sending data. Some of the two or more nodes A, B, and C, in time, starts processing data for remaining of the two or more nodes A, B, and C lacking capacity. As another example, the switch system 206 includes a multiplexer that selects among the two or more nodes A, B, and C that are to form the distributed game engine system 106 and to which data is transferred from the node assembly server 206 and from which data is transferred via the computer network 102 to one or more of the client devices 1, 2, and 3 (FIG. 1). As another example, the switch system 206 includes one or more transistors that facilitate a transfer of data between the node assembly server 202 and the two or more nodes A, B, and C. As yet another example, the switch system 206 includes one or more switches, each of which changes its position between an open position and a closed position. The open position of a switch decouples the node assembly server 202 from a node that is coupled to the switch. The closed position of the switch couples the node assembly server 202 to a node that is coupled to the switch. In one embodiment, the nodes A, B, and C are nodes of the distributed gaming engine, and nodes 1, and 2, described herein, are nodes of the distributed predictor engine.

The cloud gaming server 204 and the client devices 1, 2, and 3 are coupled to the computer network 102. Moreover, the node assembly server 202 is coupled to the cloud gaming server 204.

The node A includes a central processing unit A (CPU A), a memory device A, another central processing unit A1 (CPU A1), a memory device A1, a graphics processing unit A (GPU A), a GPU memory device A, an internal communication device A, a network communication device A, an audio encoder A, and a video encoder A. Components, such as the CPU A, the memory device A, the CPU A1, the memory device A1, the GPU A, the GPU memory device A, the internal communication device A, the network communication device A, the audio encoder A, and the video encoder A, of the node A are coupled with each other via a bus A.

A GPU, as used herein, executes a rendering computer program to generate a video frame, which includes state information, such as color, texture, intensity, shading, and lighting, of an AR scene or a VR scene. Examples of the GPU include a processor, an ASIC, and a PLD. In one embodiment, the terms "video frame" and "image frame" are used interchangeably herein.

An internal communication device, as used herein, is used to communicate data between one node and another node. The internal communication device applies an internal communication protocol, e.g., a direct memory access (DMA) protocol, a remote DMA (RDMA) protocol, RDMA over converged Ethernet, Infiniband, an Ethernet protocol, a customized protocol, a serial transfer protocol, a parallel transfer protocol, the USB protocol, a wireless protocol, a Bluetooth protocol, a wired protocol, a universal datagram protocol (UDP), a UDP over Internet protocol, a Transmission Control Protocol (TCP) over IP protocol, an Ethernet over TCP/IP protocol, etc., to communicate the data between two nodes. As an example of DMA, an internal communication chip, such as a PCI Express non-transparent switch chip, an RDMA chip, or an RDMA over converged Ethernet chip, or an Infiniband chip, of a node communicates via a peripheral component interconnect-express (PCIe) communication bus to directly write to a memory device in one or more other nodes or read from the memory device. Moreover, in communication busses like PCIe, peripherals such as GPUs and other devices are memory based as each peripheral has an assigned memory address space on the bus. To illustrate, a GPU of one node applies the internal communication protocol to write to or read from a register or a buffer of a GPU of another node. In this manner, a node communicates with another node through shared mailbox registers. There is an interruption in a portion of the application or the application running on a CPU of a node when another node reads to or writes from the node. The other node sends an interrupt signal before reading to or writing from the node.

Examples of an internal communication device, as used herein, include a processor, an ASIC, and a PLD. To illustrate, the internal communication device is a PCI Express non-transparent switch chip or an RDMA chip, or an RDMA over converged Ethernet chip, or an Infiniband chip. As another illustration, the internal communication device is a network interface controller or a network interface card (NIC), a device that communicates using a serial transfer of data, a device that communicates using a parallel transfer of data, or a device that communicates using the USB protocol.

It should be noted that PCI-Express and RDMA technology has significantly lower latency and offers higher performance compared to the Ethernet protocol or TCP protocol or UDP protocol, because it eliminates protocol layers which produce overhead in operating systems executed by a CPU. A DMA engine within a node executing the DMA protocol directly reads from or writes to memory in other nodes bypassing the operating system within the node when the node has been granted access to blocks of data within the other nodes. There is no network protocol, such as the Ethernet protocol or TCP protocol or UDP protocol, and the DMA engine of the node decides how it organizes memory and its internal structure. If memory transfer operation between a node and other nodes are called for, the internal communication chip of a node executes a DMA engine to read and write data from the other nodes without involving a CPU of the node.

In one embodiment, one node described herein, is coupled to another node, also described herein, via a cable or the computer network 102. For example, the node A is coupled to the node 1 via a coax cable, a USB cable, or via the Internet. As another example, the node 1 is coupled to another node 2 via a cable or the computer network 102.

A network communication device is used to transfer data packets between a node and a client device via the computer network 102. For example, the network communication device applies the external communication protocol, e.g., TCP/IP, UDP/IP, etc., to receive and send data packets. Examples of a network communication device include a processor, an ASIC, and a PLD. To illustrate, the network communication device is a network interface controller or a NIC.

Similarly, the node 1 includes a central processing unit 1 (CPU 1), a memory device 1, another central processing unit 1a (CPU 1a), a memory device 1a, a graphics processing unit 1 (GPU 1), a GPU memory device 1, an internal communication device 1, a network communication device 1, an audio encoder 1, and a video encoder 1. Components, such as the CPU 1, the memory device 1, the CPU 1a, the memory device 1a, the GPU 1, the GPU memory device 1, the internal communication device 1, the network communication device 1, the audio encoder 1, and the video encoder 1, of the node 1 are coupled with each other via a bus 1.

The client device 1 generates and sends a game request 210 via the computer network 102 to the cloud gaming server 204. For example, the user A uses the input device of the client device 1 to select one or more buttons on the input device to generate the game request 210. The cloud gaming server 204 determines based on the game request 210 whether the user account that is accessed by the user A of the client device 1 to generate the game request 210 is authorized to access the distributed game engine system 106. The user A of the client device 1 provides login information, e.g., user name, password, etc., via the input device of the client device 1 to access the user account. When the login information is authenticated by the cloud gaming server 204, the user A of the client device 1 is provided access to the user account. Upon determining that the user account of the user A is authorized to access the distributed game engine system 106, the cloud gaming server 204 sends a signal to the node assembly server 202 for enabling access to execution of the application via the client device 1 and the computer network 102. The application is executed by one or more of the nodes A, B, C, 1, and 2 of the distributed game engine system 106 (FIG. 1).

In one embodiment, in addition to the authentication of the login information, there are additional operations that are performed before enabling the client device 1 to couple to the node assembly server 202 for accessing the application being executed by the distributed game engine system 106. For example, a network test server (not shown) coupled to the computer network 102 receives a signal from the cloud gaming server 204 for accessing the application executed by the distributed game engine system 106 and executes a bandwidth ping to multiple data centers having the distributed game engine system 106. Results of the test are provided to a cloud resource manager (not shown) by the network test server. The cloud resource manager is a server coupled to the computer network 102. The cloud resource manager determines which of the data centers are to be connected to the client device 1 for access to the application. This determination is based on the test results and other information, such as, availability of sufficient number of nodes and in which of the data centers the application is stored. The cloud resource manager selects one or more of the data centers having one or more of the nodes A, B, C, 1, and 2, and sends a signal to the node assembly server 202 to select the one or more of the nodes A, B, C, 1, and 2.

The node assembly server 202 upon receiving the signal from the cloud resource manager selects, via the switch system 206, one or more of the nodes A, B, C, 1, and 2 of the distributed game engine system 106 that will execute the application to initialize the one or more of the nodes A, B, C, 1, and 2. For example, the node assembly server 202 sends a signal to a control input of the switch system 206 to couple to the nodes A and 1 or to the nodes A and B or to the nodes 1 and 2 or to the nodes A, 1, and 2. Upon receiving the signal at the control input, the switch system 206 closes positions of one or more of the switches to connect the node assembly server 202 to corresponding one or more of the nodes of the distributed game engine system 106 coupled to the one or more of the switches, and opens a position of remaining of its switches to disconnect the remaining nodes of the distributed game engine system 106 from the node assembly server 202. Upon being connected via the switch system 206 to the node assembly server 202, one or more of the nodes A, B, C, 1, and 2 of the distributed game engine system 106 execute the application to transfer encoded frames from the one or more of the nodes A, B, C, 1, and 2 via the computer network 102 to the client device 1.

After one or more of the nodes A, B, C, 1, and 2 are selected by the switch system 206, the user A uses the input device of the client device 1 to provide the user input 1 via the computer network 102 to the node A. For example, when the user A selects one or more buttons on the input device of the client device 1, or moves the input device 1, or a combination thereof, the user input 1 is generated. As another example, the user input 1 includes one or more image frames of movement of the input device or of the body part of the user A or a combination thereof. The image frames are captured by one or more cameras of the client device 1. The user input 1 is packetized using the external communication protocol by the client device 1 to generate one or more packets, which are sent from the client device 1 via the computer network 102 to the network communication device A of the node A. The network communication device A applies the external communication protocol to depacketize the one or more packets having the user input 1 to extract the user input 1 and provides the user input 1 to the CPU A.

The CPU A analyzes the user input 1 to determine a change in position and orientation of the input device of the client device 1, or to determine whether there is a selection of a button on the input device, or to determine whether there is a change in position and orientation of the body part of the user A, or a combination thereof. The CPU A executes a physics engine to determine one or more positions and one or more orientations of a virtual object within a virtual scene, controlled by the user A using the input device of the client device 1. The one or more positions and the one or more orientations of the virtual object correspond to the change in the position and orientation of the input device of the client device 1 or to the change in the position and orientation of the body part of the user A or to the selection of the button on the input device, or a combination thereof. The CPU A further applies an audio engine to determine audio data corresponding to the one or more positions and the one or more orientations of the virtual object for the state 1. The one or more positions of the virtual object for the state 1, the audio data to be output by the virtual object for the state 1, and the one or more orientations of the virtual object for the state 1 are stored by the CPU A in the memory device A. In an embodiment, a virtual background is an example of a virtual object. For example, a virtual background is a virtual object in a virtual scene and another virtual object is also present in the virtual scene. One or both of these virtual objects are controlled by the user A via the client device 1.

Moreover, the CPU A1 accesses the one or more positions of the virtual object for the state 1, the audio data to be output by the virtual object for the state 1, and the one or more orientations of the virtual object for the state 1 from the memory device A. The CPU A1 applies an AI engine to the one or more positions of the virtual object for the state 1, the audio data to be output by the virtual object for the state 1, and the one or more orientations of the virtual object for the state 1. The AI engine is applied by the CPU A1 to determine one or more positions of one or more AIs in the virtual scene having the virtual object controlled by the user A, one or more orientations of the one or more AIs, and audio data corresponding the one or more positions and the one or more orientations. The one or more positions of the one or more AIs in the virtual scene having the virtual object controlled by the user A, the one or more orientations of the one or more AIs, and the audio data corresponding the one or more positions and the one or more orientations are for the state 1. Also, the audio data corresponding the one or more positions and the one or more orientations of the one or more AIs are to be output by the one or more AIs. The one or more positions of the one or more AIs for the state 1, the one or more orientations of the one or more AIs for the state 1, and the audio data to be output by the one or more AIs for the state 1 are stored by the CPU A1 in the memory device A1.

The GPU A accesses the one or more positions of the virtual object and the one or more orientations of the virtual object from the memory device A, and accesses the one or more positions of the one or more AIs and the one or more orientations of the one or more AIs from the memory device A1, and applies a rendering engine to the positions and the orientations of the virtual object and the one or more AIs to generate one or more image frames for the state 1. The image frames for the state 1 are stored in the GPU memory device A by the GPU A.

The audio encoder A accesses the audio data for the virtual object from the memory device A and the audio data for the one or more AIs from the memory device A1 to generate one or more audio frames, and encodes the audio frames for the state 1 to output one or more encoded audio frames for the state 1. Similarly, the video encoder A accesses the image frames for the state 1 from the GPU memory device A and encodes the image frames to output one or more encoded image frames for the state 1.

The network communication device A receives the encoded image frames for the state 1 from the video encoder A and the encoded audio frames for the state 1 from the audio encoder A, and applies the external communication protocol to encoded frames for the state 1 to generate one or more packets for the state 1. The encoded frames for the state 1 include the encoded image frames for the state 1 and the encoded audio frames for the state 1. The network communication device A sends the packets for the state 1 via the computer network 102 to the client device 1 for display of one or more images for the state 1 on the display device of the client device 1 and for output of sound via the client device 1. The images are generated based on the encoded image frames for the state 1 and the sound is output based on the encoded audio frames for the state 1.

The CPU A stores the user input 1 in the memory device A. While the physics engine is being applied by the CPU A, the audio engine is applied by the CPU A, the AI engine is applied by the CPU A1, and/or the graphics engine is being applied by the GPU A, the node 1 applies its physics prediction engine, audio prediction engine, AI prediction engine, and/or graphics prediction engine to determine the predicted state 2, which is an example of a state next to the state 1 or of a next state. For example, during a time period in which the physics engine is being applied by the CPU A, the audio engine is applied by the CPU A, the AI engine is applied by the CPU A1, and/or the graphics engine is being applied by the GPU A, the CPU A determines that the predicted state 2 is to be generated. Upon determining that the predicted state 2 is to be generated, CPU A instructs the internal communication device A of the node A to access the user input 1 from the memory device A and provide the user input 1 to the node 1 for access by the CPU 1 of the node 1. The internal communication device A of the node A applies the internal communication protocol to the user input 1 to generate one or more transfer units having the user input 1 and sends the transfer units to the node 1. The internal communication device 1 of the node 1 receives the one or more transfer units having the user input 1 from the internal communication device A of the node A and applies the internal communication protocol to parse the one or more transfer units to obtain the user input 1 from the one or more transfer units. The user input 1 is stored by the internal communication device 1 in the memory device 1 of the node 1. For example, the internal communication device 1 receives an instruction from the CPU A of the node A via the internal communication device A to store the user input 1 in the memory device 1 for access by the CPU 1.

The CPU 1 of the node 1 accesses the user input 1 from the memory device 1 and determines movement, such as one or more positions, or one or more orientations, or a combination thereof, of a virtual object controlled by the user A via the client device 1. The movement is determined for the predicted state 2 from a user input 2 that is predicted and a user input 3 that is also predicted. For example, the CPU 1 applies the laws of physics to predict additional movement of the virtual object in case the user input 2 is received from the client device 1 via the computer network 102 and to predict further movement of the virtual object in case the user input 3 is received from the client device 1 via the computer network 102. The user inputs 2 and 3 are examples of predicted user inputs, which are not actually received yet at a time the movement of the virtual object for the predicted state 2 is determined. It is predicted by the CPU 1 that the user inputs 2 and 3 will be received or that there is a probability that the user inputs 2 and 3 will be received or there is a possibility that the user inputs 2 and 3 will be received after receiving the user input 1. The user input 2 is predicted by the CPU 1 to be received sequentially from the client device 1 after receiving the user input 1 and the user input 3 is predicted by the CPU 1 to be received sequentially after receiving the user input 2. As an example, the predicted state 2 includes a position and an orientation of a virtual object based on or corresponding to the user input 2, and further includes a position and an orientation of the virtual object based on or corresponding to the user input 3. The virtual object is controlled by the user A via the client device 1. The laws of physics that are applied by the CPU 1 are a part of a physics prediction engine. The CPU 1 also determines audio data corresponding to the positions and the orientations of the virtual object for the predicted state 2. The CPU 1 stores the positions and orientations of the virtual object for the predicted state 2 and the audio data to be output by the virtual object for the predicted state 2 in the memory device 1 of the node 1. In one embodiment, the movement is determined for the predicted state 2 from the user input 2, or from any other number of user inputs, such as three, four, or five user inputs.

Moreover, the CPU 1a accesses the positions and orientations of the virtual object and the audio data to be output by the virtual object for the predicted state 2 from the memory device 1 and applies an AI prediction engine to determine one or more positions and one or more orientations of one or more AIs in one or more virtual scenes for which the positions and orientations of the virtual object for the predicted state 2 are determined. For example, the CPU 1a determines a position and orientation of an AI in a virtual scene in which the virtual object controlled by the user A via the client device 1 has a position and orientation, which are determined based on the user input 2 or based on the user inputs 2 and 3. As another example, the CPU 1a determines that a virtual object that is controlled by AI or by the CPU 1a is to move to the right or stand in a virtual scene when another virtual object that is controlled by the user A via the client device 1 runs left or sits in the virtual scene.

Moreover, the CPU 1a applies an audio prediction engine to generate audio data to be output by the one or more AIs for the predicted state 2 based on the audio data that is to be output by the virtual object for the predicted state 2. The CPU 1a stores the one or more positions and the one or more orientations of the one or more AIs and the audio data to be output by the one or more AIs for the predicted state 2 in the memory device 1a.

The GPU 1 of the node 1 accesses the positions of the virtual object and the orientations of the virtual object for the predicted state 2 from the memory device 1, and accesses the one or more positions and the one or more orientations of the one or more AIs for the predicted state 2 from the memory device 1a, and applies a graphics prediction engine, which is a rendering engine, to the positions and the orientations to generate one or more image frames for the predicted state 2. The image frames for the predicted state 2 are stored in the GPU memory device 1 by the GPU 1. For example, the image frames for the predicted state 2 are stored in one or more caches of the GPU memory device 1.

The audio encoder 1 accesses the audio data for the virtual object from the memory device 1 and the audio data for the one or more AIs from the memory device 1a to generate one or more audio frames, and encodes the audio frames for the predicted state 2 to output one or more encoded audio frames for the predicted state 2. Similarly, the video encoder 1 accesses the image frames for the predicted state 2 from the GPU memory device 1 and encodes the image frames to output one or more encoded image frames. The audio encoder 1 stores the encoded audio frames for the predicted state 2 in a memory device of the audio encoder 1 and the video encoder 1 stores the encoded image frames for the predicted state 2 in a memory device of the video encoder 1.

When the user inputs 2 and 3 are actually received by the node A via the computer network 102 from the client device 1, the CPU A of the node A sends the user inputs 2 and 3 to the internal communication device A. For example, the network communication device A of the node A receives the user inputs 2 and 3 from the client device 1 via the computer network 102. The internal communication device A applies the internal communication protocol to the user inputs 2 and 3 to generate one or more transfer units having the user inputs 2 and 3, and sends the transfer units to the internal communication device 1 of the node 1. The internal communication device 1 receives the transfer units and applies the internal communication protocol to the transfer units to obtain the user inputs 2 and 3 from the transfer units and provides the user inputs 2 and 3 to the CPU 1.

The CPU 1 determines that the user inputs 2 and 3, which are actually received, matches the user inputs 2 and 3 for which the encoded image frames and the encoded audio frames for the predicted state 2 are generated by the node 1. Upon determining so, the CPU 1 sends a signal to the network communication device 1 of the node 1. The network communication device 1 accesses the encoded image frames for the predicted state 2 from the memory device of the video encoder 1 and the encoded audio frames for the predicted state 2 from the memory device of the audio encoder 1, and applies the external communication protocol to the encoded image frames and the encoded audio frames for the predicted state 2 to generate one or more packets. The network communication device 1 sends the packets via the computer network 102 to the client device 1 for display of one or more images according to the encoded image frames for the predicted state 2 on the client device 1 and for output of sound by the client device 1 according to the encoded audio frames for the predicted state 2.

By generating the encoded image frames and the encoded audio frames for the predicted state 2 before the user inputs 2 and 3 are actually received by the node 1 or by the node A, a latency in execution of the application by the distributed game engine system 106 is reduced. For example, once the user inputs 2 and 3 are received by the node 1 or the node A, there is no delay in analyzing the user inputs 2 and 3 to determine one or more positions and one or more orientations of a virtual object that is controlled by the user A via the client device 1, to determine audio data to be output by the virtual object, to determine one or more one or more positions and one or more orientations of one or more AIs in a virtual scene having the virtual object, to determine audio data to be output by the one or more AIs, to generate image frames from the positions and orientations of the virtual object and the AIs, to generate encoded image frames for the predicted state 2 from the image frames, and to generate encoded audio frames for the predicted state 2 from the audio data of the AIs and the virtual object. One or more of the operations of determining the one or more positions and one or more orientations of the virtual object in a virtual scene, determining audio data to be output by the virtual object, determining one or more positions and one or more orientations of one or more AIs in the virtual scene, determining audio data to be output by the one or more AIs, generating image frames from the positions and orientations of the virtual object and the AIs, generating encoded image frames for the predicted state 2 from the image frames, and generating encoded audio frames for the predicted state 2 from the audio data of the AIs and the virtual object are already performed, in advance, by the node 1 before the user inputs 2 and 3 are received by the node 1. Once the user inputs 2 and 3 are received by the node 1, one or more packets are generated from the encoded image frames for the predicted state 2 and the encoded audio data for the predicted state 2 and are sent from the node 1 to the client device 1 via the computer network 102 to reduce the latency of the execution of the application.

It should be noted that one or more of the application of the physics prediction engine by the CPU 1, the application of the audio prediction engine by the CPU 1, the application of the AI prediction engine by the CPU 1*a*, and the application of the graphics prediction engine by the GPU 1 of the node 1 for generating the predicted state 2 is performed simultaneous with one or more of the application of the physics engine by the CPU A, the application of the audio engine by the CPU A, the application of the AI engine by the CPU A1, and the application of the graphics engine by the GPU A of the node A for generating the state 1. For example, during a time period in which the physics engine is applied by the CPU A, the audio engine by the CPU A, the AI engine is applied by the CPU A1 and/or the graphics engine is applied by the GPU A of the node A for generating the state 1, one or more of the physics prediction engine, the audio prediction engine, the AI prediction engine, and the graphics prediction engine for generating the predicted state 2 are applied by the node 1.

Moreover, while the node 1 is applying the physics prediction engine, the AI prediction engine, the audio prediction engine, or the graphics prediction engine, or a combination thereof for generating the image frames and the audio frames for the predicted state 2, when a user input 1' is received instead of the user input 2, one or more of the nodes A and 1 apply high priority processing to determine a state 1' based on the user input 1'. For example, the CPU A of the node A receives the user input 1' from the client device 1 via the computer network 102. The CPU A determines that the user input 1' is received consecutive to receiving the user input 1 instead of receiving the user input 2 for the predicted state 2. The CPU A further determines that the user input 1' does not match the user input 2 for which the predicted state 2 is determined.

The user inputs 2 and 3 for the predicted state 2 are previously stored in the memory device A for determining whether a match between the user input 2 for the predicted state 2 and the user input 1' and the user input 3 for the predicted state 2 and the user input 1' occurs. For example, the CPU 1 accesses the user inputs 2 and 3 for the predicted state 2 from the memory device 1 of the node 1 and provides the user inputs 2 and 3 for the predicted state 2 to the internal communication device 1 of the node 1. The internal communication device 1 applies the internal communication protocol to the user inputs 2 and 3 for the predicted state 2 to generate one or more transfer units and sends the transfer units to the internal communication device A of the node A. The internal communication device A applies the internal communication protocol to the transfer units to obtain the user inputs 2 and 3 for the predicted state 2 and sends the user inputs 2 and 3 for the predicted state 2 to the memory device A for storage.

The CPU A provides the user input 1' to the internal communication device A. The internal communication device A applies the internal communication protocol to the user input 1' to generate one or more transfer units having the user input 1', and sends the transfer units to the internal communication device 1 of the node 1. Upon receiving the transfer units having the user input 1', the internal communication device A applies the internal communication protocol to the transfer units to extract the user input 1' from the transfer units, and provides the user input 1' to the CPU 1 of the node 1.

When the user input 1' is received by the node 1 instead of receiving the user input 2, the node 1 stops applying one or more of the physics prediction engine, the AI prediction engine, the audio prediction engine, and the graphics prediction engine that are used to generate the predicted state 2 from the user inputs 2 and 3 for the predicted state 2 to provide a higher priority to generate the state 1' compared to generating the predicted state 2. For example, the user input 1' is received by the node 1 or the node A while or during a time period in which the node 1 is in a process of applying one or more of its physics prediction engine, its AI prediction engine, its audio prediction engine, or the graphics prediction engine for generating the predicted state 2. The CPU 1 stops applying the physics prediction engine to determine movement of a virtual object controlled by the user A for the predicted state 2, or the CPU 1 stops applying the audio prediction engine to determine audio data to the output by the virtual object for the predicted state 2, or the CPU 1*a* stops applying the AI prediction engine to determine movement of one or more AIs for the predicted state 2, or the CPU 1*a* stops applying the AI prediction engine or an audio prediction engine to determine audio data to be output by the AIs for the predicted state 2, or the GPU 1 stops applying the graphics prediction engine to generate one or more image frames from the movement of the virtual object and the movement of the AIs for the predicted state 2, or the video encoder 1 stops encoding the image frames for the predicted state 2, or the audio encoder 1 stops encoding the audio data for the predicted state 2, or a combination thereof.

Also, when the user input 1' is received instead of the user inputs 2 and 3, instead of generating the predicted state 2, one of more of the nodes A and 1 immediately starts generating the state 1' from the user input 1' to provide the higher priority to generate the state 1' compared to generating the predicted state 2. For example, the user input 1' is received by the node 1 or the node A while or during a time period in which the node 1 is in a process of generating image frames or encoded image frames or encoded audio frames or a combination thereof for the predicted state 2. The node 1 stops generating the image frames or the encoded image frames or the encoded audio frames for the predicted state 2. Instead, the CPU 1 of the node 1 or the CPU A of the node A applies its physics engine to determine movement of a virtual object controlled by the user A via the client device 1 for the state 1'. Moreover, the CPU 1 of the node 1 or the CPU A of the node A applies its audio engine to determine audio data to be output by the virtual object for the state 1'. Also, the CPU A1 of the node A or the CPU 1*a* of the node 1 applies its AI engine to determine movement of one or more AIs for the state 1' based on the movement of the virtual object for the state 1' and to determine audio data to be output by the one or more AIs for the state 1' based on the audio data to be output by the virtual object for the state 1'. In addition, the GPU A of the node A or the GPU 1 of the node 1 applies its graphics engine to generate one or more image frames for the virtual object, a virtual background of a virtual scene in which the virtual object is to be displayed, and graphics for the one or more AIs for the state 1'. Furthermore, the audio encoder A or the audio encoder 1 encodes the audio data to be output by the virtual object for the state 1' and the audio data to be output by the one or more AIs for the state 1' to generate one or more encoded audio frames. Also, the video encoder A or the video encoder 1 encodes the image frames for the state 1' to output one or more encoded image frames. Either the network communication device A or the network communication device 1 applies the external communication protocol to the encoded audio frames and the encoded image frames for the state 1' to generate one or more packets for the state 1', and sends the packets via the computer network 102 to the client device 1. The client device 1 processes the encoded image frames for the state 1' to display one or more images for the state 1' on the display device of the client device 1 and processes the encoded audio frames for the state 1' to output sound associated with the one or more images.

In an embodiment, when the CPU 1 determines that the user inputs 2 and 3, which are actually received, matches the user inputs 2 and 3 for which the image frames and the audio frames for the predicted state 2 are generated by the node 1, the CPU 1 sends an encode signal to the video encoder 1 of the node 1 and the audio encoder 1 of the node 1. The image frames for the predicted state 2 and the audio data for the predicted state 2 are not encoded before the user inputs 2 and 3 are actually received. Upon receiving the encode signal, the video encoder 1 performs the encoding of the image frames for the predicted state 2 in a manner described above and the audio encoder 1 performs the encoding of the audio data for the predicted state 2. The network communication device 1 of the node 1 applies the external communication protocol to the encoded frames, including the encoded audio frames and the encoded image frames, to generate the packets in a manner described above, and sends the packets to the client device 1.

In one embodiment, a portion of the state 1' is generated by the node A and another portion of the state 1' is generated by the node 1 based on the user input 1'. For example, the node A applies its physics engine to determine a movement of a virtual object in a virtual scene for the state 1' and the node 1 applies its audio engine to determine audio data to be output by the virtual object for the state 1'. As another example, the node A applies its physics engine to determine a movement of a virtual object in a virtual scene for the state 1' and the node 1 applies its AI engine to determine movement of one or more AIs in the virtual scene based on the movement of the virtual object for the state 1'.

In this embodiment, the portion of the state 1' that is generated by the node A is transferred from the node A to the node 1 or the portion of the state 1' generated by the node 1 is transferred from the node 1 to the node A for sending to the client device 1 via the computer network 102. For example, data including positions and orientations defining movement of the virtual object in a virtual scene for the state 1' are accessed by the CPU A from the memory device A, and sent to the internal communication device A. The internal communication device A generates one or more transfer units by applying the internal communication protocol to the data defining the movement of the virtual object for the state 1' and sends the transfer units to the internal communication device 1. The internal communication device 1 applies the internal communication protocol to the transfer units to obtain the data defining the movement of the virtual object for the state 1' and sends the data to the CPU 1*a* for determining positions and orientations defining movement of the one or more AIs in the virtual scene. As another example, one or more image frames of the one or more AIs for the state 1' are accessed by the GPU 1 from the GPU memory device 1 of the node 1 and sent to the internal communication device 1 for generating one or more transfer units according to the internal communication protocol. The transfer units are sent from the internal communication device 1 to the internal communication device A, which applies internal communication protocol to obtain the image frames of the one or more AIs for the state 1' and sends the image frames to the video encoder A. The video encoder A of the node A encodes the image frames of the one or more AIs for the state 1' received from the node 1 and image frames of the virtual object for the state 1'. The image frames of the virtual object for the state 1 are stored in the GPU memory device A of the node A. Moreover, the video encoder A encodes any remaining image frames for the virtual scene for the state 1' to output encoded image frames for the state 1'. In addition, audio data for the state 1' is encoded by the audio encoder A to output one or more encoded audio frames for the state 1'. The network communication device A applies the external communication protocol to the encoded audio frames and the encoded image frames for the state 1' to generate one or more packets and sends the packets via the computer network 102 to the client device 1.

In an embodiment, the high priority processing is performed by one of the nodes 1 and A that has faster processing speed and/or greater memory compared to the other node. For example, the CPU 1 that has the faster processing speed is selected by the nodes 1 and A to apply its physics engine to generate data regarding movement, such as one or more positions and one or more orientations, of the virtual object controlled by the user A for the state 1'. The CPU A determines that the CPU 1 has the faster processing speed and sends the user input 1' for the state 1' via the internal communication devices A and 1 to the CPU 1 for processing of the user input 1'. As another example, the GPU memory device A has a larger amount of memory space compared to a memory space within the GPU memory device 1. In this example, the data regarding the movement of the virtual object for the state 1' determined by the CPU 1 is accessed by the CPU 1 from the memory device 1 and sent to the internal communication device 1. The internal communication device 1 applies the internal communication protocol to the data regarding the movement of the virtual object for the state 1' to generate one or more transfer units and sends the transfer units to the internal communication device A. The internal communication device A applies internal communication protocol to the transfer units to obtain the data regarding the movement of the virtual object and sends the data to the memory device A for storage. The GPU A accesses the data regarding the movement of the virtual object for the state 1' from the memory device A to generate one or more image frames from the data and stores the image frames in the GPU memory device A.

In an embodiment, one or more of the nodes 1 and A determines or identifies a difference between one or more elements of the predicted state 2 and one or more elements of the state 1' in response to receiving the user input 1', and generates audio data or image frames based on the difference for providing to the client device 1 via the computer network 102. For example, the GPU 1 generates one or more image frames of a virtual background for the predicted state 2 of a virtual scene. The user input 1' is received by the node A after the image frames of the virtual background for the predicted state 2 are generated. The user input 1' is provided from the node A to the node 1 for storage in the GPU memory device 1. The GPU 1 determines that the user input 1' is received from the node A and in receiving the user input 1', the image frames of the virtual background for the predicted state 2 are provided by the GPU 1 of the node 1 from the GPU memory device 1 to the internal communication device 1. The internal communication device 1 applies the internal communication protocol to the image frames of the virtual background for the predicted state 2 to generate one or more transfer units and sends the transfer units to the internal communication device A of the node A. The internal communication device A of the node A applies the internal communication protocol to the transfer units to obtain the image frames of the virtual background for the predicted state 2 and provides the image frames to the CPU A and to the CPU A1 of the node A. The CPU A parses the image frames of the virtual background for the predicted state 2 to determine or identify a difference between image frames to be generated for a virtual scene for the state 1' and the image frames of the virtual background of a virtual scene for the predicted state 2. The CPU A determines the difference to be that of a virtual object to be superimposed on the virtual background for the predicted state 2. The difference is determined based on the user input 1'. The virtual object to be superimposed or a position and orientation of the virtual object are examples of one or more elements of the state 1' and the virtual background for the predicted 2 is an example of one or more elements of the predicted state 2. The CPU A determines the position and orientation of the virtual object, and audio data to be output by the virtual object for the state 1' and stores the position, the orientation, and the audio data in the memory device A of the node A. The position and orientation of the virtual object for the state 1' are determined from the user input 1'.

Moreover, in the embodiment, the CPU A1 of the node A parses the image frames of the virtual background for the predicted state 2 to determine or identify that a difference between image frames to be generated for a virtual scene for the state 1' and the image frames of the virtual background of a virtual scene for the predicted state 2 is that of an AI to be superimposed on the virtual background for the predicted state 2. The difference is determined based on the position and orientation of the virtual object for the state 1'. The AI to be superimposed or a position and orientation of the AI are examples of the one or more elements of the state 1'. The CPU A1 determines a position and orientation of the AI, and audio data to be output by the AI for the state 1', and stores the position, the orientation, and the audio data in the memory device A1. The position and orientation of the AI for the state 1' are determined from the position and orientation of the virtual object for the state 1'. To illustrate, if the virtual object for the state 1' jumps, the AI for the state 1's jumps higher than the virtual object or if the virtual object for the state 1' shoots in a virtual scene, the AI also shoots in the virtual scene.

In the embodiment, the GPU A generates the image frames having the virtual object for the state 1' based on the position and orientation of the virtual object, having the AI for the state 1' based on the position and orientation of the AI, and superimposes the image frames for the virtual object for the state 1' onto the image frames of the virtual background for the predicted state 2 to generate superimposed image frames of a virtual scene of the state 1'. The GPU A sends the superimposed image frames to the video encoder A. The video encoder A encodes the superimposed image frames to generate encoded image frames of the virtual scene for the state 1'.

Also, in the embodiment, the audio encoder A encodes the audio data of the AI and the virtual object for the state 1' to generate encoded audio frames. The encoded image frames of the virtual scene for the state 1' and the encoded audio frames of the virtual scene for the state 1' are converted into one or more packets by the network communication device A and sent to the client device 1 by the computer network 102 for display of one or more composite images of the virtual scene for the state 1' having the virtual background for the predicted state 2 and the virtual object and the AI for the state 1' on the display device of the client device 1.

In an embodiment, instead of the image frames of the virtual object and the image frames of the AI being superimposed on the image frames of the virtual background as described in the preceding embodiment, image frames that have the virtual object or the AI or both, and the virtual background of a virtual scene for the state 1' are generated by the node A or the node 1 based on the user input 1', and encoded and sent via the computer network 102 to the client device 1 for display. In this embodiment, the GPU 1 discards, such as deletes or erases, from the GPU memory device 1, the image frames having the virtual background for the predicted state 2. The image frames having the virtual background for the predicted state 2 match the image frames having the virtual background for the state 1'. For example, the virtual background for the predicted state 2 is the same as the virtual background for the state 1'.

It should be noted that in one embodiment, the system 200 includes a number of nodes other than that illustrated in FIGS. 2A and 2B. For example, the system 200 includes 50 nodes, or 25 nodes, or 5 nodes.

It should further be noted that some of the above embodiments are described with respect to the two user inputs 2 and 3. However, in one embodiment, the embodiments apply equally to one user input, such as the user input 2 or the user input 3, instead of both the user inputs 2 and 3. For example, the predicted state 2 is generated based on the user input 2 instead both the user inputs 2 and 3.

In an embodiment, instead of using the user input 1 to generate the state 1 or the predicted state 2, any number of user inputs is used to generate the state 1 or the predicted state 2. For example, the CPU A of the node A stores one or more previous user inputs in the memory device A. The one or more previous user inputs are user inputs received from the client device 1 by the node A via the computer network 102 before the user input 1 is received from the client device 1 by the node A. The one or more previous user inputs are generated in a similar manner in which the user input 1 is generated. For example, the one or more previous user inputs are generated when the user A selects one or more buttons on the input device of the client device 1 or moves one or more joysticks on the client device 1 or makes one or more gestures that are captured by the camera of the client device 1. As an example, the one or more previous user inputs are generated by the client device 1 when the user A controls the input device of the client device 1 to move an avatar or a virtual object in a virtual scene. The internal communication device A accesses the user input 1 and the one or more previous user inputs for the state 1 that are stored in the GPU memory device A of the node A, applies the internal application protocol to the user input 1 and the one or more previous user inputs to generate one or more transfer units having the user input 1, the previous user inputs, and sends the transfer units to the internal communication device 1 of the node 1. The predicted state 2 is generated by the node 1 based on the one or more previous user inputs and the user input 1 in a similar manner in which the state 1 is generated by the node 1 based on the user input 1.

In an embodiment, an output of the state 1 is used to generate the predicted state 2. For example, the CPU 1 determines a position of a virtual object controlled by the user A via the client device 1 for the predicted state 2 based on a position of the virtual object for the state 1. To illustrate, for the predicted state 2, the virtual object moves to the right or left or up or down from a position for the state 1. As another example, the CPU 1 determines an orientation of a virtual object controlled by the user A via the client device 1 for the predicted state 2 based on an orientation of the virtual object for the state 1. To illustrate, for the predicted state 2, the virtual object rotates clockwise or clockwise from an orientation of the virtual object for the state 1. As yet another example, the CPU 1a determines a position of an AI for the predicted state 2 based on a position of the virtual object for the state 1, and determines an orientation of an AI for the predicted state 2 based on an orientation of the AI for the state 1.

In one embodiment, any control of an input device, described herein, by a user, to change a state occurs via a user account that is assigned to the user by the server system 104. For example, the user A controls a virtual object using the client device 1 via his/her user account after logging into the user account.

It should be noted that in one embodiment, the functions described herein as being performed by the CPU A of the node A are instead performed by the CPU A1 of the node A or the functions described as being performed by the CPU A1 are instead performed by the CPU A. Similarly, in an embodiment, the functions described herein as being performed by the CPU 1 of the node 1 are instead performed by the CPU 1a of the node 1 or the functions described as being performed by the CPU 1a are instead performed by the CPU 1.

FIG. 3A is a diagram of an embodiment of a system 300 to illustrate a distributed game engine 302 and a distributed predictor engine 304. The distributed game engine 302 and the distributed predictor engine 304 are portions of the distributed game engine system 106 (FIG. 1). For example, one or more the nodes A, B, and C of the distributed game engine system 106 are nodes of the distributed game engine 302 and one or more of the nodes 1 and 2 of the distributed game engine system 106 are nodes of the distributed predictor engine 304. Examples of each of the distributed game engine 302 and the distributed predictor engine 304 include a machine learning engine and a neural network.

As shown by a graph 306, a virtual object, such as an avatar or a representation of the user A, that is controlled by the user A via the client device 1 moves from a position a to a position b in a virtual scene. The graph 306 illustrates positions of a virtual object in a virtual scene. The user input 1 is received and processed by the distributed game engine 302 to generate the state 1, which includes a position c of the virtual object that is controlled by the user A via the client device 1 (FIG. 1). The position c is an example of an output of the state 1. The user input 1 is received to move the virtual object that is controlled by the user A via the client device 1 from the position b to the position c.

During a time period in which the user input 1 is being processed to determine the position c or to generate image frames for displaying the virtual object as moving from the position b to the position c, the distributed predictor engine 304 receives the user input 1 and predicts that the user input 2 will be received from the client device 1 via the computer network 102 (FIG. 1), and processes the user input 2 to output the predicted state 2, which includes a position d1 of the virtual object controlled by the user A and movement from the position c to the position d1. In addition, during the time period in which the user input 1 is being processed, the distributed predictor engine 304 further predicts that after receiving the user input 2, the user input 3 will be received to output the predicted state 2, which includes a position f of the virtual object controlled by the user A and movement from the position d1 to the position f.

Moreover, if during the time period in which the user inputs 2 and 3 are processed to output the predicted state 2, the distributed predictor engine 304 or the distribute game engine 302 determines that the user input 1' is received, one or more of the distributed game engine 302 and the distributed predictor engine 304 determines the state 1' based on the user input 1'. For example, one or more of the distributed game engine 302 and the distributed predictor engine 304 determines the state 1' instead of continuing to determine the predicted state 2. The state 1' includes a position d of the virtual object controlled by the user A via the client device 1 and movement of the virtual object from the position c to the position d. The positions c, d1, and f are located along a path I and the positions c, d, and f are located along a predicted path II.

In one embodiment, the distributed predictor engine 304 determines the predicted state 2 of a virtual scene based on a history of the user A for the virtual scene, or a history of other users B and C (FIG. 1) for the virtual scene, or one or more positions and one or more orientations of one or more virtual objects in the virtual scene, or the state 1 of the virtual scene, or a combination thereof. For example, the CPU 1 (FIG. 2B) determines that it is more likely than not that the user A will control the input device of the client device 1 to generate the user input 2 to move the virtual object to the position d1 instead of the position d from the position c. In this example, the CPU 1 accesses a database within the memory device 1 (FIG. 2B) or within the memory device A (FIG. 2A) to determine that the user A has previously controlled via his/her user account the virtual object to travel to the position d1 from the position c instead of traveling to the position d from the position c for greater than a pre-determined number of times. The CPU 1 accesses the database within the memory device A via the internal communication devices A and 1 (FIGS. 2A and 2B). As another example, the CPU 1 determines that it is more likely than not that the user A will control the input device of the client device 1 to generate the user input 2 to move the virtual object to the position d1 from the position c. In this example, the CPU 1 accesses a database within the memory device 1 (FIG. 2B) or the memory device A to determine that a greater than a pre-set number of users B and C have previously controlled via their corresponding user accounts and their corresponding client devices 2 and 3 (FIG. 1) the virtual object to travel to the position d1 from the position c instead of traveling to the position d from the position c and that each of the users B and C have controlled the virtual object for greater than the pre-determined number of times.

As yet another example, the CPU 1 determines that it is more likely than not that the user A will control the input device of the client device 1 to generate the user input 2 to move the virtual object to the position d1 instead of the position d from the position c. In this example, the CPU 1 accesses the database within the memory device 1 (FIG. 2B) or the memory device A to determine that the user A has previously controlled via his/her user account the virtual object to travel to the position d1 from the position c instead of traveling to the position d from the position c for greater than the pre-determined number of times. Also, in this example, the CPU 1 accesses the database within the memory device 1 (FIG. 2B) or the memory device A to determine that a greater than the pre-set number of users B and C have previously controlled via their corresponding user accounts and their corresponding client devices 2 and 3 the virtual object to travel to the position d1 from the position c instead of traveling to the position d from the position c and that each of the users B and C have controlled the virtual object for greater than the pre-determined number of times.

As another example, the CPU 1 determines that it is more likely than not that the user A will control the input device of the client device 1 to generate the user input 2 to move the virtual object to the position d1 instead of the position d from the position c. In this example, the CPU 1 accesses a position of an AI within a virtual scene having the virtual object that is controlled by the user A via the client device A. The position of the AI is accessed from the memory device 1a (FIG. 2B) or the memory device A1 (FIG. 2A). The virtual object is at the position c in the virtual scene. The CPU 1 accesses the memory device A1 via the internal communication devices A and 1 (FIGS. 2A and 2B). The CPU 1 determines from the position of the AI in the virtual scene that it is more likely than not that the virtual object will move to the position d1 instead of the position d from the position c. To illustrate, the CPU 1 determines that virtual enemies of the virtual object at the position c are close to the virtual object, and so the virtual object will run to move to the position d1 instead of the position d. The position d1 is more safer than the position d because the position d1 provides cover to the virtual object. The position d1 can be behind a virtual rock or a virtual tree in a virtual scene to provide the cover compared to the position d, which does not have the cover.

As yet another example, the CPU 1 determines that it is more likely than not that the user A will control the input device of the client device 1 to generate the user input 2 to move an avatar to the position d1 instead of the position d from the position c. In this example, the CPU 1 accesses a position of another virtual object, such as a slider on a health-level bar, from the memory device 1 or the memory device A (FIGS. 2A and 2B) to determine that a health of the avatar is below a predetermined level. The CPU 1 further determines that it is probable that the user input 2 will be received from the client device 1 via the computer network 102 instead of receiving the user input 1' when the health of the avatar is below the pre-determined level.

It should be noted that in the graph 306, instead of the positions a, b, c, d, d1, and f, orientations a, b, c, d, d1, and f can be used, or each of a, b, c, d, d1, and f is a combination of the position and an orientation.

FIG. 3B is a diagram of an embodiment of a system 310 to illustrate that image frames and audio frames for the predicted state 2 are generated during the time period in which a virtual object that is controlled by the user A via the client device 1 (FIG. 1) is at the position c. The system 310 includes the distributed predictor engine 304, which further includes a distributed physics prediction engine 312. The distributed physics prediction engine 312 is executed by the CPU A of the node A, or a CPU of the node B, or the CPU 1 of the node 1, or a CPU 2 of the node 2, or a combination thereof.

During the time period in which the virtual object controlled by the user A by the client device 1 is at the position c, the distributed physics prediction engine 312 predicts or determines that it is highly likely or somewhat likely that the virtual object will collide with another virtual object 314, which is between the positions c and d1. The distributed physics prediction engine 312 predicts or determines that it is highly likely or somewhat likely that the virtual object will collide with another virtual object 314 when the virtual object will move from the position c to the position d1 of the predicted state 2. Upon predicting so, the distributed physics prediction engine 312 determines one or more positions and one or more orientations of the virtual object controlled by the user A and one or more positions and one or more orientations of the virtual object 314 during the collision, and stores the positions and the orientations in one or more memory devices of the nodes 1 (FIG. 2B) and 2. In addition, a distributed audio prediction engine of the distributed predictor engine 304 generates audio data for the collision. Also, a distributed graphics engine of the distributed predictor engine 304 accesses the positions and orientations of the virtual object controlled by the user A and the virtual object 314 from one or more memory devices of the nodes 1 (FIG. 2B) and 2, and generates one or more image frames from the positions and orientations during the collision. Moreover, one or more video encoders of the nodes 1 and 2 obtains the image frames and encodes the image frames to output one or more encoded image frames for the collision. Also, one or more audio encoders of the nodes 1 and 2 obtains the audio data for the collision to output one or more audio frames and encodes the audio frames to output one or more encoded audio frames for the collision.

Upon actually receiving the user input 2 from the client device 1 via the computer network 102, one or more network communication devices of the nodes 1 and 2 apply the external communication protocol to the encoded audio frames and the encoded video frames to generate one or more packets, and sends the packets via the computer network 102 to the client device 1 for display of one or more images of the collision on the client device 1 and for outputting sounds of the collision on the client device 1.

FIG. 3C is an embodiment of the distributed game engine system 106 to illustrate that while the predicted state 2 is being generated, the user input 1' received by the distributed game engine system 106 from the client device 1 via the computer network 102 (FIG. 1), acts as a trigger of generation of the state 1'. When the user input 1' is received from the client device 1 via the computer network 102 by the distributed game engine system 106 immediately after receiving the user input 1, the distributed game engine system 106 stops applying a physics prediction engine, an AI prediction engine, a graphics prediction engine, and an audio prediction engine to generate image frames and audio frames for the predicted state 2 and starts applying a graphics engine, an AI engine, a graphics engine, and an audio engine to generate image frames and audio frames for the state 1'. As an example, the CPU 1 of the node 1 (FIG. 2B) stops determining position, orientation, and audio data for the virtual object controlled by the user A for the predicted state 2. Instead, the CPU 1 of the node 1 (FIG. 1) or the CPU A of the node A (FIG. 2A) starts determining position, orientation, and audio data of the virtual object for the state 1' based on the user input 1'. As another example, the CPU 1a of the node 1 (FIG. 2B) stops generating position, orientation, and audio data of an AI for the predicted state 2. Instead, the CPU 1a of the node 1 (FIG. 2B) or the CPU A1 of the node A (FIG. 2A) starts determining position, orientation, and audio data of the AI for the state 1' based on the user input 1'. As still another example, the GPU 1 of the node 1 (FIG. 2B) stops generating one or more image frames from one or more positions and orientations of the virtual object for the predicted state 2 and from one or more positions and orientations of the AI for the predicted state 2. The virtual object is controlled by the user A via the client device 1 (FIG. 1). Instead, the GPU 1 of the node 1 or the GPU A of the node A (FIG. 2A) starts generating one or more image frames from the one or more positions and orientations of the virtual object for the state 1' and from the one or more positions and orientations of the AI for the state 1'. Also, the audio encoder 1 of the node 1 (FIG. 2B) stops encoding the audio data to be output by the virtual object for the predicted state 2 and the video encoder 1 of the node 1 (FIG. 2B) stops encoding the image frames for the predicted state 2. Instead, the audio encoder 1 or the audio encoder A starts encoding the audio data for the state 1' to output encoded audio frames for the state 1'. Also, the video encoder 1 or the video encoder A starts encoding the image frames for the state 1' to output encoded image frames for the state 1'. The encoded audio frames and the encoded image frames for the state 1' are packetized by the network communication device A of the node A or the network communication device 1 of the node 1 (FIG. 2B), and sent via the computer network 102 (FIG. 2C) to the client device 1 for display of one or more images of a virtual scene on the client device 1 based on the encoded image frames and to output a sound of the virtual scene based on the encoded audio frames.

FIG. 3D is a diagram to illustrate that a virtual object or an AI is rendered and added to a virtual background when the user input 1' for the state 1' is received instead of receiving the user input 2 for the predicted state 2. The GPU 1 of the node 1 (FIG. 2B) generates image frames for a virtual background for the predicted state 2 and the image frames do not include a virtual object controlled by the user A via the client device 1 for the predicted state 2 and/or does not include AI for the predicted state 2. After receiving the user input 1', the CPU A of the node A (FIG. 2A) determines a position and orientation of the virtual object controlled by the user A for the state 1' and further determines audio data to be output by the virtual object based on the user input 1'. The CPU A of the node A determines that the virtual object for the state 1' is to be added at the position and orientation to a position and orientation of virtual background for the predicted state 2.

It should be noted that the CPU A accesses the position and orientation of the virtual background for the predicted state 2 from the memory device 1 of the node 1. For example, the CPU A sends a request for the position and orientation of the virtual background for the predicted state 2 to the node 1 via the internal communication devices A and 1 (FIGS. 2A and 2B). Upon receiving the request, the CPU 1 of the node 1 accesses the position and orientation of the virtual background for the predicted state 2 from the memory device 1 of the node 1 and provides the position and orientation to the internal communication device 1. The internal communication device 1 applies the internal communication protocol to the position and orientation of the virtual background for the predicted state 2 to generate one or more transfer units and sends the transfer units to the internal communication device A of the node A. The internal communication device A applies the internal communication protocol to the transfer units to obtain the position and orientation of the virtual background for the predicted state 2 and provides the position and orientation of the virtual background to the CPU A of the node A.

Moreover, the CPU A1 of the node A (FIG. 2A) determines a position and orientation of an AI for the state 1' and further determines audio data to be output by the AI based on the user input 1'. The CPU A1 determines that the AI for the state 1' is to be added at the position and orientation to the position and orientation of the virtual background for the predicted state 2. The CPU A1 accesses the position and orientation of the virtual background for the predicted state 2 from the node 1 in a manner similar to that described above in which the CPU A accesses the position and orientation of the virtual background for the predicted state 2 from the node 1. The GPU A of the node A (FIG. 2A) accesses the position and orientation of the virtual object stored in the memory device A of the node A for the state 1' and superimposes the virtual object at the position and orientation on one or more image frames for the virtual background for the predicted state 2 to output one or more superimposed image frames for a virtual scene for the state 1'. Moreover, the GPU A of the node A accesses the position and orientation of the AI stored in the memory device A1 of the node A for the state 1' and superimposes the AI at the position and orientation on the image frames for the virtual background for the predicted state 2 to output the superimposed image frames for the virtual scene for the state 1'.

The video encoder A of the node A obtains the superimposed image frames and encodes the superimposed image frames to output one or more encoded superimposed image frames. Moreover, the audio encoder A of the node A encodes the audio data to be output by the virtual object for the state 1' to generate one or more encoded audio frames and encodes the audio data to be output by the AI for the state 1' to generate one or more encoded audio frames. The network communication device A of the node A generates one or more packets from the encoded superimposed image frames and the encoded audio frames for the state 1' and sends the packets via the computer network 102 to the client device 1 for display of one or more composite images having the virtual background, the virtual object, and the AI in the virtual scene on the client device 1.

In one embodiment, instead of generating the superimposed image frames for the state 1' based on a virtual background for the predicted state 2, one or more image frames having the same virtual background for the state 1' is re-rendered by the GPU A of the node A to generate one or more image frames for the state 1' (FIG. 2A).

Also, in an embodiment, instead of adding both the AI and the virtual object for the state 1' to the virtual background for the predicted state 2, either the AI or the virtual object for the state 1' is added to the virtual background for the predicted state 2.

FIG. 4A is a diagram of an embodiment of a system 400 to illustrate that the node 1 is used to execute a broad phase detection that virtual objects are likely to collide in a virtual scene and the node 2 is used to execute a narrow phase detection to determine contact points of collision of the virtual objects. The node 2 is also used to execute collision resolution. The system 400 includes the node 1, the node 2, the node A, the node B, the computer network 102, the node assembly server 202, the cloud gaming server 204, and the client device 1. The node B is coupled to the switch system 206.

The node 2 includes a central processing unit 2 (CPU 2), a memory device 2, another central processing unit 2a (CPU 2a), a memory device 2a, a graphics processing unit 2 (GPU 2), a GPU memory device 2, an internal communication device 2, a network communication device 2, an audio encoder (AE) 2, and a video encoder (VE) 2. Components, such as the CPU 2, the memory device 2, the CPU 2a, the memory device 2a, the GPU 2, the GPU memory device 2, the internal communication device 2, the network communication device 2, the audio encoder 2, and the video encoder 2, of the node 2 are coupled with each other via a bus 2.

Upon receiving the user input 1, the CPU 1 of the node 1 executes a physics prediction engine to perform the broad-based detection and sends a computationally intensive job of executing the narrow phase detection to the CPU 2 and/or of executing collision resolution to the CPU 2. For example, the CPU 1 executes the physics prediction engine to determine whether based on the predicted user input 2, if received, a first virtual object in a virtual scene will collide or is highly likely to collide or is somewhat likely to collide with a second virtual object in the virtual scene. Upon determining so, the CPU 1 does not determine a position and an orientation of the first virtual object and a position and an orientation of the second virtual object during the collision. Also, upon determining so, the CPU 1 does not determine a position and an orientation of the first virtual object and a position and an orientation of the second virtual object after the collision. Rather, the CPU 1 provides the determination that the first virtual object will collide or is highly likely to collide or is somewhat likely to collide with the second virtual object to the internal communication device 1 with an instruction to execute the narrow phase detection and/or collision resolution. The determination of the positions and orientations of the first and second virtual objects during and after the collision is computationally more intensive compared to the determination that the first and second virtual objects will collide or is highly likely to collide or is somewhat likely to collide with each other. The positions and orientations of the first and second virtual objects during the collision provide collision points at which the first and second virtual objects collide and are examples of a complex physics state. Similarly, the positions and orientations of the first and second virtual objects after the collision are additional examples of the complex physics state. Moreover, the determination that the first and second virtual objects will collide or is highly likely to collide or is somewhat likely to collide is an example of a determination of a simple physics state. A determination that the first and second virtual objects have greater than a pre-determined percentage, such as 70% or 65%, chance of collision is an example of the determination that the first and second objects are highly likely to collide. Also, a determination that the first and second virtual objects has greater than another pre-set percentage, such as greater than 40% or 50%, and less than the pre-determined percentage, such as 70% or 65%, chance of collision is an example of the determination that the first and second virtual objects are somewhat likely to collide.

The internal communication device 1 receives the instruction to execute the narrow phase detection and/or collision resolution and the determination regarding the collision of the first and second virtual objects and applies the internal communication protocol to the instruction and the determination to generate one or more transfer units having the instruction and the determination. The determination regarding the collision of the first and second virtual objects includes the determination that the first and second virtual objects will collide or the determination that the first and second virtual objects are highly likely to collide or the determination that the first and second virtual objects are somewhat likely to collide. The internal communication device 1 sends the transfer units to the internal communication device 2 of the node 2. The internal communication device 2 executes the internal communication protocol to obtain the instruction to execute the narrow phase detection and/or collision resolution and the determination regarding the collision of the first and second virtual objects from the transfer units and sends the instruction and the determination to the CPU 2 of the node 2.

The CPU 2 executes the instruction for the narrow phase detection and/or collision resolution based on the determination regarding the collision of the first and second virtual objects. For example, the CPU 2 applies a physics prediction engine to determine one or more positions and one or more orientations of the first virtual object and one or more positions and one or more orientations of the second virtual object during the collision, and audio data during the collision, and stores the positions and orientations of the first and second virtual objects and the audio data in the memory device 2. As another example, to resolve a collision, the CPU 2 applies a physics prediction engine to determine how far to separate the first virtual object from the second virtual object after the collision and applies the laws of physics to generate forces to separate the first and second virtual objects from each other. The CPU 2 also determines audio data corresponding to the first and second virtual objects after the collision and stores the audio data in the memory device 2. The separation between the first and second virtual objects after the collision is defined by one or more positions and one or more orientations of the first virtual object and by one or more positions and one or more orientations of the second virtual object.

The GPU 2 accesses the positions and orientations of the first virtual object during and after the collision and the positions and orientations of the second virtual object during and after the collision from the memory device 2, and applies a graphics prediction engine to render one or more image frames based on the positions and orientations of the first and second virtual objects, and stores the image frames within the GPU memory device 2. The video encoder VE 2 accesses the image frames stored within the memory device 2 and encodes the image frames to output one or more encoded image frames, which are stored in the video encoder VE 2. Moreover, the audio encoder AE 2 accesses the audio data stored within the memory device 2 and encodes the audio data to output one or more encoded audio frames, which are stored in the audio encoder AE 2.

The user input 2 for the predicted state 2 is received from the client device 1 by the computer network 102 by the node A. The node A provides the user input 2 to the CPU 1 of the node 1 via the internal communication devices A and 1. The user input 2 is provided by the CPU 1 to the internal communication device 1. The internal communication device 1 applies the internal communication protocol to the user input 2 to generate one or more transfer units, and sends the transfer units to the internal communication device 2.

The internal communication device 2 applies the internal communication protocol to the transfer units to obtain the user input 2, and sends the user input 2 to the network communication device 2. The network communication device 2, in response to receiving the user input 2, obtains the encoded audio frames for the collision from the audio encoder AE 2 and the encoded video frames for the collision from the video encoder VE 2, and applies the external communication protocol to the encoded audio frames and the encoded video frames to generate one or more packets, and sends the packets via the computer network 102 to the client device 1 for display of one or more images of the collision of the first and second virtual objects on the display device of the client device 1 and for outputting a sound of the collision via the client device 1.

In an embodiment, the positions and orientations of the first and second virtual objects during and after the collision and the audio data during and after the collision are for the predicted state 2.

In one embodiment, the CPU 2 has a higher processor performance than the CPU 1. For example, the CPU 2 has a shorter response time, or a higher throughput, or a lower utilization of the components of the node 2, or a greater processing power, or a lesser load, or a lower amount of jobs to be performed, or a lower number of tasks to be performed, or a combination thereof, compared to the CPU 1.

It should be noted that in one embodiment, the functions described herein as being performed by the CPU 2 of the node 2 are instead performed by the CPU 2a of the node 2 or the functions described as being performed by the CPU 2a are instead performed by the CPU 2.

In an embodiment, the user input 1 is provided by the node A to the node 1. For example, the user input 1 is received by the node 1 via the computer network 102 from the client device 1. The CPU 1 accesses the user input 1 stored in the memory device 1 and provides the user input 1 to the internal communication device 1. The internal communication device 1 applies the internal communication protocol to the user input 1 to generate one or more transfer units and sends the transfer units to the internal communication device A. The internal communication device A applies the internal communication protocol to the transfer units to extract the user input 1 and provides the user input 1 for storage in the memory device 1 of the node 1 for the CPU 1 to access from the memory device 1.

In one embodiment, the user input 1 or any other user inputs, described herein, such as the user input 2, the user input 3, and the user input 1', are sent from the client device 1 to one or more of the nodes that are selected by the switch system 206 for execution of the application.

In an embodiment, the CPU 2 determines a contact plane at which the first and second virtual objects are to collide and a penetration distance from a point of contact. In one embodiment, the CPU 2 analyzes the instruction from the CPU 1 in detail to determine that there is no collision between the first and second virtual objects, and there is no need to determine positions and orientations of the first and second virtual objects during and after the collision.

FIG. 4B is a diagram of an embodiment of a system 410 to illustrate that a high-quality graphics job is dispatched from the node 1 to the node 2. The GPU 1 generates one or more image frames or a portion of an image frame for the predicted state 2, and stores the image frames or the portion of the image frame in the GPU memory device 1. The one or more image frames or the portion of the image frame for the predicted state 2 are examples of a simple graphics state, such as a virtual background in a virtual scene. The GPU 1 generates an instruction to generate the remaining image frames or the remaining portion of the image frame for the predicted state 2. The remaining image frames or the remaining portion of the image frame are examples of a complex graphics state, such as virtual objects to be displayed in the virtual scene. The virtual scene, when displayed, is to include the virtual background of the simple graphics state. The GPU 1 sends the instruction to the internal communication device 1 to provide a task of determining the complex graphics state to the node 2. The internal communication device 1, in response to receiving the instruction, accesses one or more positions and one or more orientations of a virtual object from the memory device 1, or one or more positions and one or more orientations of an AI from the memory device 1a, or a combination thereof to facilitate generation of the remaining image frames or the remaining portion of the image frame for the predicted state 2. The positions and the orientations of the virtual object for the predicted state 2 stored within the memory device 1 and the positions and the orientations of the AI for the predicted state 2 stored within the memory device 1a are used by the GPU 1 of the node 1 to generate the image frames or the portion of an image frame for the predicted state 2.

The internal communication device 1 applies the internal communication protocol to the instruction received from the GPU 1 and to the positions and orientations of the virtual object and the AI for the predicted state 2 to generate one or more transfer units and sends the transfer units to the internal communication device 2. The internal communication device 2 receives the transfer units and applies the internal communication protocol to the transfer units to obtain the instruction, and the positions and orientations of the virtual object and the AI for the predicted state 2. The internal communication device 2 sends the instruction to the GPU 2 along with the positions and orientations of the virtual object and the AI.

The GPU 2 generates the remaining image frames or the remaining portion of the image frame from the positions and orientations of the virtual object and the AI for the predicted state 2, and stores the remaining image frames or the remaining portion of the image frame within the GPU memory device 2. The internal communication device 2 accesses the remaining image frames or the remaining portion of image frame for the predicted state 2 from the GPU memory device 2 and applies the internal communication protocol to the remaining image frames or the remaining portion of the image frame to generate one or more transfer units.

The transfer units for the predicted state 2 are sent from the internal communication device 2 to the internal communication device 1 of the node 1. The internal communication device 1 applies internal communication protocol to the transfer units to obtain the remaining image frames or the remaining portion of the image frame for the predicted state 2 and provides the remaining image frames or the remaining portion to the GPU memory device 1 for storage.

The GPU 1 combines the portion of the image frame for the predicted state 2 with the remaining portion of the image frame for the predicted state 2 or combines the image frames for the predicted state 2 with the remaining image frames for the predicted state 2. For example, the GPU 1 identifies from the portion of the image frame for the predicted state 2 and the remaining portion of the image frame for the predicted state 2 that the portion and the remaining portion identify the same image frame and a position of the portion with respect to a position of the remaining portion. By identifying that the portion and the remaining portion are to be combined into the image frame for the predicted state 2 and the positions of the portion and the remaining portion in the image frame, the GPU 1 outputs the image frame having the portion at its position and the remaining portion at its position in the image frame for the predicted state 2. As another example, the GPU 1 identifies from the image frames generated by the GPU 1 for the predicted state 2 and the remaining image frames generated by the GPU 2 for the predicted state 2 a sequence in which the image frames are to be displayed on the client device 1. The GPU 1 arranges the image frames generated by the GPU 1 for the predicted state 2 and the remaining image frames generated by the GPU 2 for the predicted state 2 in the sequence and outputs an order for presentation or display of the image frames generated by the GPU 1 and the remaining image frames generated by the GPU 2. The image frames generated by the GPU 1 and the remaining image frames generated by the GPU 2 are combined, such as arranged, to be in the order by the GPU 1.

The video encoder VE1 encodes the combination of the image frames generated by the GPU 1 for the predicted state 2 and the remaining image frames generated by the GPU 2 for the predicted state 2 to output one or more encoded image frames. The video encoder VE 1 encodes the image frames generated by the GPU 1 and the remaining image frames generated by the GPU 2 according to the order in which the image frames and the remaining image frames are combined. The video encoder VE1, in one embodiment, encodes the image frame for the predicated state 2 having the portion generated by the GPU 1 for the predicted state 2 and the remaining portion generated by the GPU 2 for the predicted state 2 to output an encoded image frame.

When the user input 2 for the predicted state 2 is received by the node 1 from the node A, the network communication device 1 of the node 1 accesses the encoded image frames for the predicted state 2 from the video encoder VE1 in addition to the encoded audio frames for the predicted state 2 from the audio encoder 1 of the node 1, and applies the external communication protocol to the encoded image frames and the encoded audio frames to generate one or more packets, and sends the packets by the computer network 102 to the client device 1. Upon receiving the packets, the client device 1 displays one or more images based on the encoded image frames for the predicted state 2 and outputs sound based on the encoded audio frames for the predicted state 2.

The image frames generated by the GPU 1 for the predicted state 2 are of a lower quality compared to the remaining image frames generated by the GPU 2 for the predicted state 2. For example, the image frames generated by the GPU 1 have a lower resolution than the remaining image frames generated by the GPU 2. As another example, the image frames generated by the GPU 1 are to be displayed with a lower frame rate compared to a display of the remaining image frames generated by the GPU 2.

Similarly, the portion of the image frame generated by the GPU 1 for the predicted state 2 is of a lower quality compared to the remaining portion of the image frame generated by the GPU 2 for the predicted state 2. For example, the portion of the image frame generated by the GPU 1 has a lower resolution than a resolution of the remaining portion of the image frame generated by the GPU 2.

In one embodiment, the GPU 2 is of higher quality than the GPU 1. For example, the GPU 2 has a higher computer performance than the GPU 1. To illustrate, the GPU 2 has a shorter response time, or a higher throughput, or a lower utilization of the components of the node 2, or a greater processing power, or a lesser load, or a lower amount of jobs to be performed, or a lower number of tasks to be performed, or a combination thereof, compared to the GPU 1.

In one embodiment, when the user input 2 for the predicted state 2 is received by the node 1 from the node A, the video encoder VE1 encodes the combination of the image frames generated by the GPU 1 for the predicted state 2 and the remaining image frames generated by the GPU 2 for the predicted state 2 to output one or more encoded image frames, or encodes the image frame for the predicated state 2 having the portion generated by the GPU 1 for the predicted state 2 and the remaining portion generated by the GPU 2 for the predicted state 2 to output an encoded image frame. The encoding of the combination of the image frames generated by the GPU 1 and the remaining image frames generated by the GPU 2 or of the image frame generated by combining the portion of the image frame generated by the GPU 1 for the predicted state 2 and the remaining portion of the image frames generated by the GPU 2 for the predicted state 2 is performed after the user input 2 is received instead of before. The network communication device 1 of the node 1 accesses the encoded image frames for the predicted state 2 from the video encoder VE1 in addition to the encoded audio frames for the predicted state 2 from the audio encoder 1 of the node 1, and applies the external communication protocol to the encoded image frames and the encoded audio frames to generate one or more packets, and sends the packets by the computer network 102 to the client device 1.

FIG. 4C is a diagram of an embodiment of a system 420 to illustrate an assignment of one or more tasks associated with a physics prediction engine from the node 1 to the node 2. The system 420 includes the nodes 1 and 2. One or more processors, such as the CPU 1, the CPU 1*a* and the GPU 1, of the node 1 have a lower processor performance compared to one or more processors of the node 2. The one or more processors of the node 2 include the CPU 2, the CPU A1 and the GPU 2. Also, one or more memory devices, such as the memory device 1, the memory device 1*a*, and the GPU memory device 1, of the node 1 have a lower amount of storage space compared to that of one or more memory devices of the node 2. The one or more memory devices of the node 2 include the memory device 2, the memory device 2*a*, and the GPU memory device 2.

Upon receiving the user input 1, the CPU 1 determines, based on the user input 1 and the user inputs 2 and 3 (FIG. 3A), that its processing performance will be insufficient to determine a portion of the predicted state 2. For example, the CPU 1 determines that greater than a threshold amount of processing power will be used to determine one or more positions and one or more orientations for the predicted state 2 of a virtual object controlled by the user A via the client device 1 (FIG. 1). As another example, the CPU 1 determines that greater than a pre-set number of components of the node 1 will be used to determine one or more positions and one or more orientations for the predicted state 2 of a virtual object controlled by the user A via the client device 1.

Upon determining so, the CPU 1 sends the user inputs 1, 2, and 3 via the internal communication devices 1 and 2 to the CPU 2. For example, the internal communication device 1 applies internal communication protocol to the user inputs 1, 2, and 3 to generate one or more transfer units having the user inputs 1, 2, and 3 and sends the transfer units to the internal communication device 2. The internal communication device 2 applies the internal communication protocol to the transfer units to obtain the user inputs 1, 2, and 3 and sends the user inputs 1, 2, and 3 to the CPU 2.

The CPU 2 applies a physics prediction engine to determine one or more positions and one or more orientations of the virtual object controlled by the user A via the client device 1 based on the user inputs 1, 2, and 3. The positions and orientations of the virtual object are for the predicted state 2. Moreover, the CPU 2 applies an audio prediction engine to determine based on the user inputs 1, 2, and 3 audio data, for the predicted state 2, to be output by the virtual object controlled by the user A via the client device 1. The CPU 2 stores the positions and orientations for the predicted state 2 of the virtual object in the memory device 2 of the node 2.

Moreover, the CPU 2*a* of the node 2 accesses the positions and orientations for the predicted state 2 of the virtual object from the memory device 2 applies a physics prediction engine to the positions and orientations of the virtual object to determine one or more positions and orientations of one or more AIs in a virtual scene having the virtual object. The virtual scene is for the predicted state 2. The CPU 2*a* stores the positions and orientations of the AIs in the memory device 2*a*. Moreover, the CPU 2*a* applies an audio prediction engine to determine based on the positions and orientations of the AIs audio data to be output by the AIs in the virtual scene. The audio data to be output by the AIs is for the predicted state 2.

The GPU 2 of the node 2 accesses the positions and orientations of the virtual object from the memory device 2, and the positions and orientations of the AIs from the memory device 2*a*, and applies a graphics prediction engine, such as a rendering code, to the positions and orientations to generate one or more image frames of the virtual scene for the predicted state 2. The video encoder VE 2 of the node 2 encodes the image frames of the virtual scene to output one or more encoded image frames of the virtual scene for the predicted state 2. Moreover, the audio encoder 2 of the node 2 accesses the audio data to be output by the virtual object from the memory device 2 and the audio data to be output by the AIs from the memory device 2*a*, and encodes the audio data to output encoded audio frames for the predicted state 2.

The user inputs 2 and 3 are received by the node 2 from the input device of the client device 1 via the computer network 102 (FIG. 1), the node A, and the node 1. For example, the CPU A of the node A (FIG. 2A) receives the user inputs 2 and 3 from the client device 1 by the computer network 102 and the CPU A provides the user inputs 2 and 3 to the internal communication device A. The internal communication device A of the node A applies the internal communication protocol to the user inputs 2 and 3 to generate one or more transfer units and sends the transfer units to the internal communication device 1 of the node 1. The internal communication device 1 applies the internal communication protocol to the transfer units to extract the user inputs 2 and 3 from the transfer units and sends the user inputs 2 and 3 to the CPU 1 of the node 1. The CPU 1 of the node 1 instructs the internal communication device 1 and to send the user inputs 2 and 3 to the node 2. The internal communication device 1 of the node 1 applies the internal communication protocol to the user inputs 2 and 3 to generate one or more transfer units and sends the transfer units to the internal communication device 2 of the node 2. The internal communication device 2 applies the internal communication protocol to the transfer units received from the node 1 to extract the user inputs 2 and 3 and sends the user inputs 2 and 3 to the CPU 2*a* of the node 2.

Upon receiving the user inputs 2 and 3 from the input device of the client device 1 via the computer network 102 (FIG. 1), the node A and the node 1, the network communication device 2 of the node 2 applies the external communication protocol to the encoded image frames and the encoded audio frames for the virtual scene of the predicted state 2 to generate one or more packets, and sends the packets via the computer network 102 to the client device 1. The client device 1 upon receiving the packets displays one or more images of the virtual scene for the predicted state 2 based on the encoded video frames and output sound based on the encoded audio frames for the predicted state 2.

In one embodiment, upon receiving the user input 1, the CPU 1 applies a physics prediction engine to determine, based on the user input 1 and the user inputs 2 and 3 (FIG. 3A), a portion of the predicted state 2 for which the lower processing performance is sufficient. For example, the CPU 1 determines a position and an orientation of a virtual object controlled by the user A via the client device 1 (FIG. 1). Moreover, the CPU 1 applies an audio prediction engine to determine based on the user inputs 1, 2, and 3 audio data to be output by the virtual object controlled by the user A via the client device 1 (FIG. 1).

In the embodiment, the CPU 1 sends the user inputs 1, 2, and 3, and the position, the orientation and the audio data of the virtual object via the internal communication devices 1 and 2 to the CPU 2. For example, the internal communication device 1 applies internal communication protocol to the user inputs 1, 2, and 3, and the position, the orientation and the audio data of the virtual object to generate one or more transfer units having the user inputs 1, 2, and 3 and sends the transfer units to the internal communication device 2. The internal communication device 2 applies internal communication protocol to the transfer units to obtain the user inputs 1, 2, and 3, and the position, the orientation and the audio data of the virtual object and sends the user inputs 1, 2, and 3, and the position, the orientation and the audio data of the virtual object to the CPU 2 and the CPU 2a. The CPU 2 stores the position and orientation of the virtual object and the audio data to be output by the virtual object for the predicted state 2 in the memory device 2.

In the same embodiment, the CPU 2a applies a physics prediction engine to the user inputs 1, 2, and 3, and the position and orientation of the virtual object to determine one or more positions and orientations of one or more AIs in a virtual scene having the virtual object whose position and orientation are determined by the CPU 1. The virtual scene is for the predicted state 2. Moreover, the CPU 2a applies an audio prediction engine to determine based on the user inputs 1, 2, and 3 audio data to be output by the AIs in the virtual scene for the predicted state 2. The positions and orientations of the AIs for the predicted state 2 and the audio data to be output by the AIs for the predicted state 2 is stored in the memory device 2a. A task of determining the positions and orientations of the AIs for the predicted state 2 is computationally more intensive compared to a task of determining the position and orientation of the virtual object for the predicted state 2 in the virtual scene. Moreover, a task of determining the audio data to be output by the AIs for the predicted state 2 in the virtual scene is also computationally more intensive than a task of determining the audio data to be output by the virtual object for the predicted state 2 in the virtual scene.

In the embodiment, the GPU 2 of the node 2 accesses the position and orientation of the virtual object from the memory device 2, and the positions and orientations of the AIs from the memory device 2a, and applies a graphics prediction engine, such as a rendering code, to the positions and orientations to generate one or more image frames of the virtual scene for the predicted state 2. The video encoder VE 2 of the node 2 encodes the image frames of the virtual scene to output one or more encoded image frames of the virtual scene for the predicted state 2. Moreover, the audio encoder 2 of the node 2 accesses the audio data to be output by the virtual object from the memory device 2 and the audio data to be output by the AIs from the memory device 2a, and encodes the audio data to output encoded audio frames for the predicted state 2.

In the embodiment, upon receiving the user inputs 2 and 3 from the input device of the client device 1 via the computer network 102 (FIG. 1), the node A and the node 1, the network communication device 2 of the node 2 applies the external communication protocol to the encoded image frames and the encoded audio frames for the virtual scene of the predicted state 2 to generate one or more packets, and sends the packets via the computer network 102 to the client device 1. The client device 1 upon receiving the packets displays one or more images of the virtual scene for the predicted state 2 based on the encoded video frames and outputs sound based on the encoded audio frames for the predicted state 2.

In one embodiment, any encoding, described herein, is performed after one or more of the user inputs 2 and 3 for the predicted state 2 are received. For example, upon receiving the user inputs 2 and 3 from the input device of the client device 1 via the computer network 102 (FIG. 1), the node A and the node 1, the video encoder VE 2 of the node 2 encodes the image frames of the virtual scene to output one or more encoded image frames of the virtual scene for the predicted state 2. Moreover, upon receiving the user inputs 2 and 3, the audio encoder 2 of the node 2 accesses the audio data to be output by the virtual object from the memory device 2 and the audio data to be output by the AIs from the memory device 2a, and encodes the audio data to output encoded audio frames for the predicted state 2. The network communication device 2 of the node 2 applies the external communication protocol to the encoded image frames and the encoded audio frames for the virtual scene of the predicted state 2 to generate one or more packets, and sends the packets via the computer network 102 to the client device 1. The client device 1 upon receiving the packets displays one or more images of the virtual scene for the predicted state 2 based on the encoded video frames and outputs sound based on the encoded audio frames for the predicted state 2.

In one embodiment, the CPU 1a has a higher processor performance compared to the CPU 2a. In this embodiment, a position and orientation of a virtual object controlled by the user A via the client device 1 is sent from the node 2 to the node 1 for determination of one or more positions and one or more orientations of one or more AIs in a virtual scene having the virtual object for the predicted state 2. Also, audio data to be output by the virtual object is sent from the node 2 to the node 1 for determination of audio data to be output by the AIs for the predicted state 2. For example, the internal communication device 2 accesses the position, the orientation, and the audio data of the virtual object for the predicted state 2 from the memory device 2 and applies the internal communication protocol to generate one or more transfer units and sends the transfer units to the internal communication device 1 of the node 1. The internal communication device 1 applies the internal communication protocol to parse the transfer units to obtain the position, the orientation, and the audio data of the virtual object for the predicted state 2 and provides the position and orientation to the CPU 1a of the node 1. The CPU 1a of the node 1 determines one or more positions and orientations of one or more AIs based on the position and orientation of the virtual object in the virtual scene for the predicted state 2. Moreover, the CPU 1a determines the audio data to be output by the AIs based on the audio data to be output by the virtual object in the virtual scene for the predicted state 2.

In an embodiment, the GPU 1 has a higher processor performance than the GPU 2 of the node 2. In this embodiment, instead of the GPU 2 generating one or more image frames from a position and orientation of a virtual object controlled by the user A via the client device 1 and positions and orientations of the AIs, the GPU 1 generates the image frames for the predicted state 2. The GPU 1 accesses the position and orientation of the virtual object for the predicted state 2 either from the memory device 1 if the position and orientation is determined by the CPU 1 or from the memory device 2 if the position and orientation is determined by the CPU 2.

In the embodiment, the GPU 1 accesses the position and orientation of the virtual object for the predicted state 2 from the memory device 2 via the internal communication devices 1 and 2. For example, the GPU 1 generates an instruction for obtaining the position and orientation of the virtual object from the memory device 2 and sends the instruction to the internal communication device 1. The internal communication device 1 applies the internal communication protocol to the instruction to generate one or more transfer units and sends the transfer units to the internal communication device 2. The internal communication device 2 applies the internal communication protocol to the transfer units to obtain the instruction and sends the instruction to the CPU 2. The CPU 2 accesses the position and orientation of the virtual object from the memory device 2 and sends the position and orientation to the internal communication device 2. The internal communication device 2 applies the internal communication protocol to the position and orientation of the virtual object to generate one or more transfer units and sends the transfer units to the internal communication device 1. The internal communication device 1 applies the internal communication protocol to the transfer units to extract the position and orientation of the virtual object and sends the position and orientation to the GPU 1.

Continuing with the embodiment, the GPU 1 accesses the positions and orientations of the AIs either from the memory device 1a if the positions and orientations are determined by the CPU 1a or from the memory device 2a if the positions and orientations are determined by the CPU 2a. The GPU 1 accesses the positions and orientations of the AIs for the predicted state 2 from the memory device 2a via the internal communication devices 1 and 2. For example, the GPU 1 generates an instruction for obtaining the positions and orientations of the AIs for the predicted state 2 from the memory device 2a and sends the instruction to the internal communication device 1. The internal communication device 1 applies the internal communication protocol to the instruction to generate one or more transfer units and sends the transfer units to the internal communication device 2. The internal communication device 2 applies the internal communication protocol to the transfer units to extract the instruction and sends the instruction to the CPU 2a. The CPU 2a accesses the positions and orientations of the AIs for the predicted state 2 from the memory device 2a and sends the positions and orientations to the internal communication device 2. The internal communication device 2 applies the internal communication protocol to the positions and orientations of the AIs for the predicted state 2 to generate one or more transfer units and sends the transfer units to the internal communication device 1. The internal communication device 1 applies the internal communication protocol to the transfer units to obtain the positions and orientations of the AIs for the predicted state 2 and sends the positions and orientations to the GPU 1.

In one embodiment, the audio encoder 1 has a higher processor performance than the audio encoder 2 of the node 2. In this embodiment, if audio data to be output by a virtual object for the predicted state 2 is generated by the CPU 2, the audio encoder 1 generates an instruction for obtaining the audio data from the node 2 and provides the instruction to the internal communication device 1. The internal communication device 1 applies the internal communication protocol to the instruction to generate one or more transfer units having the instruction and sends the transfer units to the internal communication device 2. The internal communication device 2 applies the internal communication protocol to the transfer units to obtain the instruction and sends the instruction to the CPU 2. The CPU 2, in response to the instruction, and accesses the audio data from the memory device 2 and sends the audio data to the internal communication device 2. The internal communication device 2 applies the internal communication protocol to the audio data to be output by the virtual object for the predicted state 2 to generate one or more transfer units and sends the transfer units to the internal communication device 1. The internal communication device 1 applies the internal communication protocol to the transfer units to obtain the audio data to be output by the virtual object for the predicted state 2 and sends the audio data to the audio encoder 1. Upon receiving the audio data, the audio encoder 1 encodes the audio data to output encoded audio frames. In a similar manner, if audio data to be output by one or more AIs for the predicted state 2 is generated by the CPU 2a, the audio encoder 1 generates an instruction for obtaining the audio data from the memory device 2a of the node 2. Upon receiving the audio data from the memory device 2a via the internal communication devices 1 and 2, the audio encoder 1 encodes the audio data to be output by the AIs to generate one or more encoded audio frames for the predicted state 2.

In an embodiment, the audio encoder 1 accesses audio data to be output by a virtual object controlled by the user A via the client device 1 from the memory device 1 and accesses audio data to be output by one or more AIs from the memory device 2 of the node 2. The audio data to be output by the virtual object and the audio data to be output by the AIs are for a virtual scene of the predicted state 2.

In one embodiment, the audio encoder 1 accesses audio data to be output by one or more AIs from the memory device 1 and accesses audio data to be output by a virtual object controlled by the user A using the client device 1 from the memory device 2 of the node 2. The audio data to be output by the virtual object and the audio data to be output by the AIs are for a virtual scene of the predicted state 2.

In an embodiment, the video encoder 1 has a higher processor performance than the video encoder 2 of the node 2. In this embodiment, if one or more image frames having a virtual object for the predicted state 2 is generated by the GPU 2, the video encoder 1 generates an instruction for obtaining the image frames from the node 2 and provides the instruction to the internal communication device 1. The internal communication device 1 applies the internal communication protocol to the instruction to generate one or more transfer units having the instruction and sends the transfer units to the internal communication device 2. The internal communication device 2 applies the internal communication protocol to the transfer units to extract the instruction and sends the instruction to the GPU 2. The GPU 2, in response to the instruction, and accesses the image frames from the GPU memory device 2 and sends the image frames to the internal communication device 2. The internal communication device 2 applies the internal communication protocol to the image frames to be output by the virtual object for the predicted state 2 to generate one or more transfer units and sends the transfer units to the internal communication device 1. The internal communication device 1 applies the internal communication protocol to the transfer units to extract the image frames of the virtual object for the predicted state 2 and sends the image frames to the video encoder 1. Upon receiving the image frames, the video encoder 1 encodes the image frames to output encoded image frames. In a similar manner, if image frames having one or more AIs for the predicted state 2 are generated by the GPU 2, the video encoder 1 generates an instruction for obtaining the image frames from the GPU memory device 2 of the node 2. Upon receiving the image frames from the GPU memory device 2 via the internal communication devices 1 and 2, the video encoder 1 encodes the image frames of the AIs to generate one or more encoded image frames.

In an embodiment, the video encoder 1 accesses image frames having a virtual object controlled by the user A using the client device 1 from the GPU memory device 1 and accesses image frames having one or more AIs from the GPU memory device 2 of the node 2. The image frames having the virtual object and the AIs are for a virtual scene of the predicted state 2.

In one embodiment, the video encoder 1 accesses image frames having one or more AIs from the GPU memory device 1 and accesses image frames having a virtual object controlled by the user A using the client device 1 from the GPU memory device 2 of the node 2. The image frames having the virtual object and the AIs are for a virtual scene of the predicted state 2.

In an embodiment, the network communication device 1 has a higher processor performance than the network communication device 2 of the node 2. In this embodiment, if one or more encoded image frames for the predicted state 2 are output from the video encoder VE 2, the network communication device 1 generates an instruction for obtaining the encoded image frames from the node 2 and provides the instruction to the internal communication device 1. The internal communication device 1 applies the internal communication protocol to the instruction to generate one or more transfer units having the instruction and sends the transfer units to the internal communication device 2. The internal communication device 2 applies the internal communication protocol to the transfer units to extract the instruction and sends the instruction to the video encoder VE 2. The video encoder VE 2, in response to the instruction, and accesses the encoded image frames from a memory device of the video encoder VE 2 and sends the encoded image frames to the internal communication device 2. The internal communication device 2 applies the internal communication protocol to the encoded image frames for the predicted state 2 to generate one or more transfer units and sends the transfer units to the internal communication device 1. The internal communication device 1 applies the internal communication protocol to the transfer units to extract the encoded image frames for the predicted state 2 and sends the encoded image frames to the network communication device 1. Upon receiving the encoded image frames and after or in response to receiving the user inputs 2 and 3, the network communication device 1 applies the external communication protocol to the encoded image frames to generate one or more packets, and sends the packets via the computer network 102 to the client device 1 for display of one or more images based on the encoded image frames on the display device of the client device 1.

In a similar manner, in one embodiment, if one or more encoded audio frames for the predicted state 2 are output from the audio encoder VE 2, the network communication device 1 of the node 1 generates an instruction for obtaining the encoded audio frames for the predicted state 2 from the audio encoder AE 2 of the node 2 via the internal communication devices 1 and 2. The instruction is sent from the node 1 to the node 2. Upon receiving the encoded audio frames and after or in response to receiving the user inputs 2 and 3, the network communication device 1 applies the external communication protocol to the encoded audio frames to generate one or more packets, and sends the packets via the computer network 102 to the client device 1 for outputting sounds based on the encoded audio frames.

Figure 4D:
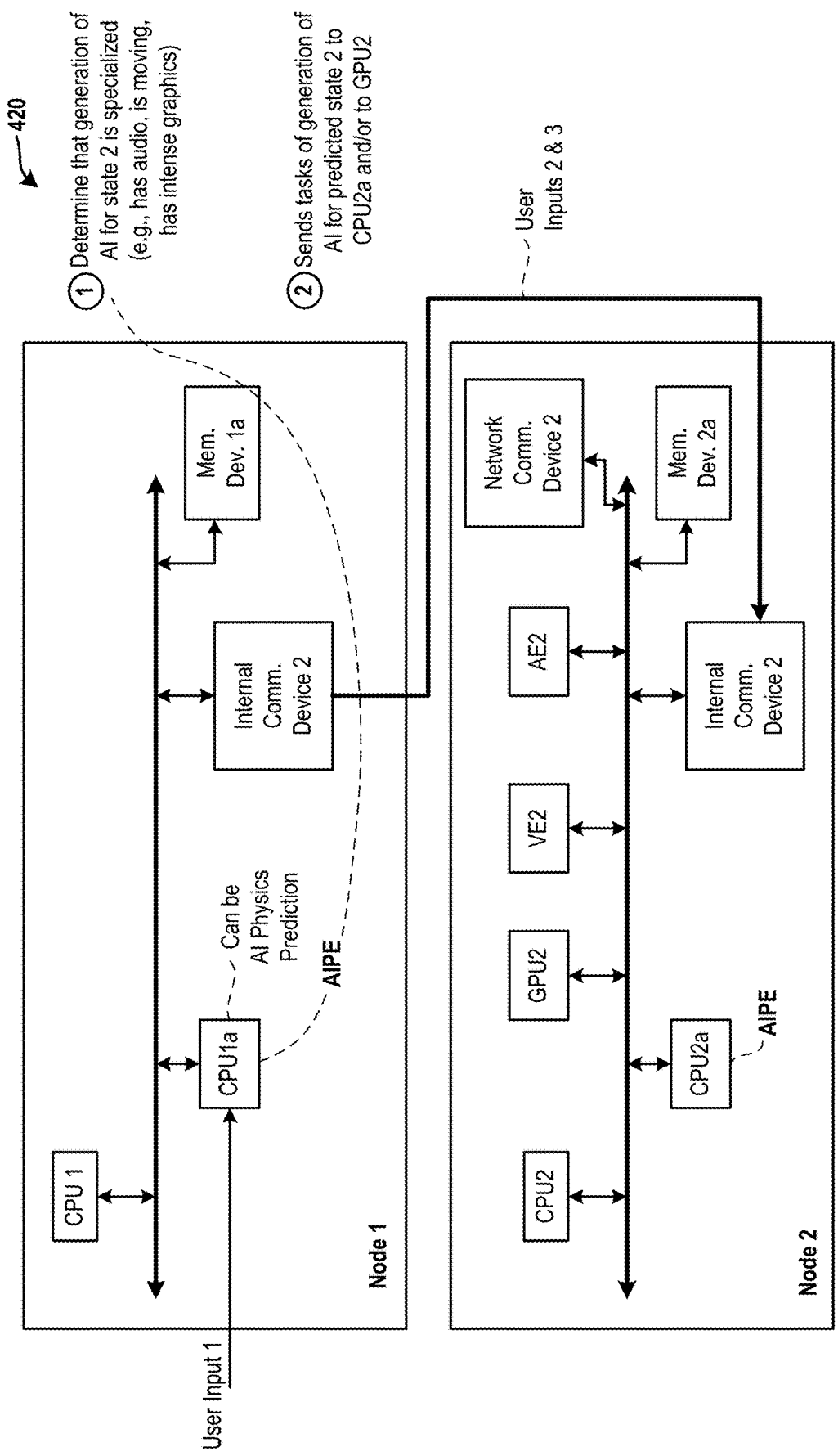
FIG. 4D is a diagram of an embodiment of a system illustrate an assignment of one or more tasks associated with an AI prediction engine from the node 1 to the node 2.

FIG. 4D is a diagram of an embodiment of the system 420 to illustrate an assignment of one or more tasks associated with an AI prediction engine from the node 1 to the node 2. Upon receiving the user input 1, the CPU 1*a* determines, based on the user input 1, that a complex AI state is to be determined for the predicted state 2. As an example, the CPU 1*a* determines that multiple collision points for multiple AIs are to be determined for the predicted state 2 based on the user inputs 2 and 3, which are yet to be received by the node 1. The CPU 1*a* performs a task of determining that the multiple AIs will collide with each other based on the user inputs 2 and 3 for the predicted state 2. The collision of the multiple AIs is an example of a simple AI state. As another example, upon receiving the user input 1, the CPU 1*a* determines, based on the user input 1, the user inputs 2 and 3 for the predicted state 2. The CPU 1*a* further determines, based on the user inputs 2 and 3 (FIG. 3A), that its processing performance will be insufficient to determine a portion of the predicted state 2. To illustrate, the CPU 1*a* determines that greater than the threshold amount of processing power will be used to determine one or more positions and one or more orientations of one or more AIs in a virtual scene for the predicted state 2. As another example, the CPU 1*a* determines that greater than a pre-set number of components of the node 1 will be used to determine one or more positions and one or more orientations of the AIs in the virtual scene for the predicted state 2.

Upon determining that the complex AI state is to be determined, the CPU 1*a* sends the user inputs 2 and 3 via the internal communication devices 1 and 2 to the CPU 2*a* for the determination of the complex AI state for the predicted state 2. For example, the internal communication device 1 applies the internal communication protocol to the user inputs 1, 2, and 3 to generate one or more transfer units having the user inputs 2 and 3, and sends the transfer units to the internal communication device 2. The internal communication device 2 applies the internal communication protocol to the transfer units to extract the user inputs 2 and 3, and sends the user inputs 2 and 3 to the CPU 2*a*.

The CPU 2*a* applies an AI prediction engine to determine the positions and orientations of the AIs based on the user inputs 2 and 3. The positions and the orientations of the AIs are for the predicted state 2. Moreover, the CPU 2*a* applies an audio prediction engine to determine based on the user inputs 2 and 3 audio data to be output by the AIs in the virtual scene for the predicted state 2. The CPU 2*a* stores the positions and orientations of the AIs and the audio data to be output by the AIs for the predicted state 2 in the memory device 2*a* of the node 2.

The remaining operations are similar to those described above with reference to FIG. 4C. For example, the GPU 2 of the node 2 generates image frames based on a position and orientation of a virtual object in the virtual scene for the predicted state 2 and the positions and orientations of the AIs in the virtual scene. Moreover, the video encoder 2 outputs encoded image frames by encoding the image frames generated by the GPU 2. Also, the audio encoder AE2 encodes the audio data to be output by the AIs and the audio data to be output by the virtual object in the virtual scene for the predicted state 2 to generate encoded audio frames. Upon receiving the user inputs 2 and 3, the network communication device 2 generates packets having the encoded audio frames and the encoded image frames generated by the node 2 and sends the packets via the computer network 102 (FIG. 4C) to the client device 1.

In one embodiment, the node A (FIG. 2A) is referred to herein as a first node, the node 1 is referred to herein as a second node, and the node 2 is sometimes referred to herein as a third node.

Figure 5:
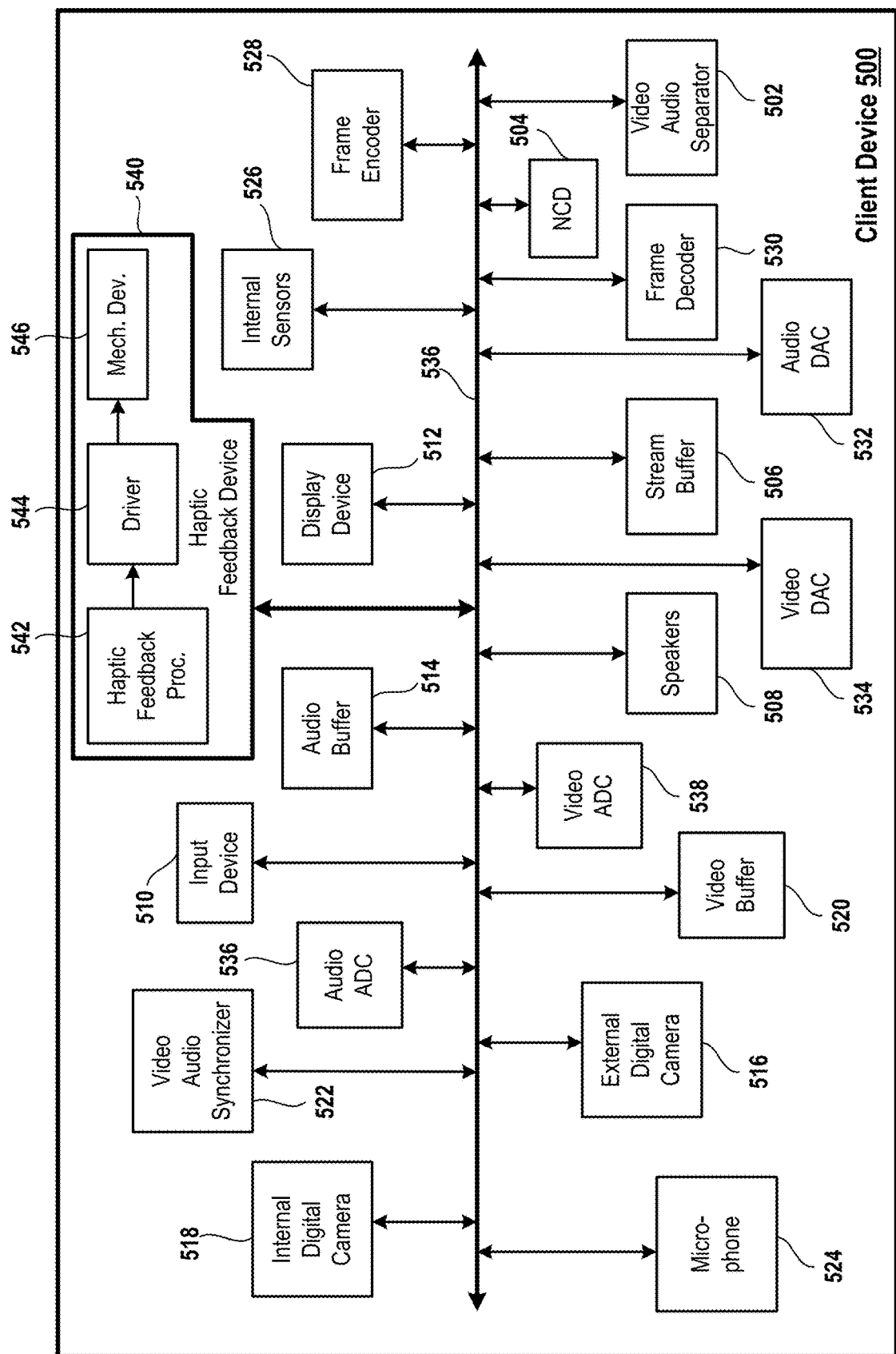
FIG. 5 is a diagram of an embodiment of a client device.

FIG. 5 is a diagram of an embodiment of a client device 500, which is an example of the client device 1, 2, or 3 (FIG. 1). Examples of the client device 500 include a cell phone and an HMD. The client device 500 includes multiple components, such as a video audio separator 502, a network communication device (NCD) 504, a stream buffer 506, one or more speakers 508, a input device 510, a display device 512, an audio buffer 514, an external digital camera 516, an internal digital camera 518, a video buffer 520, a video audio synchronizer 522, a microphone 524, inertial sensors 526, a frame encoder 528, a frame decoder 530, an audio digital-to-analog converter (DAC) 532, a video DAC 534, an audio analog-to-digital converter (ADC) 536, a video ADC 538, and a haptic feedback device 540. The haptic feedback device 540 includes a haptic feedback processor 542, a driver 544, and a mechanical device 546. The components of the client device 500 are coupled to each other via a bus 536. A buffer, as used herein, is used to store data, such as video data or audio data, for a short period of time or temporarily. As another example, a buffer is a region within a memory device to temporarily store data while the data is being moved.

The external digital camera 516 faces a real-world environment of a user, such as the user A, B, or C (FIG. 1), and the internal digital camera 518 faces the eyes of the user. Examples of the real-world environment include a room, a warehouse, a cubicle, and an enclosed space, etc. Examples of a camera, as used herein, include a wide-angle camera, an infrared sensor camera, a panoramic camera, etc. The camera is an optical instrument for recording still images or for recording a video, which are moving images, for storage in a digital memory device. The camera includes a lens, which focuses light reflected from the real-world environment or from the eyes of the user, and includes a camera body, which encloses an image capture mechanism for capture images of the real-world environment or of the eyes of the user. An example of the external digital camera 516 includes a Playstation Eye® camera manufactured by Sony Computer Entertainment, Inc™. Examples of the display device 512 include a light emitting diode (LED) display device, a liquid crystal display (LCD) display device, a liquid crystal on silicon display device, an organic LED (OLED) display device, a plasma screen, etc.

The display device 512 includes a microcontroller, which includes a microprocessor, a driver, and a memory device, to display a game on a display screen of the display device 512. As an example, the microprocessor of the display device 512 obtains decoded image frames from the frame decoder 530 and sends signals to the driver to driver elements, such as LEDs, of the display screen of the display device 512, to display one or more images of a game or another application on the display screen. A driver, as used herein, includes one or more transistors that are coupled to each other.

Examples of the inertial sensors 526 include a gyroscope, a magnetometer, and an accelerometer. Examples of the NCD 504 include a network interface card (NIC) and a network interface controller. Examples of the input device 510 include a keypad, a keyboard, a touchscreen, a touchpad, inertial sensors, one or more buttons, one more switches, one or more joysticks, etc. In one embodiment, the inertial sensors 526 are a part of the input device 510.

The frame encoder 528 includes a video encoder that compresses or encodes multiple image frames or data within an image frame to output one or more encoded image frames. For example, the video encoder of the frame encoder 528 applies a video interframe compression protocol, such as H.264 and Motion Joint Photographic Experts Group (MJPEG), to compress multiple image frames or an intraframe compression protocol to compress data within an image frame, to output one or more encoded image frames. As an example, the video encoder of the frame encoder 528 includes a processor and a buffer for storage of image frames that are to be compressed or that are already compressed by the processor. As another example, the video encoder of the frame encoder 528 includes the processor without including the buffer.

Moreover, the frame encoder 528 includes an audio encoder that encodes audio data to output encoded audio frames. For example, the audio encoder of the frame encoder 528 applies an audio interframe compression protocol, such as advanced audio coding (AAC), to audio data to output encoded audio frames.

Similarly, the frame decoder 530 includes a video decoder that decodes encoded image frames or encoded data within an encoded image frame to output one or more decoded image frames or one or more image frames. As an example, the video decoder of the frame decoder 530 applies an interframe decompression protocol, such as H.264 and Motion Joint Photographic Experts Group (MJPEG), to decompress multiple image frames or an intraframe decompression protocol to decompress data within an image frame, to output one or more decoded image frames. As an example, the video decoder of the frame decoder 530 includes a processor and a buffer for storage of image frames that are to be decompressed or that are already decompressed by the processor. As another example, the frame decoder 530 includes the processor without including the buffer.

Also, the frame decoder 530 includes an audio decoder that decodes one or more encoded audio frames to output audio frames or decoded audio frames. For example, the audio decoder of the frame decoder 530 applies an audio interframe decompression protocol, such as AAC, to encoded audio frames to output decoded audio data or audio data.

In one embodiment, the video audio separator 502 is a computer program that separates audio data from image frames. In an embodiment, the video audio separator 502 is a hardware circuit, such as an ASIC or a PLD that is designed and fabricated to distinguish between audio data and image frames.

In an embodiment, the video audio synchronizer 522 is a computer program that synchronizes video frames with audio data so that any one of the video frames is displayed with sound output based on corresponding audio data. In an embodiment, the video audio synchronizer 522 is a hardware circuit, such as an ASIC or a PLD that is designed and fabricated to synchronize a display of any one of the video frames with sound output according to the corresponding audio data.

In one embodiment, a DAC, as used herein, is an electronic device that converts digital data, such as video frames or image frames or digital audio data, to an analog signal such as a voltage, current, or electric charge. For example, the video DAC is a hardware circuit that converts image frames to an analog signal for display of a game on the display device 512 and the audio DAC 532 is an electronic circuit that converts audio data to an analog audio signal for outputting sound via the speakers 508.

In an embodiment, an ADC, as used herein, is an electronic device that converts an analog signal into digital data, such as video frames or image frames or audio data. For example, the video ADC 538 is a hardware circuit that converts an analog signal to an image frame and the audio ADC 536 is an electronic circuit that converts an analog audio signal to audio data.

An example of the driver 544 is a transistor or one or more transistors that are coupled to each other. Moreover, an example of the mechanical component 546 is a metal plate that vibrates, or a motor and the metal plate. The motor is coupled to the metal plate via a connection mechanism, such as one or more rods or rods that are coupled to each other via gears.

A stream of data packets is received into the stream buffer 506 via the computer network 102 (FIG. 1) or via the computer network 102 and a router (not shown) that is coupled to the computer network 102 and to the client device 500. As an example, the router is coupled between the computer network 102 and the client device 500. The NCD 504 accesses the stream of data packets from the stream buffer 506 and depacketizes the stream. For example, the NCD 504 applies the external communication protocol to extract or obtain encoded frames, such as encoded image frames or encoded audio frames, from the packets. To further illustrate, the NCD 504 determines from a header of a packet a payload of the packet, and accesses the encoded frames from the payload. The NCD 504 sends the encoded frames to the frame decoder 530 or the frame decoder 530 accesses the encoded frames from the NCD 504. The frame decoder 530 applies a decoding protocol, such as H.264, H.265/MPEG-H, H.263/MPEG-4, H.262/MPEG-2a, or a customized protocol, to decode the encoded frames to output decoded image frames and audio data.

The decoded image frames are accessed by the video audio separator 502 from the decoder 530 or are sent from the decoder 530 to the video audio separator 502. The video audio separator 502 separates the audio data from the decoded image frames. For example, the video audio separator 502 separates the audio data from the decoded image frames according to identifiers provided to the audio data and identifiers provides to the decoded image frames. The video audio separator 502 sends the audio data to the audio buffer 514 and the decoded image frames to the video buffer 520. The video audio synchronizer 522 synchronizes the decoded image frames stored in the video buffer 520 with the audio data stored in the audio buffer 514. For example, the video audio synchronizer 522 uses a time at which one of the decoded image frames is generated and a time at which corresponding audio data is generated to determine that the decoded image frame is to be displayed with sound output according to the corresponding audio data.

The audio DAC 532 converts the synchronized audio data from a digital format into an analog format to generate audio signals and the audio signals are converted by the speakers 508 into sound. The video DAC 534 changes from a digital format to an analog format the synchronized image frames to generate analog video signals. The display device 512 displays images of a game on the display screen of the display device based on the analog video signals. The images are displayed in synchronization with the sound output by the speakers 508.

Moreover, the user A, B, or C (FIG. 1) speaks into the microphone 524, which converts sound, e.g., voice, etc., of the user into audio signals, e.g., voltage, current, electrical signals, etc. The audio ADC 538 converts the audio signals from an analog format to a digital format to generate audio data, which is stored in the audio buffer 514. The audio data is accessed by the NCD 504 from the audio buffer 514 to send via the computer network 102 (FIG. 1) to the distributed game engine system 106 (FIG. 1). For example, the NCD 504 applies the external communication protocol to generate one or more packets embedding the audio data and sends the packets via the computer network 102 to the distributed game engine system 106.

In one embodiment, the frame encoder 528 applies the audio interframe compression protocol to the audio data generated by the audio ADC 538 to output encoded audio frames and provides the encoded audio frames to the NCD 504. The NCD 504 applies the external communication protocol to the encoded audio frames to generate one or more packets and sends the packets via the computer network 102 to the distributed game engine system 106.

The internal digital camera 518 captures one or more images of eyes or of face or of head or of body of the user A, B, or C (FIG. 1). The internal digital camera 518 faces the user A, B, or C. For example, when the client device 500 is an HMD worn by the user A, the internal digital camera 518 faces eyes of the user A. As another example, when the client device 500 is a smartphone, the internal digital camera 518 is a front camera that is on the same side or the same surface of the client device 500 on which display screen of the display device 512 is located. As yet another example, the internal digital camera 518 is the front camera that faces a hand of the user A or an arm of the user A to capture gestures made by the user A. Similarly, the external digital camera 516 captures one or more images of the real-world environment surrounding the user. As an example, when the client device 500 is a smartphone, the external digital camera 516 is a rear camera that is on an opposite side or an opposite surface of the client device 500 compared to a side on which display screen of the display device 512 is located. The images captured by the digital cameras 516 and 518 are stored in the video buffer 520. In one embodiment, the terms images and image frames are used herein interchangeably. In an embodiment, the images captured by the digital cameras 516 and 518 is converted by the video DAC 534 from a digital to an analog format and sent for display of the images on the display device 512.

The images captured by the digital cameras 516 and 518 are accessed by the NCD 504 from the video buffer 520 to generate one or more data packets having the images. The NCD 504 sends the data packets via the computer network 102 to the distributed game engine system 106 (FIG. 1). In one embodiment, the images captured by the digital cameras 516 and 518 are accessed by the frame encoder 530. The frame encoder 530 applies the interframe compression protocol or the intraframe compression protocol to the images generate one or more encoded image frames, and provides the encoded image frames via the bus 536 to the NCD 504. The NCD 504 applies the external communication protocol to the encoded image frames to generate one or more data packets from the encoded image frames and sends the data packets via the computer network 102 to the distributed game engine system 106.

The inertial sensors 526 generate inertial sensor data, such as, acceleration of the body part of the user A, rotational velocity of the body part of the user A, orientation of the body part of the user A, or a combination thereof. If the client device 500 includes a hand-held controller, the inertial sensors 526 generate inertial sensor data regarding movement of the hand-held controller. The inertial sensor data is provided by the inertial sensors 526 via the bus 536 to the NCD 504. The NCD 504 generates one or more packets embedding the inertial sensor data and sends the packets via the computer network 102 to the distributed game engine system 106 (FIG. 1).

Moreover, the NCD 504 receives one or more selections that are made by the user A, B, or C by selecting one or more buttons or by making one or more gestures or by making one or more joystick movements of the input device 510 to generate input data and provides the input data to the NCD 504 via the bus 536. The NCD 504 applies the external communication protocol to the input data to generate one or more data packets having the input data and sends the data packets via the computer network 102 to the distributed game engine system 106.

In one embodiment, data packets that are generated by the NCD 504 are sent via the router (not shown) that is coupled to the NCD 504 via a wireless connection, such as a Wi-Fi™ connection or a Bluetooth™ connection. The router receives the data packets and determines a destination address from the data packets. The router routes via the computer network 102 (FIG. 1) the data packets to one or more nodes of the distributed game engine system 106 that are assigned the destination address.

Similarly, in an embodiment, data packets that are generated by the distributed game engine system 106 are sent via the router (not shown) that is coupled between the computer network 102 and the client device 500. The router is coupled to the NCD 504 of the client device 500 via a wireless connection. The router receives the data packets from the distributed game engine system 106 and determines a destination address from the data packets. The router routes via the wireless connection the data packets to the NCD 514 of the client device 500 that is assigned the destination address.

In one embodiment, the input device 510 is a part of a device that is separate from the client device 500. For example, the input device 510 is a part of the hand-held controller, such as a Sony™ Move™ controller or a Sony™ DualShock™ controller or a game controller or a joystick controller. The hand-held controller is coupled to an internal communication device (not shown) of the client device 500 via a wireless connection or a wired connection, such as a parallel data transfer cable or a serial data transfer cable or a USB cable. An example of the internal communication device is a data transfer device that applies a wireless protocol, such as Bluetooth™ or Wi-Fi™, to communicate data with the input device 510. As an example, the internal communication device of the client device 500 is coupled to the NCD 504 via the bus 536. The NCD 504 accesses input data that is received by the internal communication device from the hand-held controller and applies the external communication protocol to generate one or more packets, and sends the packets via the computer network 102 to the distributed game engine system 106.

In an embodiment, the client device 500 excludes the internal digital camera 518.

In one embodiment, the external digital camera 516 is located outside the client device 500 to capture images of movement of a body part, such as an arm, a hand, or a head, or a combination thereof, of the user A, B, or C, or of an HMD worn by the user or of the hand-held controller held by the user.

In an embodiment, the terms packet and data packet are used herein interchangeably.

In one embodiment, the haptic feedback device 540, the microphone 524, the input device 510, and the inertial sensors 526 are components of the hand-held controller. Also, in this embodiment, the display device 512 and the speakers 508 are components of a television. Furthermore, the external digital camera 516 is a separate device from the hand-held controller, the game console, and the television. The embodiment excludes the internal digital camera 518. Moreover, in this embodiment, the remaining components of the client device 500, such as the frame encoder 528, the video audio separator 502, the NCD 504, the frame decoder 530, the audio DAC 532, the stream buffer 506, the video DAC 534, the audio buffer 514, the video ADC 538, the audio ADC 536, the video audio synchronizer 522, and the video buffer 520, are components of a game console. The game console is coupled to the hand-held controller via a wired connection or a wireless connection. Also, the game console is coupled to the display device via a wireless connection or an high-definition multimedia interface (HDMI™) connection.

In an embodiment, the haptic feedback device 540, the microphone 524, the input device 510, the inertial sensors 526, the display device 512, the speakers 508, the external digital camera 516, and the internal digital camera 518 are components of an HMD that is worn on a head of the user A, B, or C. Moreover, in this embodiment, the remaining components of the client device 500, such as the frame encoder 528, the video audio separator 502, the NCD 504, the frame decoder 530, the audio DAC 532, the stream buffer 506, the video DAC 534, the audio buffer 514, the video ADC 538, the audio ADC 536, the video audio synchronizer 522, and the video buffer 520 are components of a game console. The game console is coupled to the HMD via a wired connection or a wireless connection.

Figure 6:
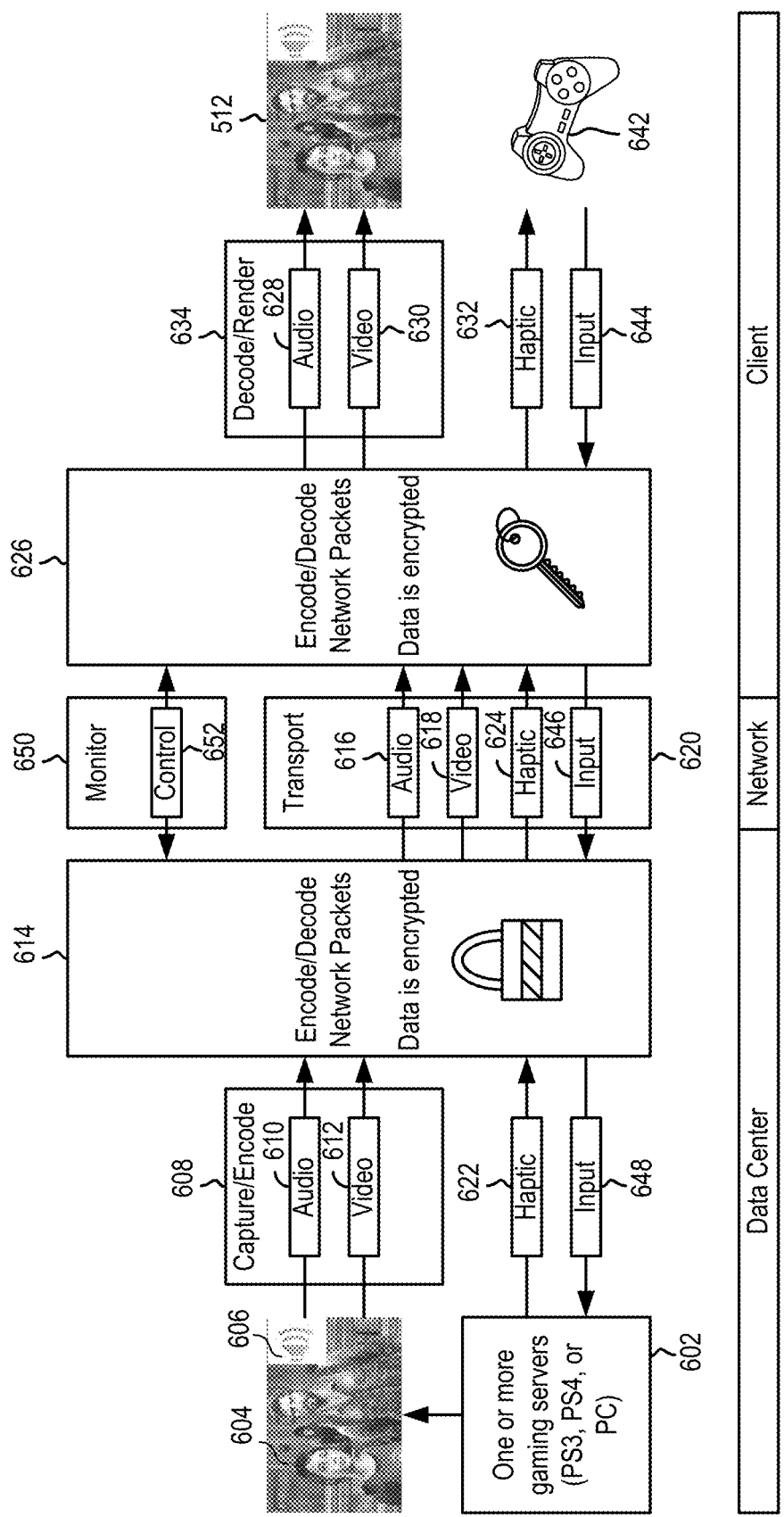
FIG. 6 is a flow diagram conceptually illustrating various operations which are performed for streaming a cloud video game to the client device of FIG. 5 in accordance with implementations of the present disclosure.

FIG. 6 is a flow diagram conceptually illustrating various operations which are performed for streaming a cloud video game to the client device 500 (FIG. 5), in accordance with implementations of the disclosure. One or more game servers 602 of the distributed game engine system 106 execute a video game and generate raw (uncompressed) video 604 and audio 606. A server is sometimes referred to herein as a node. An example of a server is a game console or a server blade. The video 604 and audio 606 are encoded by the one or more game servers 602 for streaming purposes, as indicated at reference 608 in the illustrated diagram. The encoding provides for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

Encoded audio 610 and encoded video 612 are further packetized by a streaming engine, such as the NCD 504 (FIG. 5) into data packets or network packets, as indicated at reference numeral 614, for purposes of transmission over the computer network 102 such as the Internet. In some embodiments, the network packet encoding process also employs a data encryption process, thereby providing enhanced data security. In the illustrated implementation, audio packets 616 and video packets 618 are generated by applying the external communication protocol for transport over the computer network 102.

The one or more game servers 602 additionally generate haptic feedback data 622, which is also packetized into data packets for network transmission. In the illustrated implementation, haptic feedback packets 624 are generated for transport over the computer network 102.

The foregoing operations of generating the raw video and audio and the haptic feedback data are performed on the one or more game servers 602 of one or more data centers of the distributed game engine system 106, and the operations of encoding the video and audio, and packetizing the encoded audio/video and haptic feedback data for transport are performed by the streaming engine of the one or more data centers. As indicated at a reference 620, the audio, video, and haptic feedback packets are transported over the computer network 102. As indicated at reference 626, the audio packets 616, video packets 618, and haptic feedback packets 624, are disintegrated, e.g., parsed, etc., by the client device 500 to extract encoded audio 628, encoded video 630, and haptic feedback data 632 at the client device 500 from the data packets. If data has been encrypted, then the data is also decrypted. The encoded audio 628 and encoded video 630 are then decoded by the client device 500, as indicated at reference 634, to generate client-side raw audio and video data for display on the display device 512 of the client device 500. The haptic feedback data 632 is processed by the haptic feedback processor 542 (FIG. 5) of the client device 500 to produce a haptic feedback effect at a hand-held controller device 642 or other interface device, e.g., an HMD, etc., through which haptic effects can be rendered. One example of a haptic effect is a vibration or rumble of the controller device 642 or of the HMD.

It will be appreciated that a video game is responsive to user inputs, and thus, a similar procedural flow to that described above for transmission and processing of user input, but in the reverse direction from the client device 500 to the one or more servers 502, is performed. As shown, the controller device 642 or another input device or a combination thereof generates input data 644. This input data 644 is packetized at the client device 500 to generate input data packets 646 for transport over the computer network 102 to the one or more servers 602. The input data packets 646 are unpacked and reassembled by the one or more servers 602 to define input data 648 on the data center side. The input data 648 is fed to the one or more servers 602, which process the input data 648 to generate one or more states, as described above.

During transport via the computer network 102 of the audio packets 616, the video packets 618, and haptic feedback packets 624, in some embodiments, the transmission of data over the computer network 102 is monitored to ensure a quality of service. For example, network conditions of the computer network 102 are monitored as indicated by reference 650, including both upstream and downstream network bandwidth, and the game streaming is adjusted in response to changes in available bandwidth. That is, the encoding and decoding of network packets is controlled based on present network conditions, as indicated by reference 652.

Figure 7:
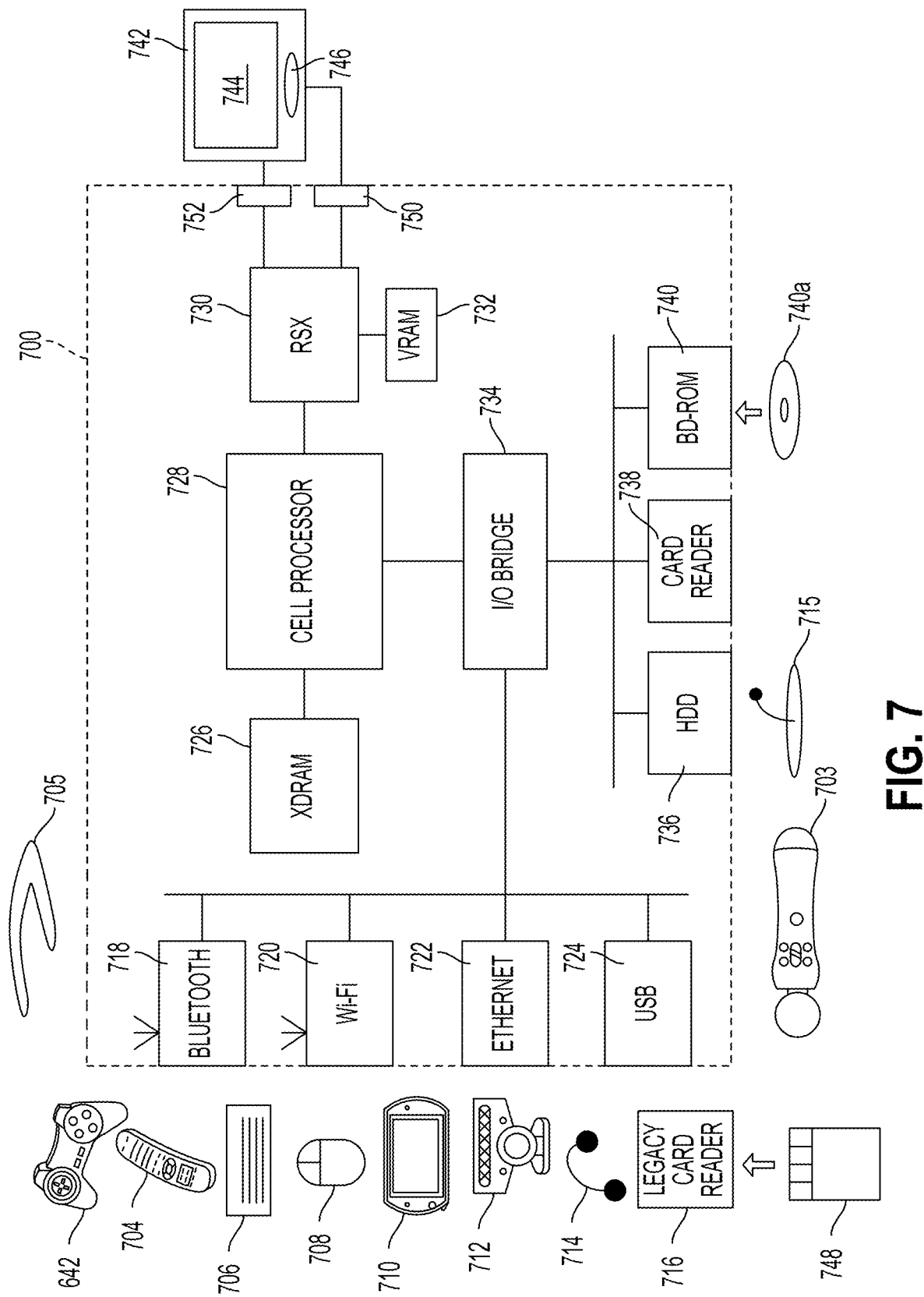
FIG. 7 is a block diagram of an embodiment of a game console that is compatible for interfacing with a display device of the client device of FIG. 5 and is capable of communicating via a computer network with the distributed game engine system.

FIG. 7 is a block diagram of an embodiment of a game console 700 that is compatible for interfacing with the display device 512 of the client device 500 and is capable of communicating via the computer network 102 with the distributed game engine system 106 (FIG. 1). The game console 700 is located within a data center A or is located at a location at which the user A is located. In some embodiments, the game console 700 is used to execute a game that is displayed on an HMD. The game console 700 is provided with various peripheral devices connectable to the game console 700. The game console 700 has a cell processor 728, a dynamic random access memory (XDRAM) unit 726, a Reality Synthesizer™ graphics processor unit 730 with a dedicated video random access memory (VRAM) unit 732, and an input/output (I/O) bridge 734. The game console 700 also has a Blu Ray® Disk read-only memory (BD-ROM) optical disk reader 740 for reading from a disk 740a and a removable slot-in hard disk drive (HDD) 736, accessible through the I/O bridge 734. Optionally, the game console 700 also includes a memory card reader 738 for reading compact flash memory cards, memory Stick® memory cards and the like, which is similarly accessible through the I/O bridge 734. The I/O bridge 734 also connects to Universal Serial Bus (USB) 2.0 ports 724, a gigabit Ethernet port 722, an IEEE 802.11b/g wireless network (Wi-Fi) port 720, and a Bluetooth® wireless link port 718 capable of supporting Bluetooth connections.

In operation, the I/O bridge 734 handles all wireless, USB and Ethernet data, including data from the game controllers 642 and/or 703, and from the HMD 705. For example, when the user A is playing a game generated by execution of a portion of a game code, the I/O bridge 734 receives input data from the game controllers 642 and/or 703 and/or from the HMD 705 via a Bluetooth link and directs the input data to the cell processor 728, which updates a current state of the game accordingly. As an example, a camera within the HMD 705 captures a gesture of the user A to generate an image representing the gesture. The image is an example of the input data. Each game controller 642 and 703 is an example of a hand-held controller (HHC).

The wireless, USB and Ethernet ports also provide connectivity for other peripheral devices in addition to game controllers 642 and 703 and the HMD 705, such as, for example, a remote control 704, a keyboard 706, a mouse 708, a portable entertainment device 710, such as, e.g., a Sony Playstation Portable® entertainment device, etc., a video camera, such as, e.g., an EyeToy® video camera 712, etc., a microphone headset 714, and a microphone 715. In some embodiments, such peripheral devices are connected to the game console 700 wirelessly, for example, the portable entertainment device 710 communicates via a Wi-Fi™ ad-hoc connection, while the microphone headset 714 communicates via a Bluetooth™ link.

The provision of these interfaces means that the game console 700 is also potentially compatible with other peripheral devices such as digital video recorders (DVRs), set-top boxes, digital cameras, portable media players, Voice over Internet protocol (IP) telephones, mobile telephones, printers and scanners.

In addition, a legacy memory card reader 716 is connected to the game console 700 via the USB port 724, enabling the reading of memory cards 748 of a kind used by the game console 700. The game controllers 642 and 703 and the HMD 705 are operable to communicate wirelessly with the game console 700 via the Bluetooth link 718, or to be connected to the USB port 724, thereby also receiving power by which to charge batteries of the game controller 642 and 703 and the HMD 705. In some embodiments, each of the game controllers 642 and 703 and the HMD 705 includes a memory, a processor, a memory card reader, permanent memory, such as, e.g., flash memory, etc., light emitters such as, e.g., an illuminated spherical section, light emitting diodes (LEDs), or infrared lights, etc., microphone and speaker for ultrasound communications, an acoustic chamber, a digital camera, an internal clock, a recognizable shape, such as, e.g., a spherical section facing the game console 700, and wireless devices using protocols, such as, e.g., Bluetooth, Wi-Fi, etc.

The game controller 642 is a controller designed to be used with two hands of the user A, and game controller 703 is a single-hand controller with an attachment. The HMD 705 is designed to fit on top of a head and/or in front of eyes of the user A. In addition to one or more analog joysticks and conventional control buttons, each game controller 642 and 703 is susceptible to three-dimensional location determination. Similarly, the HMD 705 is susceptible to three-dimensional location determination. Consequently, in some embodiments, gestures and movements made by the user A using the game controller 642 and 703 and the HMD 705 are translated as inputs to a game in addition to or instead of conventional button or joystick commands Optionally, other wirelessly enabled peripheral devices, such as, e.g., the Playstation™ Portable device, etc., are used as a controller. In the case of the Playstation™ Portable device, additional game or control information, e.g., control instructions or number of lives, etc., is provided on a display screen of the device. In some embodiments, other alternative or supplementary control devices are used, such as, e.g., a dance mat (not shown), a light gun (not shown), a steering wheel and pedals (not shown), bespoke controllers, etc. Examples of bespoke controllers include a single or several large buttons for a rapid-response quiz game (also not shown).

The remote control 704 is also operable to communicate wirelessly with the game console 700 via the Bluetooth link 718. The remote control 704 includes controls suitable for the operation of the Blu Ray™ Disk BD-ROM reader 740 and for navigation of disk content.

The Blu Ray™ Disk BD-ROM reader 740 is operable to read CD-ROMs compatible with the game console 700, in addition to conventional pre-recorded and recordable CDs, and so-called Super Audio CDs. The Blu Ray™ Disk BD-ROM reader 740 is also operable to read digital video disk-ROMs (DVD-ROMs) compatible with the game console 700, in addition to conventional pre-recorded and recordable DVDs. The Blu Ray™ Disk BD-ROM reader 740 is further operable to read BD-ROMs compatible with the game console 700, as well as conventional pre-recorded and recordable Blu-Ray Disks.

The game console 700 is operable to supply audio and video, either generated or decoded via the Reality Synthesizer graphics unit 730, through audio connectors 750 and video connectors 752 to a display and sound output device 742, such as, e.g., a monitor or television set, etc., having a display screen 744 and one or more loudspeakers 746, or to supply the audio and video via the Bluetooth® wireless link port 718 to the display device of the HMD 705. The audio connectors 750, in various embodiments, include conventional analogue and digital outputs whilst the video connectors 752 variously include component video, S-video, composite video, and one or more High Definition Multimedia Interface (HDMI) outputs. Consequently, video output may be in formats such as phase alternating line (PAL) or National Television System Committee (NTSC), or in 2220p, 1080i or 1080p high definition. Audio processing, e.g., generation, decoding, etc., is performed by the cell processor 708. An operating system of the game console 700 supports Dolby® 5.1 surround sound, Dolby® Theatre Surround (DTS), and the decoding of 7.1 surround sound from Blu-Ray® disks.

In some embodiments, a video camera, e.g., the video camera 712, etc., comprises a single charge coupled device (CCD), an LED indicator, and hardware-based real-time data compression and encoding apparatus so that compressed video data is transmitted in an appropriate format such as an intra-image based motion picture expert group (MPEG) standard for decoding by the game console 700. An LED indicator of the video camera 712 is arranged to illuminate in response to appropriate control data from the game console 700, for example, to signify adverse lighting conditions, etc. Some embodiments of the video camera 712 variously connect to the game console 700 via a USB, Bluetooth or Wi-Fi communication port. Various embodiments of a video camera include one or more associated microphones and also are capable of transmitting audio data. In several embodiments of a video camera, the CCD has a resolution suitable for high-definition video capture. In use, images captured by the video camera are incorporated within a game or interpreted as game control inputs. In another embodiment, a video camera is an infrared camera suitable for detecting infrared light.

In various embodiments, for successful data communication to occur with a peripheral device, such as, for example, a video camera or remote control via one of the communication ports of the game console 700, an appropriate piece of software, such as, a device driver, etc., is provided.

In some embodiments, the aforementioned system devices, including the game console 700, the hand-held controller, and the HMD 705 enable the HMD 705 to display and capture video of an interactive session of a game. The system devices initiate an interactive session of a game, the interactive session defining interactivity between the user A and the game. The system devices further determine an initial position and orientation of the hand-held controller and/or the HMD 705 operated by the user A. The game console 700 determines a current state of a game based on the interactivity between the user A and the game. The system devices track a position and orientation of the hand-held controller and/or the HMD 705 during an interactive session of the user A with a game. The system devices generate a spectator video stream of the interactive session based on a current state of a game and the tracked position and orientation of the hand-held controller and/or the HMD 705. In some embodiments, the hand-held controller renders the spectator video stream on a display screen of the hand-held controller. In various embodiments, the HMD 705 renders the spectator video stream on a display screen of the HMD 705.

Figure 8:
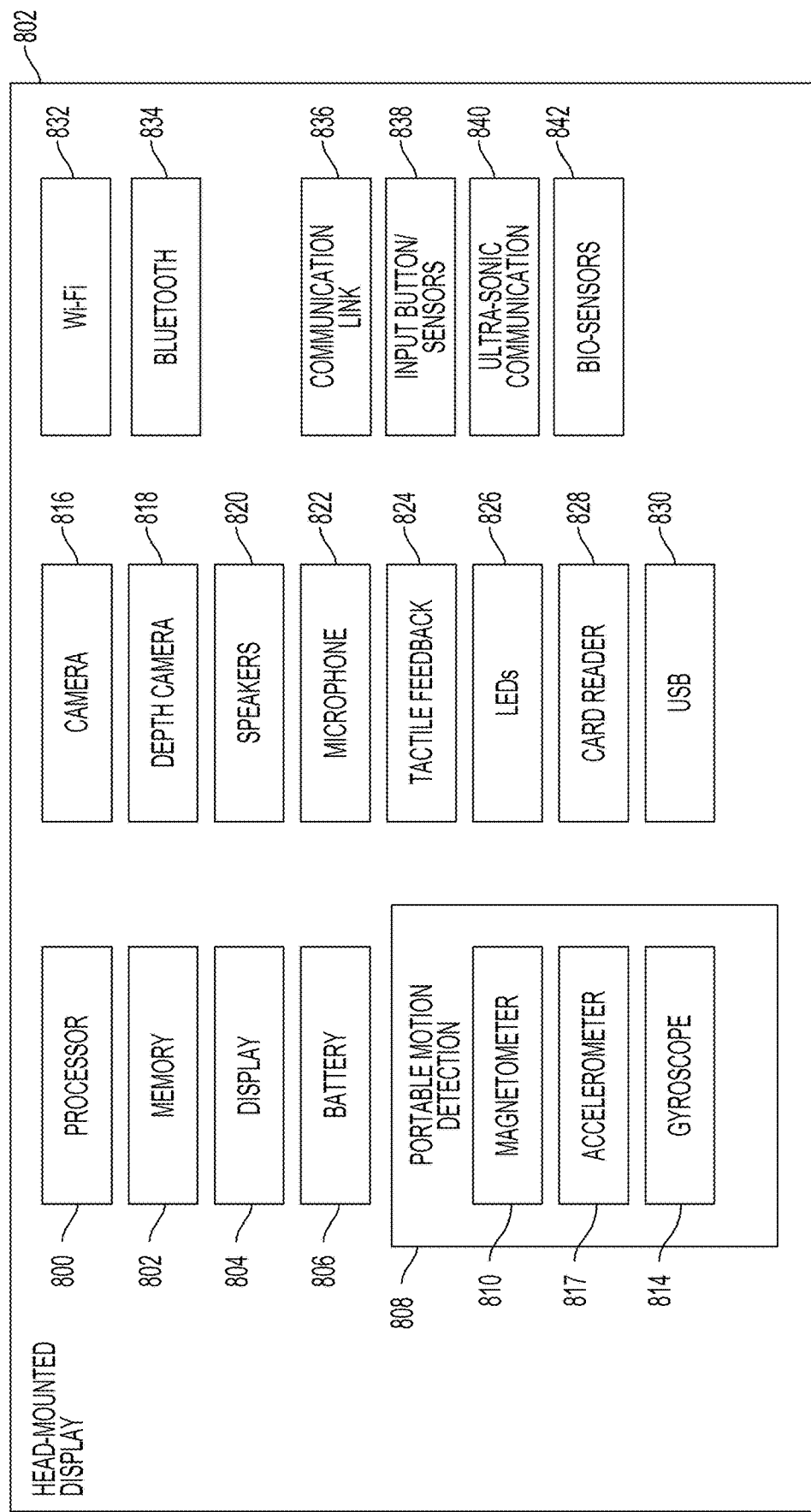
FIG. 8 is a diagram illustrating components of a head-mounted display (HMD), which is an example of the client device.

With reference to FIG. 8, a diagram illustrating components of an HMD 802 is shown. The HMD 802 is an example of the HMD 705 (FIG. 7). The HMD 802 includes a processor 800 for executing program instructions. A memory device 802 is provided for storage purposes. Examples of the memory device 802 include a volatile memory, a non-volatile memory, or a combination thereof. A display device 804 is included which provides a visual interface, e.g., display of image frames, etc., that the user A (FIG. 1) views. A battery 806 is provided as a power source for the HMD 802. A motion detection module 808 includes any of various kinds of motion sensitive hardware, such as a magnetometer 810, an accelerometer 88, and a gyroscope 814.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 812 are used to provide the direction of gravity, which gives an absolute reference for two angles, e.g., world-space pitch and world-space roll, etc.

A magnetometer measures a strength and a direction of a magnetic field in a vicinity of the HMD 802. In some embodiments, three magnetometers 810 are used within the HMD 802, ensuring an absolute reference for the world-space yaw angle. In various embodiments, the magnetometer is designed to span the earth's magnetic field, which is ±80 microtesla. Magnetometers are affected by metal, and provide a yaw measurement that is monotonic with actual yaw. In some embodiments, a magnetic field is warped due to metal in the real-world environment, which causes a warp in the yaw measurement. In various embodiments, this warp is calibrated using information from other sensors, e.g., the gyroscope 814, a camera 816, etc. In one embodiment, the accelerometer 812 is used together with magnetometer 810 to obtain the inclination and azimuth of the HMD 802.

A gyroscope is a device for measuring or maintaining orientation, based on the principles of angular momentum. In one embodiment, instead of the gyroscope 814, three gyroscopes provide information about movement across the respective axis, such as x, y or z axis, based on inertial sensing. The gyroscopes help in detecting fast rotations. However, the gyroscopes, in some embodiments, drift overtime without the existence of an absolute reference. This triggers resetting the gyroscopes periodically, which can be done using other available information, such as positional/orientation determination based on visual tracking of an object, accelerometer, magnetometer, etc.

The camera 816 is provided for capturing images and image streams of the real-world environment, e.g., room, cabin, natural environment, etc., surrounding the user A. In various embodiments, more than one camera is included in the HMD 802, including a camera that is rear-facing, e.g., directed away from the user A when the user A is viewing the display of the HMD 802, etc., and a camera that is front-facing, e.g., directed towards the user A when the user A is viewing the display of the HMD 802, etc. Additionally, in several embodiments, a depth camera 818 is included in the HMD 802 for sensing depth information of objects in the real-world environment.

The HMD 802 includes speakers 820 for providing audio output. Also, a microphone 822 is included, in some embodiments, for capturing audio from the real-world environment, including sounds from an ambient environment, and speech made by the user A, etc. The HMD 802 includes a tactile feedback module 824, e.g., a vibration device, etc., for providing tactile feedback to the user A. In one embodiment, the tactile feedback module 824 is capable of causing movement and/or vibration of the HMD 802 to provide tactile feedback to the user A.

LEDs 826 are provided as visual indicators of statuses of the HMD 802. For example, an LED may indicate battery level, power on, etc. A card reader 828 is provided to enable the HMD 802 to read and write information to and from a memory card. A USB interface 830 is included as one example of an interface for enabling connection of peripheral devices, or connection to other devices, such as other portable devices, computers, etc. In various embodiments of the HMD 802, any of various kinds of interfaces may be included to enable greater connectivity of the HMD 802.

A Wi-Fi module 832 is included for enabling connection to the Internet via wireless networking technologies. Also, the HMD 802 includes a Bluetooth module 834 for enabling wireless connection to other devices. A communications link 836 is also included, in some embodiments, for connection to other devices. In one embodiment, the communications link 836 utilizes infrared transmission for wireless communication. In other embodiments, the communications link 836 utilizes any of various wireless or wired transmission protocols for communication with other devices.

Input buttons/sensors 838 are included to provide an input interface for the user A (FIG. 1). Any of various kinds of input interfaces are included, such as buttons, touchpad, joystick, trackball, etc. An ultra-sonic communication module 840 is included, in various embodiments, in the HMD 802 for facilitating communication with other devices via ultra-sonic technologies.

Bio-sensors 842 are included to enable detection of physiological data from a user. In one embodiment, the bio-sensors 842 include one or more dry electrodes for detecting bio-electric signals of the user through the user's skin.

The foregoing components of HMD 802 have been described as merely exemplary components that may be included in HMD 802. In various embodiments, the HMD 802 includes or does not include some of the various aforementioned components.

Figure 9:
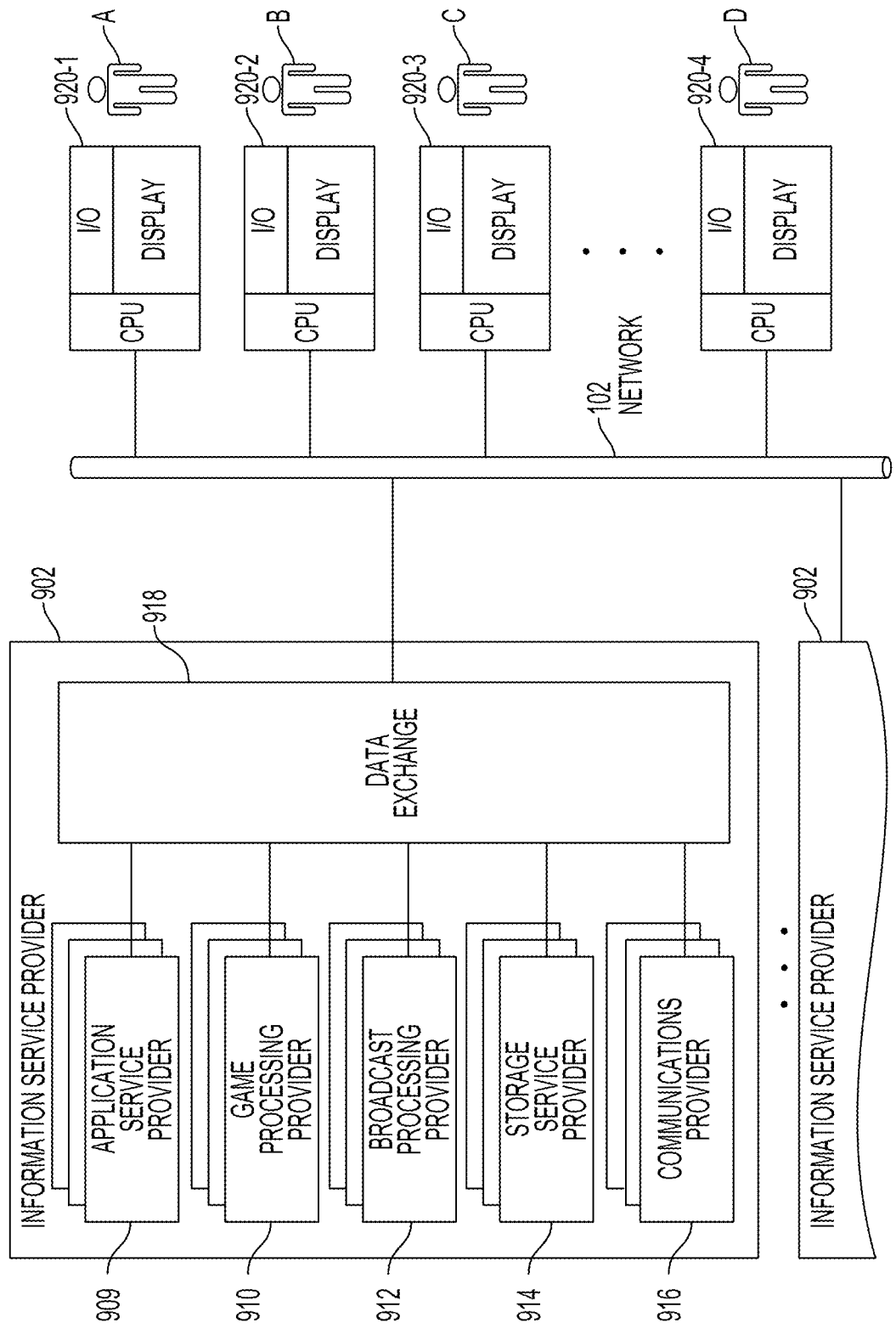
FIG. 9 illustrates an embodiment of an Information Service Provider (INSP) architecture.

FIG. 9 illustrates an embodiment of an Information Service Provider (INSP) architecture. INSPs 902 delivers a multitude of information services to the users A, B, and C, and a user D geographically dispersed and connected via the computer network 102, e.g., a LAN, a WAN, or a combination thereof, etc. An example of the WAN includes the Internet and an example of the LAN includes an Intranet. The user A operates a client device 920-1, the user B operates another client device 920-2, the user C operates yet another client device 920-3, and the user D operates another client device 920-4. The client device 920-1 is an example of the client device 1 (FIG. 1), the client device 920-2 is an example of the client device 2 (FIG. 1), and the client device 920-3 is an example of the client device 3 (FIG. 1).

In some embodiments, each client device 920-1, 920-2, 920-3, and 920-4 includes a central processing unit (CPU), a display, and an input/output (I/O) interface. Examples of each client device 920-1, 920-2, 920-3, and 920-4 include a personal computer (PC), a mobile phone, a netbook, a tablet, a gaming system, a personal digital assistant (PDA), the game console 700 and a display device, the HMD 802 (FIG. 11), the game console 700 and the HMD 802, a desktop computer, a laptop computer, a smart television, etc. In some embodiments, the INSP 902 recognizes a type of a client device and adjusts a communication method employed.

In some embodiments, an INSP delivers one type of service, such as stock price updates, or a variety of services such as broadcast media, news, sports, gaming, etc. Additionally, the services offered by each INSP are dynamic, that is, services can be added or taken away at any point in time. Thus, an INSP providing a particular type of service to a particular individual can change over time. For example, the client device 920-1 is served by an INSP in near proximity to the client device 920-1 while the client device 920-1 is in a home town of the user A, and client device 920-1 is served by a different INSP when the user A travels to a different city. The home-town INSP will transfer requested information and data to the new INSP, such that the information "follows" the client device 920-1 to the new city making the data closer to the client device 920-1 and easier to access. In various embodiments, a master-server relationship is established between a master INSP, which manages the information for the client device 920-1, and a server INSP that interfaces directly with the client device 920-1 under control from the master INSP. In some embodiments, data is transferred from one ISP to another ISP as the client device 920-1 moves around the world to make the INSP in better position to service client device 920-1 be the one that delivers these services.

The INSP 902 includes an Application Service Provider (ASP) 909, which provides computer-based services to customers over the computer network 102. Software offered using an ASP model is also sometimes called on-demand software or software as a service (SaaS). A simple form of providing access to a computer-based service, e.g., customer relationship management, etc., is by using a standard protocol, e.g., a hypertext transfer protocol (HTTP), etc. The application software resides on a vendor's server and is accessed by each client device 920-1, 920-2, 920-3, and 920-4 through a web browser using a hypertext markup language (HTML), etc., by a special purpose client software provided by the vendor, and/or other remote interface, e.g., a thin client, etc.

Services delivered over a wide geographical area often use cloud computing. Cloud computing is a style of computing in which dynamically scalable and often virtualized resources are provided as a service over the computer network 102. The users A, B, C, and D do not need to be an expert in the technology infrastructure in the "cloud" that supports them. Cloud computing is divided, in some embodiments, in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the computer network 102, e.g., using servers, storage and logic, etc., based on how the computer network 102 is depicted in computer network diagrams and is an abstraction for the complex infrastructure it conceals.

Further, the INSP 902 includes a game processing provider (GPP) 910, also sometimes referred to herein as a game processing server, which is used by the client devices 920-1, 920-2, 920-3, and 920-4 to play single and multiplayer video games. Most video games played over the computer network 102 operate via a connection to a game server. Typically, games use a dedicated server application that collects data from the client devices 920-1, 920-2, 920-3, and 920-4 and distributes it to other clients that are operated by other users. This is more efficient and effective than a peer-to-peer arrangement, but a separate server is used to host the server application. In some embodiments, the GPP 910 establishes communication between the client devices 920-1, 920-2, 920-3, and 920-4, which exchange information without further relying on the centralized GPP 910.

Dedicated GPPs are servers which run independently of a client. Such servers are usually run on dedicated hardware located in data centers, providing more bandwidth and dedicated processing power. Dedicated servers are a method of hosting game servers for most PC-based multiplayer games. Massively multiplayer online games run on dedicated servers usually hosted by the software company that owns the game title, allowing them to control and update content.

A broadcast processing server (BPS) 912, sometimes referred to herein as a broadcast processing provider, distributes audio or video signals to an audience. Broadcasting to a very narrow range of audience is sometimes called narrowcasting. A final leg of broadcast distribution is how a signal gets to the client devices 920-1, 920-2, 920-3, and 920-4, and the signal, in some embodiments, is distributed over the air as with a radio station or a television station to an antenna and receiver, or through a cable television or cable radio or "wireless cable" via the station. The computer network 102 also brings, in various embodiments, either radio or television signals to the client devices 920-1, 920-2, 920-3, and 920-4, especially with multicasting allowing the signals and bandwidth to be shared. Historically, broadcasts are delimited, in several embodiments, by a geographic region, e.g., national broadcasts, regional broadcasts, etc. However, with the proliferation of high-speed Internet, broadcasts are not defined by geographies as content can reach almost any country in the world.

A storage service provider (SSP) 914 provides computer storage space and related management services. The SSP 914 also offers periodic backup and archiving. By offering storage as a service, the client devices 920-1, 920-2, 920-3, and 920-4 use more storage compared to when storage is not used as a service. Another major advantage is that the SSP 914 includes backup services and the client devices 920-1, 920-2, 920-3, and 920-4 will not lose data if their hard drives fail. Further, a plurality of SSPs, in some embodiments, have total or partial copies of the data received from the client devices 920-1, 920-2, 920-3, and 920-4, allowing the client devices 920-1, 920-2, 920-3, and 920-4 to access data in an efficient way independently of where the client devices 920-1, 920-2, 920-3, and 920-4 are located or of types of the clients. For example, the user A accesses personal files via a home computer, as well as via a mobile phone while the user A is on the move.

A communications provider 916 provides connectivity to the client devices 920-1, 920-2, 920-3, and 920-4. One kind of the communications provider 916 is an Internet service provider (ISP) which offers access to the computer network 102. The ISP connects the client devices 920-1, 920-2, 920-3, and 920-4 using a data transmission technology appropriate for delivering Internet Protocol datagrams, such as dial-up, digital subscriber line (DSL), cable modem, fiber, wireless or dedicated high-speed interconnects. The communications provider 916 also provides, in some embodiments, messaging services, such as e-mail, instant messaging, and short message service (SMS) texting. Another type of a communications Provider is a network service provider (NSP), which sells bandwidth or network access by providing direct backbone access to the computer network 102. Examples of network service providers include telecommunications companies, data carriers, wireless communications providers, Internet service providers, cable television operators offering high-speed Internet access, etc.

A data exchange 918 interconnects the several modules inside INSP 902 and connects these modules to the client devices 920-1, 920-2, 920-3, and 920-4 via computer network 102. The data exchange 918 covers, in various embodiments, a small area where all the modules of INSP 902 are in close proximity, or covers a large geographic area when the different modules are geographically dispersed. For example, the data exchange 902 includes a fast Gigabit Ethernet within a cabinet of a data center, or an intercontinental virtual LAN.

In one embodiment, one or more nodes, described herein, determine an amount of misprediction that a predicted user input, such as the user input 2 (FIG. 3A), will be received and use a first threshold value to trigger full rendering or generation of a frame, such as an image frame or an audio frame. The amount of misprediction is an example of a level of prediction and is greater than the first threshold value. The first threshold value is when a current image frame or a current audio frame is determined to be incorrectly predicted or generated based on the predicted user input and another image frame or audio frame is to be fully generated or rendered.

In an embodiment, there is a second threshold value below the first threshold value and the second threshold value is used to trigger rendering or generation of a frame next time. For example, one or more of the nodes, described herein, detect that they are on a cusp of mispredicting, and do not preemptively generate or render a next frame, such as an image frame or an audio frame based on a next predicted user input. The next predicted user input is consecutive to the predicted user input. The generation or rendering of the current image frame or the current audio frame is based on a pre-determined level of prediction of the predicted user input, e.g., a level of prediction is below the first threshold value, and the one or more nodes predict that generation or rendering of the next frame will not be based on the pre-determined level of prediction of the next predicted user input. Each of the first threshold value and the second threshold value is an example of the pre-determined level of prediction.

Also, in one embodiment, when one or more nodes, described herein, determine that predictions of reception of predicted user inputs do not satisfy, e.g., do not exceed, the pre-determined level of prediction, the one or more nodes temporarily suspend or do not perform their operation of generating or rendering image frames based on the predicted user inputs. While the operation is suspended, the one or more nodes perform generation or rendering of image frames and audio frames based on an actual user input, such as the user input 1' (FIG. 3A). While the operation is suspended, the one or more nodes learn to predict to achieve the pre-determined level of prediction. As an example, the operation is suspended and/or the learning occurs for a fixed time period, for a duration of a game session, or until a known event occurs in the game, or until a prediction engine predicts to a level greater than the pre-determined level. The prediction engine is a computer program that is executed by one or more of the nodes. An example of the known event is an end of a game scene, which is a challenging scene to predict with the pre-determined level of prediction. An illustration of the challenging scene is one with greater than a pre-determined amount of movements or operations or a combination thereof of virtual objects or virtual characters. After the fixed time period, or the end of the game session, or the known event occurs, or the prediction engine predicts to the level greater than the pre-determined level, one or more of the nodes, described herein, revert back to predicting user inputs and generating image frames and audio frames based on the predicted user inputs.

It should be noted that in various embodiments, one or more features of some embodiments described herein are combined with one or more features of one or more of remaining embodiments described herein.

Embodiments described in the present disclosure may be practiced with various computer system configurations including hand-held devices, microprocessor systems, microprocessor-based or programmable consumer electronics, minicomputers, mainframe computers and the like. In one implementation, the embodiments described in the present disclosure are practiced in distributed computing environments where tasks are performed by remote processing devices that are linked through a wire-based or wireless network.

With the above embodiments in mind, it should be understood that, in one implementation, the embodiments described in the present disclosure employ various computer-implemented operations involving data stored in computer systems. These operations are those requiring physical manipulation of physical quantities. Any of the operations described herein that form part of the embodiments described in the present disclosure are useful machine operations. Some embodiments described in the present disclosure also relate to a device or an apparatus for performing these operations. The apparatus is specially constructed for the required purpose, or the apparatus is a general-purpose computer selectively activated or configured by a computer program stored in the computer. In particular, in one embodiment, various general-purpose machines are used with computer programs written in accordance with the teachings herein, or it may be more convenient to construct a more specialized apparatus to perform the required operations.

In an implementation, some embodiments described in the present disclosure are embodied as computer-readable code on a computer-readable medium. The computer-readable medium is any data storage device that stores data, which is thereafter read by a computer system. Examples of the computer-readable medium include a hard drive, a network-attached storage (NAS), a ROM, a RAM, a compact disc ROM (CD-ROM), a CD-recordable (CD-R), a CD-rewritable (CD-RW), a magnetic tape, an optical data storage device, a non-optical data storage device, etc. As an example, a computer-readable medium includes computer-readable tangible medium distributed over a network-coupled computer system so that the computer-readable code is stored and executed in a distributed fashion.

Moreover, although some of the above-described embodiments are described with respect to a gaming environment, in some embodiments, instead of a game, other environments, e.g., a video conferencing environment, etc., is used.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments described in the present disclosure have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method comprising:
   receiving via a computer network a first user input associated with a game;
   determining based on the first user input a current state of the game;
   while the current state of the game is being determined, predicting a next state of the game based on the first user input and one or more predicted user inputs;
   determining that a second user input different from the one or more predicted user inputs is received via the computer network, wherein the second user input is received during said predicting the next state of the game;
   generating a game state based on the second user input;
   generating one or more frames based on the game state, wherein said generating the game state based on the second user input and generating the one or more frames based on the game state are provided a higher priority than said predicting the next state of the game; and
   sending via the computer network the one or more frames generated based on the game state.

2. The method of claim 1, further comprising generating, by a graphics engine, one or more predicted frames based on the next state, wherein said predicting the next state of the game and said generating the one or more predicted frames are performed before the one or more predicted user inputs are received to reduce a latency in execution of the game.

3. A method comprising:
receiving via a computer network a first user input associated with a game;
determining based on the first user input a current state of the game;
while the current state of the game is being determined, predicting a next state of the game based on the first user input and one or more predicted user inputs;
generating, by a graphics engine, one or more predicted frames based on the next state;
determining that a second user input different from the one or more predicted user inputs is received via the computer network, wherein the second user input is received during said generating the one or more predicted frames;
generating a game state based on the second user input;
generating one or more frames based on the game state, wherein said generating the game state based on the second user input and generating the one or more frames based on the game state are provided a higher priority than said generating the one or more predicted frames; and
sending via the computer network the one or more frames generated based on the game state.

4. The method of claim 1, wherein said predicting the next state of the game is based on an output of the current state of the game.

5. A method comprising:
receiving via a computer network a first user input associated with a game;
determining based on the first user input a current state of the game;
while the current state of the game is being determined, predicting a next state of the game based on the first user input and one or more predicted user inputs;
generating, by a graphics engine, one or more predicted frames based on the next state;
determining that a second user input different from the one or more predicted user inputs is received via the computer network;
generating one or more elements of a game state of the game based on the second user input, wherein the one or more elements are not within the next state;
generating one or more frames based on the one or more elements of the game state; and
sending the one or more frames generated based on the one or more elements of the game state for allowing a display of one or more composite images, wherein the one or more composite images have the one or more elements of the game state superimposed on the one or more predicted frames.

6. The method of claim 1, further comprising:
determining whether a complex physics state is to be determined in said predicting the next state of the game;
providing a task of said determining the complex physics state to a node; and
retaining a task of determining a simple physics state in said predicting the next state of the game.

7. The method of claim 6, wherein the complex physics state includes contact points of collision of two virtual objects in the game and the simple physics state includes an occurrence of the collision.

8. The method of claim 1, wherein the one or more predicted frames have a simple graphics state, the method further comprising:
generating, by a graphics engine, one or more predicted frames based on the next state;
determining whether a complex graphics state is to be determined in said predicting the next state of the game;
providing a task of said determining the complex graphics state to a node;
receiving one or more images frames for the complex graphics state from the node; and
combining the one or more frames for the complex graphics state with the one or more predicted frames.

9. The method of claim 1, further comprising:
determining whether a complex artificial intelligence state is to be determined in said predicting the next state of the game;
providing a task of said determining the complex artificial intelligence state to a node; and
retaining a task of determining a simple artificial intelligence state in said predicting the next state of the game.

10. The method of claim 1, further comprising generating, by a graphics engine, one or more predicted frames based on the next state, wherein the one or more predicted frames include image frames or audio frames or both image frames and audio frames.

11. A system comprising:
a first node configured to:
receive via a computer network a first user input associated with a game;
determine based on the first user input a current state of the game;
a second node coupled to the first node, wherein the second node is configured to:
receive the first user input associated with the game from the first node;
predict a next state of the game based on the first user input and one or more predicted user inputs while the current state of the game is being determined;
determine that a second user input different from the one or more predicted user inputs is received via the computer network,
wherein one of the first node and the second node is configured to:
generate a game state based on the second user input;
generate one or more frames based on the game state, wherein the game state and the one or more frames are generated with a higher priority than the prediction of the next state by the second node; and
send via the computer network the one or more frames generated based on the game state.

12. The system of claim 11, wherein the second node is configured to predict the next state of the game and generate one or more predicted frames based on the next state before the one or more predicted user inputs are received to reduce a latency in execution of the game.

13. A system comprising:
a first node configured to:
receive via a computer network a first user input associated with a game;
determine based on the first user input a current state of the game;
a second node coupled to the first node, wherein the second node is configured to:
receive the first user input associated with the game from the first node;

predict a next state of the game based on the first user input and one or more predicted user inputs while the current state of the game is being determined;

generate, using a graphical engine, one or more predicted frames based on the next state;

determine that a second user input different from the one or more predicted user inputs is received via the computer network, wherein one of the first node and the second node is configured to:

generate a game state based on the second user input;

generate one or more frames based on the game state, wherein the game state and the one or more frames are generated with a higher priority than the generation of the one or more predicted frames by the second node; and send via the computer network the one or more frames generated based on the game state.

14. The system of claim 11, wherein the second node is configured to predict the next state of the game based on an output of the current state of the game.

15. A system comprising:

a first node configured to:

receive via a computer network a first user input associated with a game;

determine from the first user input a current state of the game;

a second node coupled to the first node, wherein the second node is configured to:

receive the first user input associated with the game from the first node;

predict a next state of the game based on the first user input and one or more predicted user inputs while the current state of the game is being determined;

generate, using a graphical engine, one or more predicted frames based on the next state;

wherein one of the first node and the second node is configured to:

determine that a second user input different from the one or more predicted user inputs is received via the computer network;

generate one or more elements of a game state of the game based on the second user input, wherein the one or more elements of the game state are not within the next state;

generate one or more frames based on the one or more elements of the game state; and send the one or more frames generated based on the one or more elements of the game state for allowing a display of one or more composite images, wherein the one or more composite images have the one or more elements of the game state superimposed on the one or more predicted frames.

16. The system of claim 11, further comprising:

a third node coupled to the second node, wherein the second node is configured to:

determine whether a complex physics state is to be determined to predict the next state of the game;

provide a task of the determination of the complex physics state to the third node; and retain a task of determining a simple physics state for the prediction of the next state of the game.

17. The system of claim 16, wherein the complex physics state includes contact points of collision of two virtual objects in the game and the simple physics state includes an occurrence of the collision.

18. The system of claim 11, wherein the second node is configured to generate, using a graphical engine, one or more predicted frames based on the next state, wherein the one or more predicted frames have a simple graphics state, the system further comprising:

a third node coupled to the second node, wherein the second node is configured to:

determine whether a complex graphics state is to be determined to predict the next state of the game;

provide a task of the determination of the complex graphics state to the third node;

receive one or more images frames for the complex graphics state from the third node; and combine the one or more frames for the complex graphics state with the one or more predicted frames.

19. The system of claim 11, further comprising:

a third node coupled to the second node, wherein the second node is configured to:

determine whether a complex artificial intelligence state is to be determined to predict the next state of the game;

provide a task of the determination of the complex artificial intelligence state to the third node; and retain a task of determining a simple artificial intelligence state for the prediction of the next state of the game.

20. The system of claim 11, wherein the second node is configured to generate, using a graphical engine, one or more predicted frames based on the next state, wherein the one or more predicted frames include image frames or audio frames or both image frames and audio frames.

* * * * *